United States Patent
Volin

(10) Patent No.: US 10,856,519 B2
(45) Date of Patent: Dec. 8, 2020

(54) MULTI-FUNCTIONAL PET CRATE

(71) Applicant: Dee Volin, Fairview, OR (US)

(72) Inventor: Dee Volin, Fairview, OR (US)

( * ) Notice: Subject to any disclaimer, the term of this patent is extended or adjusted under 35 U.S.C. 154(b) by 292 days.

(21) Appl. No.: 16/112,685

(22) Filed: Aug. 25, 2018

(65) Prior Publication Data

US 2020/0060224 A1 Feb. 27, 2020

(51) Int. Cl.
*A01K 1/02* (2006.01)
*B60R 3/02* (2006.01)
*A01K 1/00* (2006.01)

(52) U.S. Cl.
CPC .......... *A01K 1/0272* (2013.01); *A01K 1/0035* (2013.01); *A01K 1/0245* (2013.01); *B60R 3/02* (2013.01)

(58) Field of Classification Search
CPC ...... A01K 1/0272; A01K 1/0236; A01K 1/02; A01K 1/03; A01K 1/031; A01K 1/033; A01K 1/034; A01K 1/0035; A01K 1/0245; B60P 1/43; B60P 1/435
See application file for complete search history.

(56) References Cited

U.S. PATENT DOCUMENTS

| | | |
|---|---|---|
| 1,550,829 A | 8/1925 | McBride |
| 2,790,414 A | 4/1957 | Rossow |
| 2,897,781 A * | 8/1959 | Olson .................. A01K 1/0272 119/496 |
| 3,481,311 A | 12/1969 | Schluttig |
| 3,785,344 A | 1/1974 | Patterson |
| 3,797,461 A | 3/1974 | Breeden |
| 4,140,080 A | 2/1979 | Snader |
| 4,484,540 A | 11/1984 | Yamamoto |
| 4,566,404 A * | 1/1986 | Instone ................ A01K 1/0035 119/400 |
| 4,852,520 A | 8/1989 | Goetz |
| 5,113,793 A | 5/1992 | Leader |

(Continued)

FOREIGN PATENT DOCUMENTS

| | | | | |
|---|---|---|---|---|
| DE | 202013011444 U1 * | 2/2014 | .......... | A45C 7/0077 |
| WO | WO-2018017787 A1 * | 1/2018 | .......... | A01K 1/0245 |

*Primary Examiner* — Kristen C Hayes

(57) ABSTRACT

A crumplable rollable collapsible pet crate, comprises: a top panel; a bottom panel; a left panel pivotably attached to the bottom panel; a right panel pivotably attached to the bottom panel; a rear panel pivotably attached to the top and the bottom panels; a front panel pivotably attached to the bottom panel; four top corner connectors respectively attached to the top, the left, the right, the rear, and the front panel; four bottom corner connectors respectively attached to the bottom, the left, the right, the rear, and the front panel; two wheels respectively rotatably attached to the bottom panel; a tray attached to the bottom panel; an outer crumple-zone-ramp-and-door swingably attached to the front panel; an inner rumple-zone-ramp-and-door slid inside the outer drying-grooming-platform-patio-crumple-zone-ramp-and-door; a housing attached to the top panel; a processor secured within the housing; a memory connected to the processor; a display connected to the processor and the memory; a software installed inside the processor; a temperature sensor connected to the processor; an alert speaker connected to the processor; and an alert light connected to the processor.

20 Claims, 45 Drawing Sheets

(56) References Cited

U.S. PATENT DOCUMENTS

| | | | |
|---|---|---|---|
| 5,784,995 | A | 7/1998 | Willinger |
| 6,119,634 | A | 9/2000 | Myrick |
| 6,230,656 | B1 | 5/2001 | Walach |
| 6,267,082 | B1 | 7/2001 | Naragon |
| 6,612,261 | B2 | 9/2003 | Mazrolle |
| 6,732,676 | B1 | 5/2004 | Smith |
| 7,458,337 | B2 * | 12/2008 | Callan .................. A01K 1/0107 |
| | | | 119/165 |
| 7,621,236 | B2 | 11/2009 | Steffey |
| 7,878,150 | B2 | 2/2011 | Dietz |
| 8,117,994 | B1 | 2/2012 | Goodlow |
| 8,312,846 | B1 * | 11/2012 | Murray .................. B65G 19/00 |
| | | | 119/847 |
| 8,544,417 | B2 | 10/2013 | Sangl |
| D734,570 | S | 7/2015 | Hawk |
| D736,484 | S | 8/2015 | Jakubowski |
| D756,573 | S | 5/2016 | Jakubowski |
| 9,380,760 | B2 * | 7/2016 | Rorke .................... A01K 1/035 |
| 9,521,826 | B2 | 12/2016 | Rybka |
| 10,104,864 | B2 * | 10/2018 | Murray .................. A01K 29/00 |
| 2006/0150346 | A1 | 7/2006 | Myrick |
| 2007/0006816 | A1 | 1/2007 | Dietz |
| 2009/0038558 | A1 * | 2/2009 | Schulte ................ A01K 1/0272 |
| | | | 119/496 |
| 2010/0089336 | A1 | 4/2010 | Flannery |
| 2010/0192870 | A1 | 8/2010 | Wood |
| 2011/0308476 | A1 | 12/2011 | Chang |
| 2014/0123910 | A1 | 5/2014 | Rorke |
| 2016/0014994 | A1 | 1/2016 | Ma |

* cited by examiner

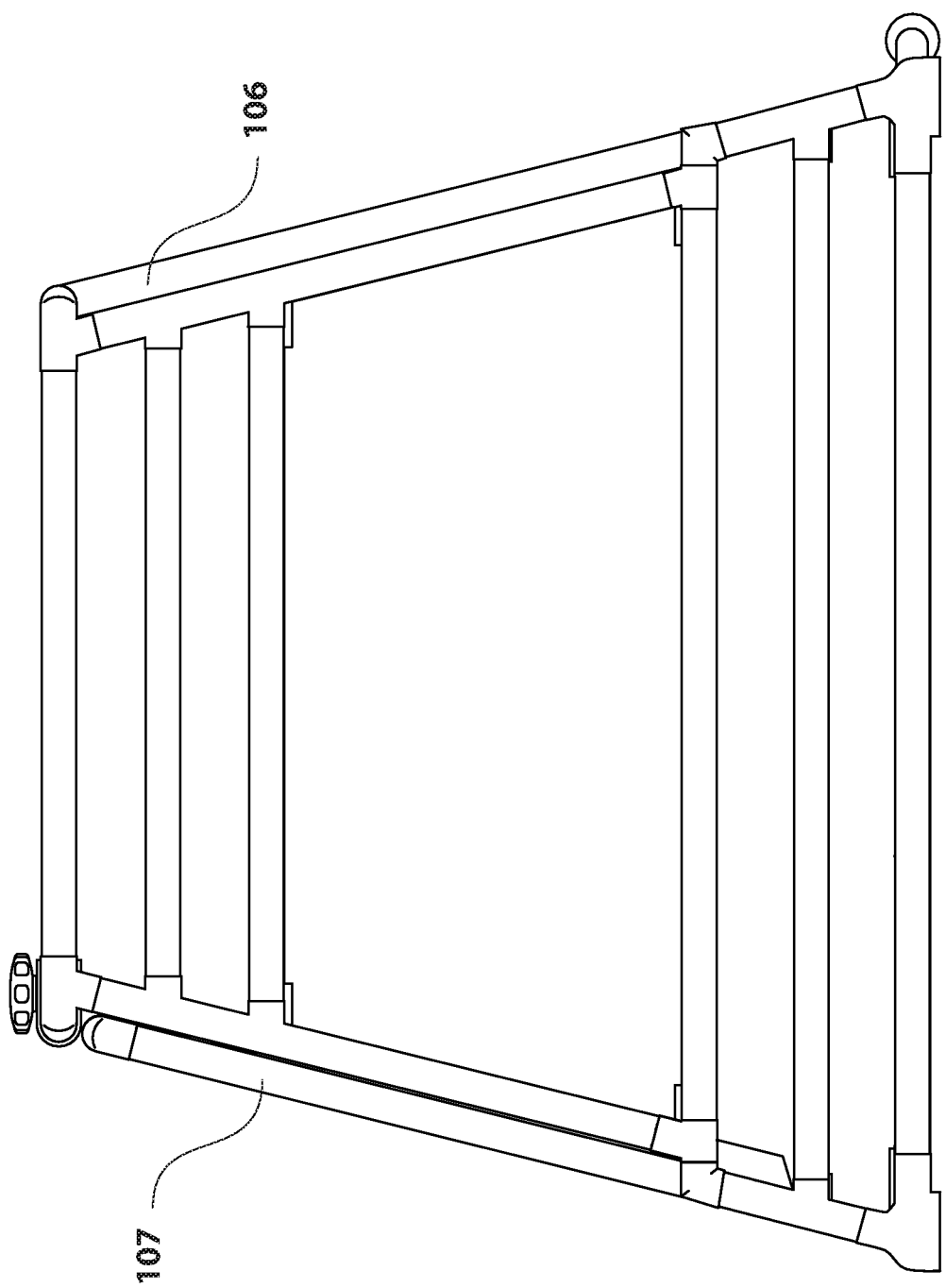

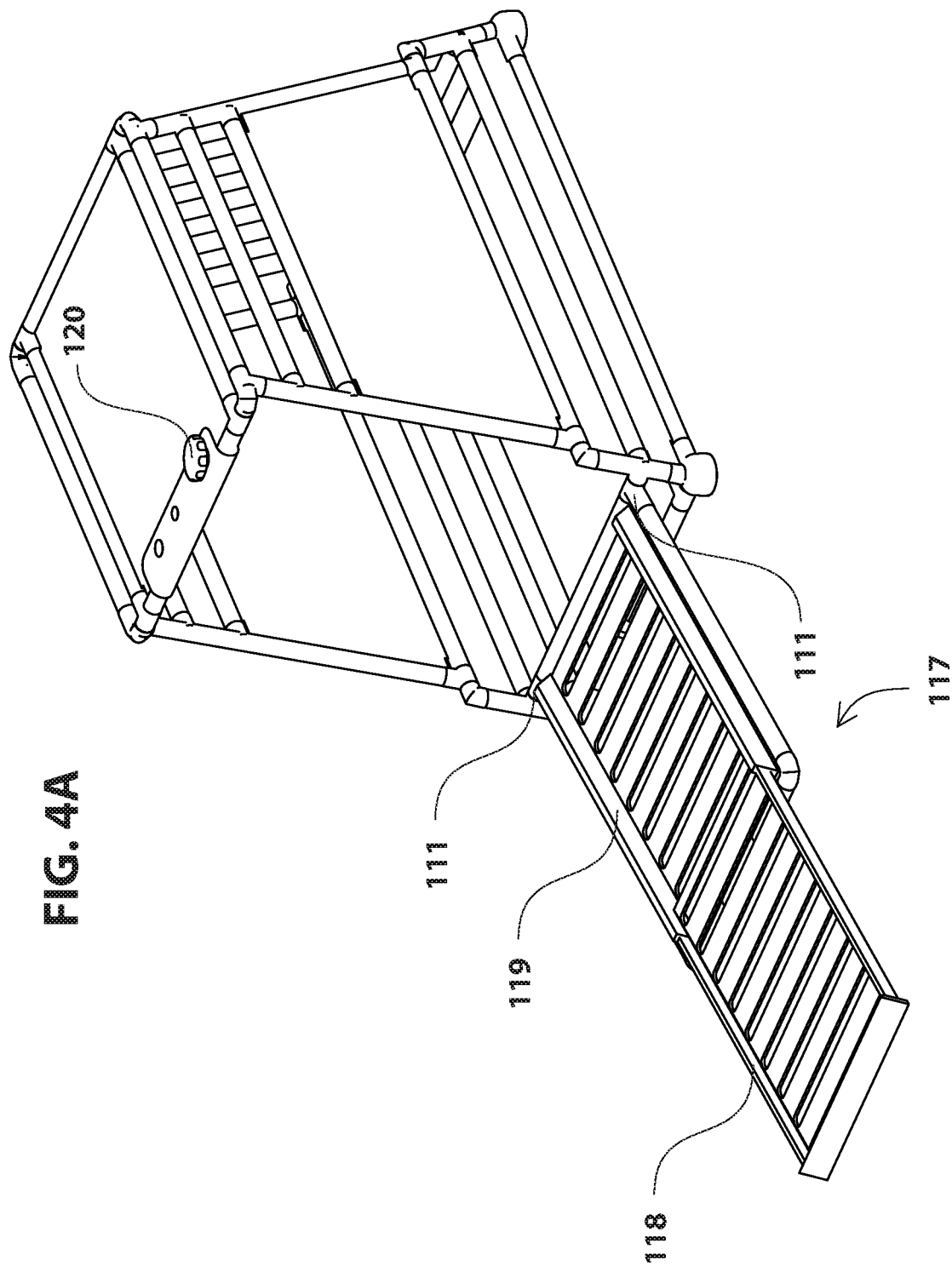

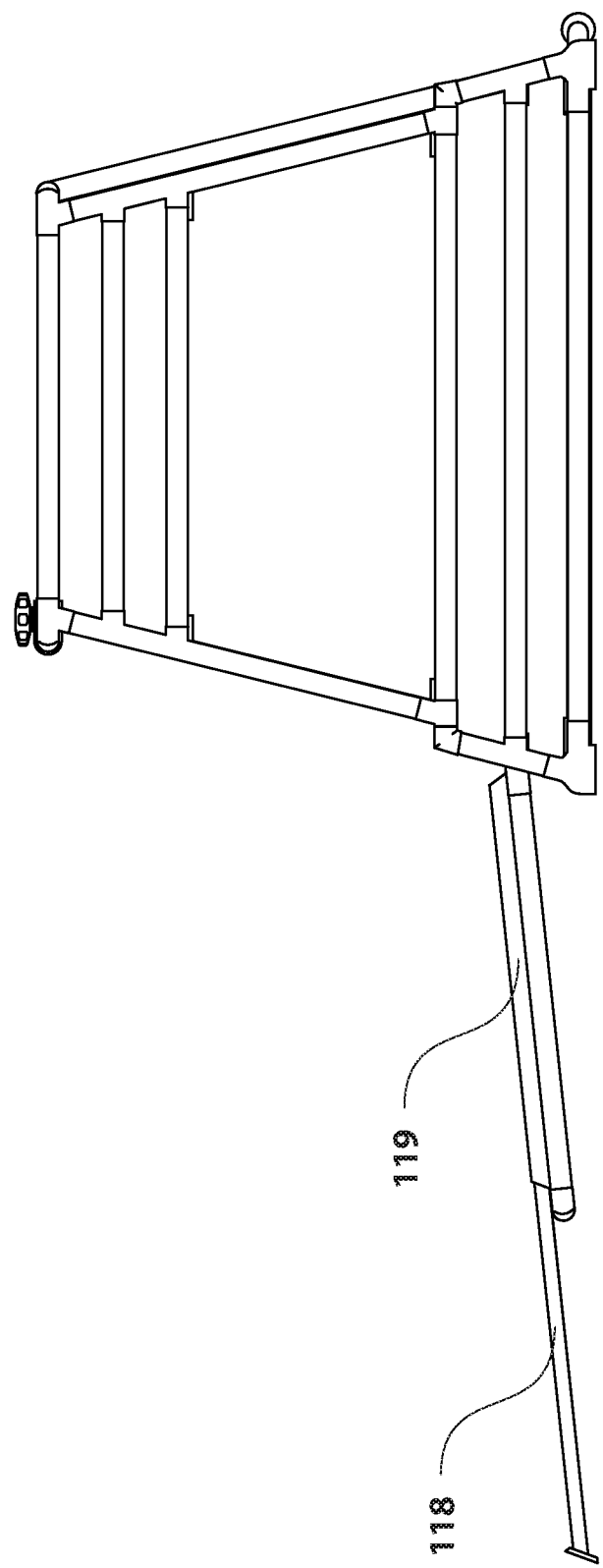

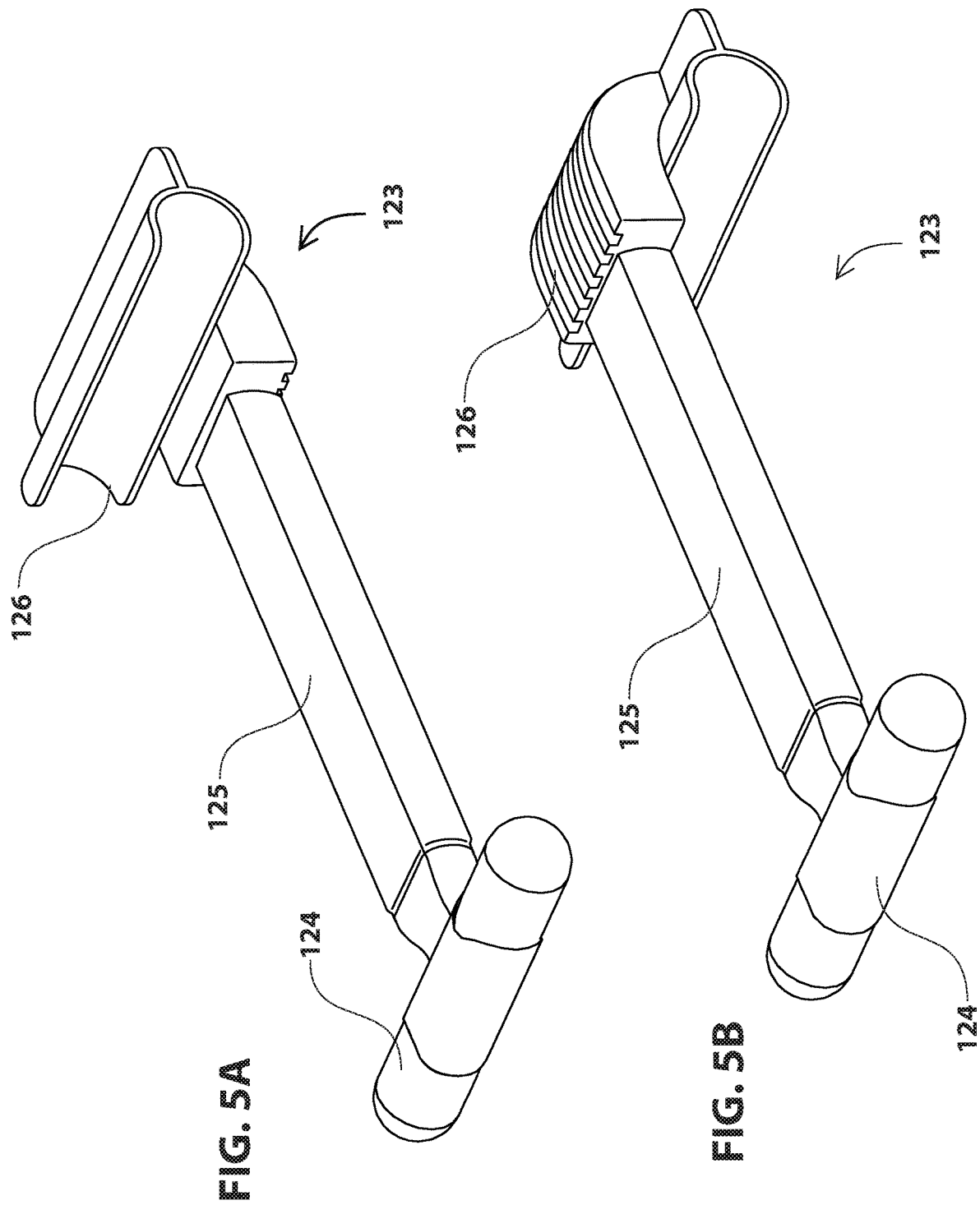

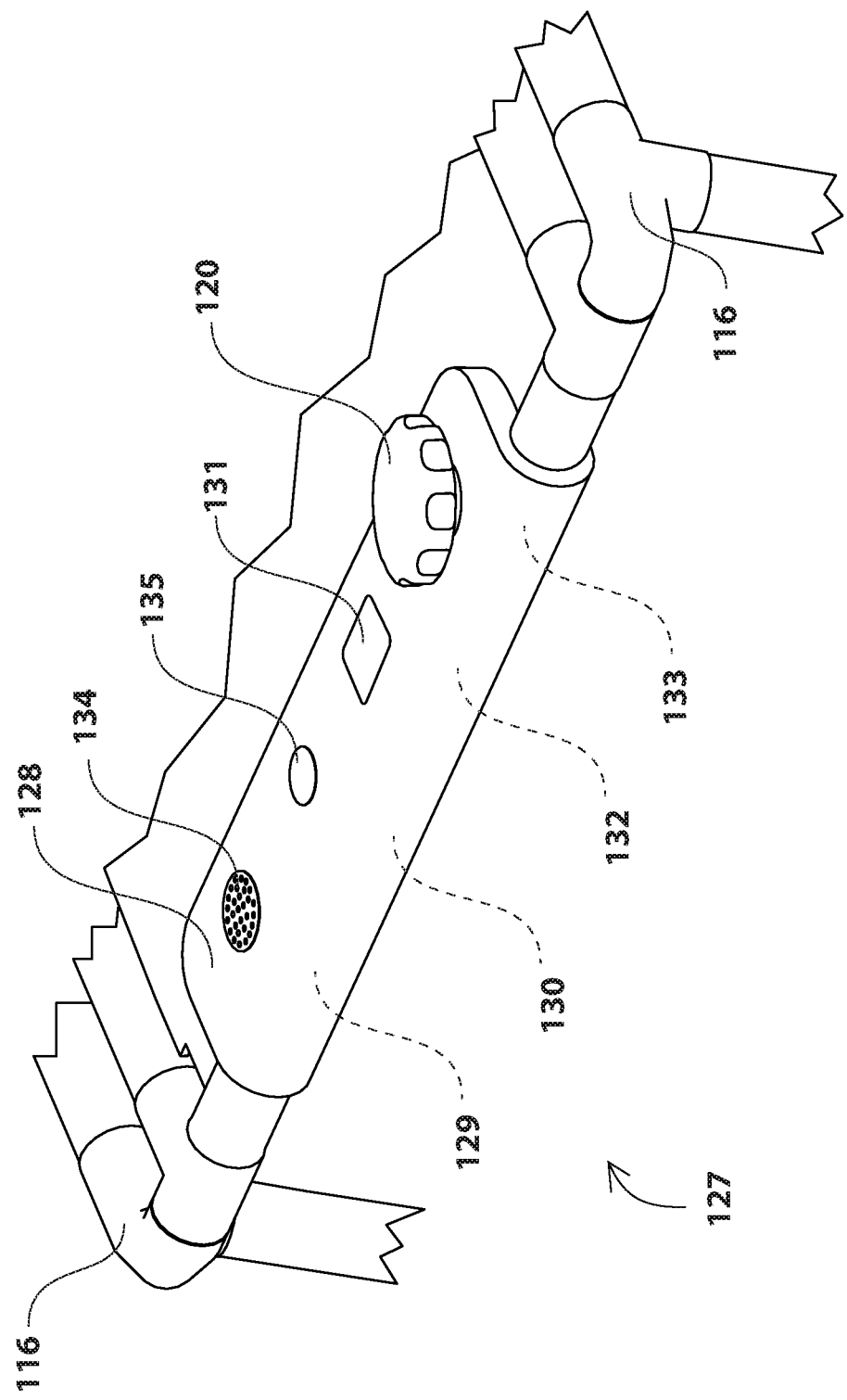

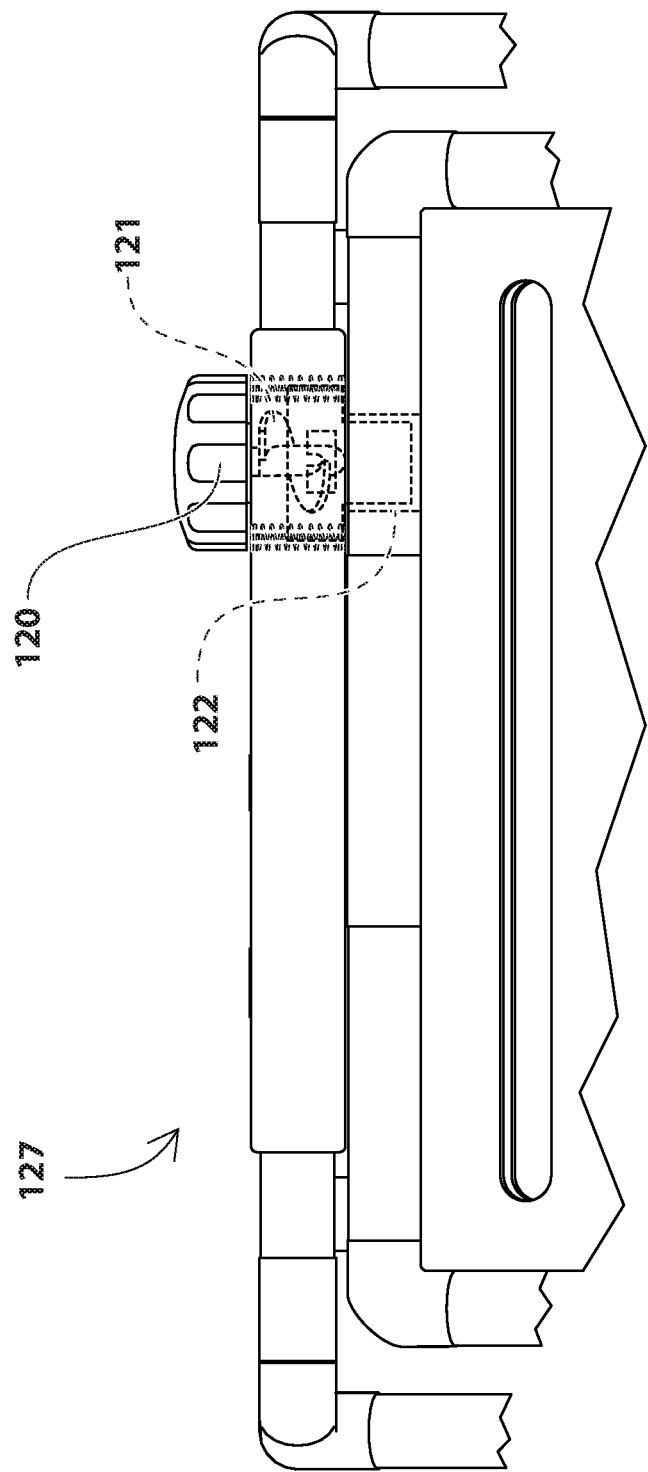

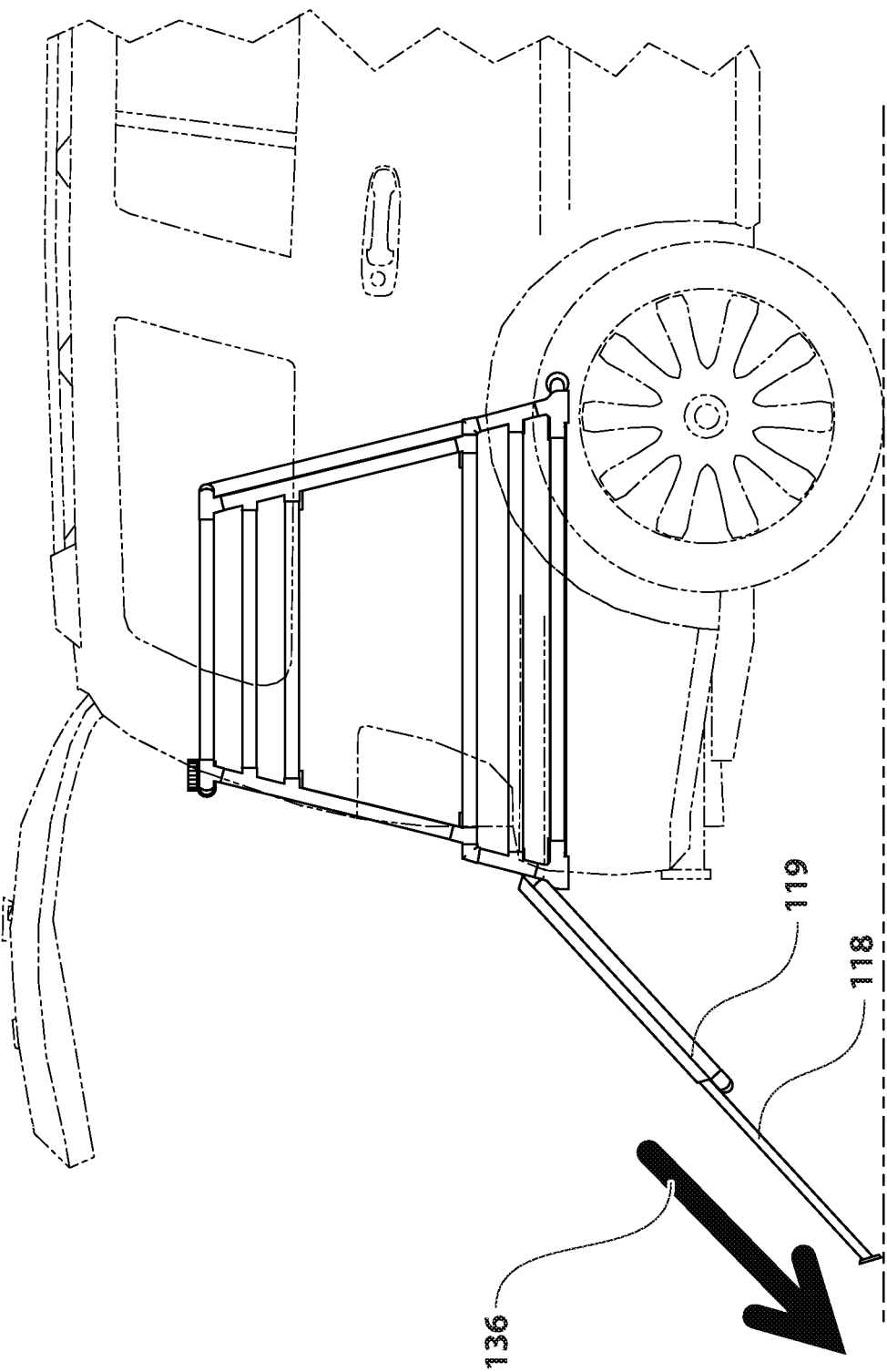

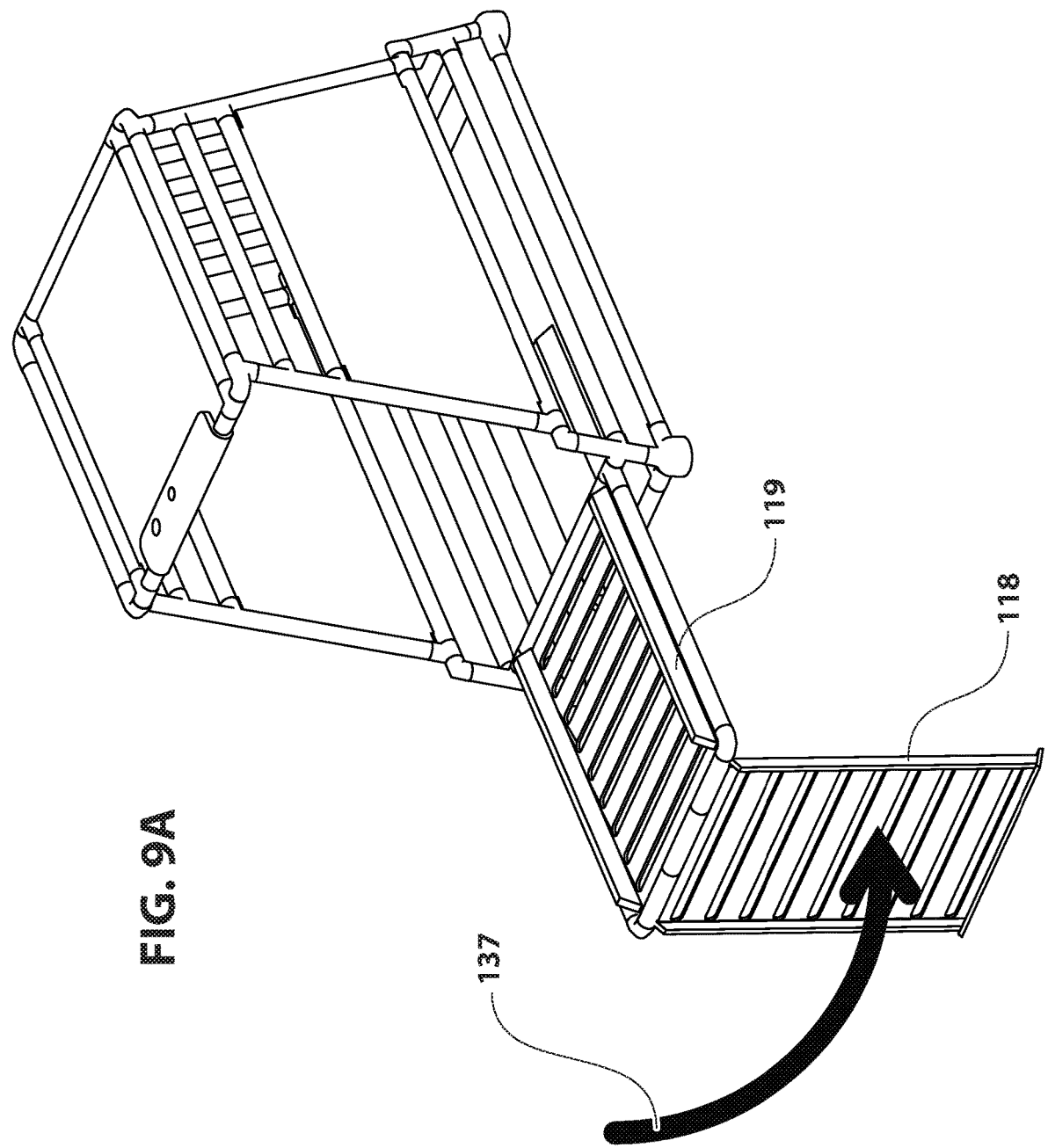

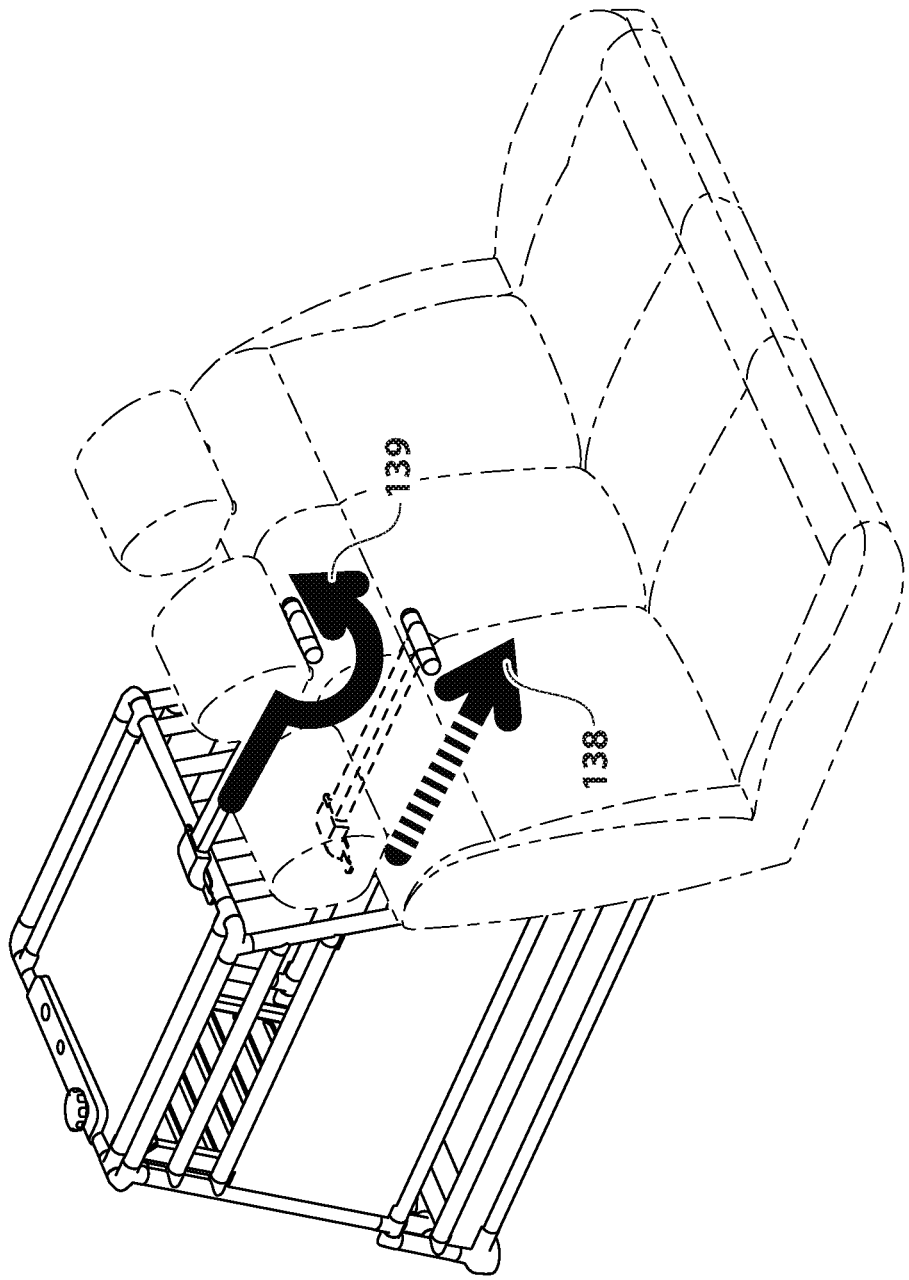

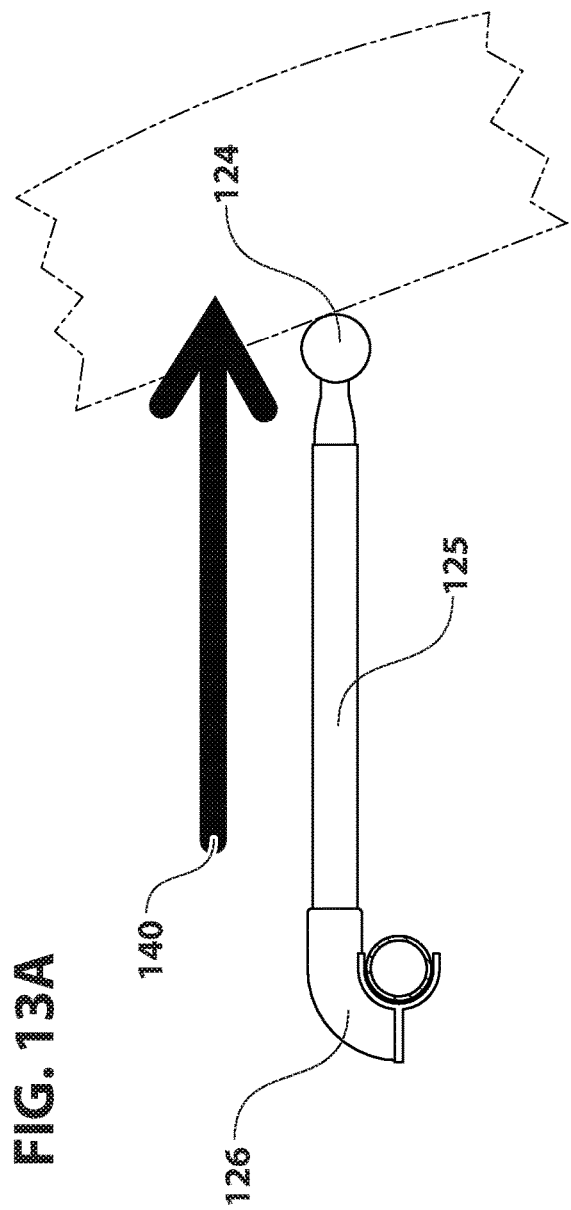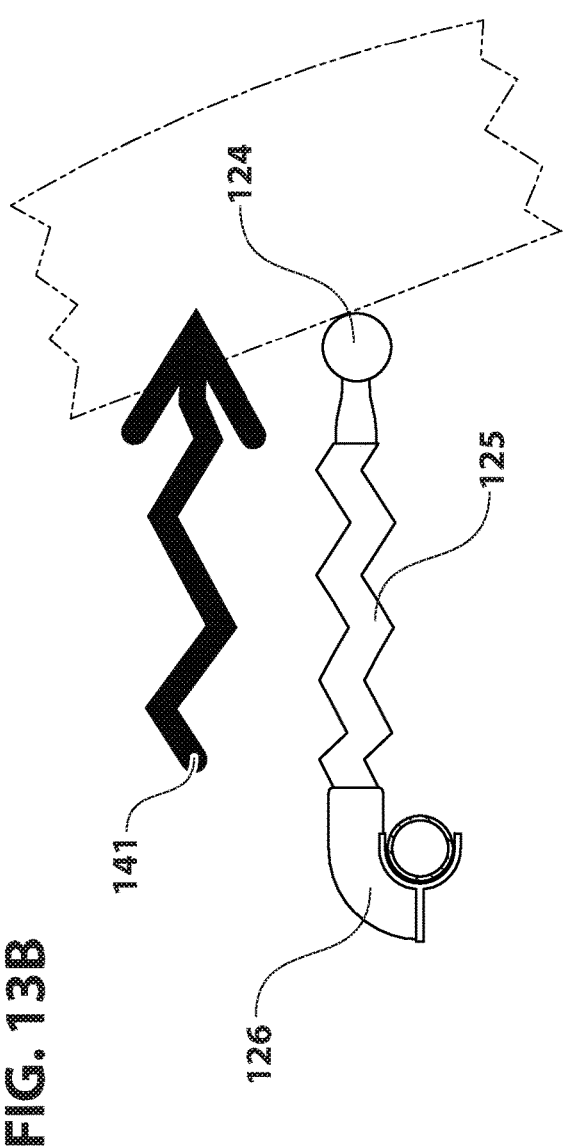
FIG. 13A
FIG. 13B

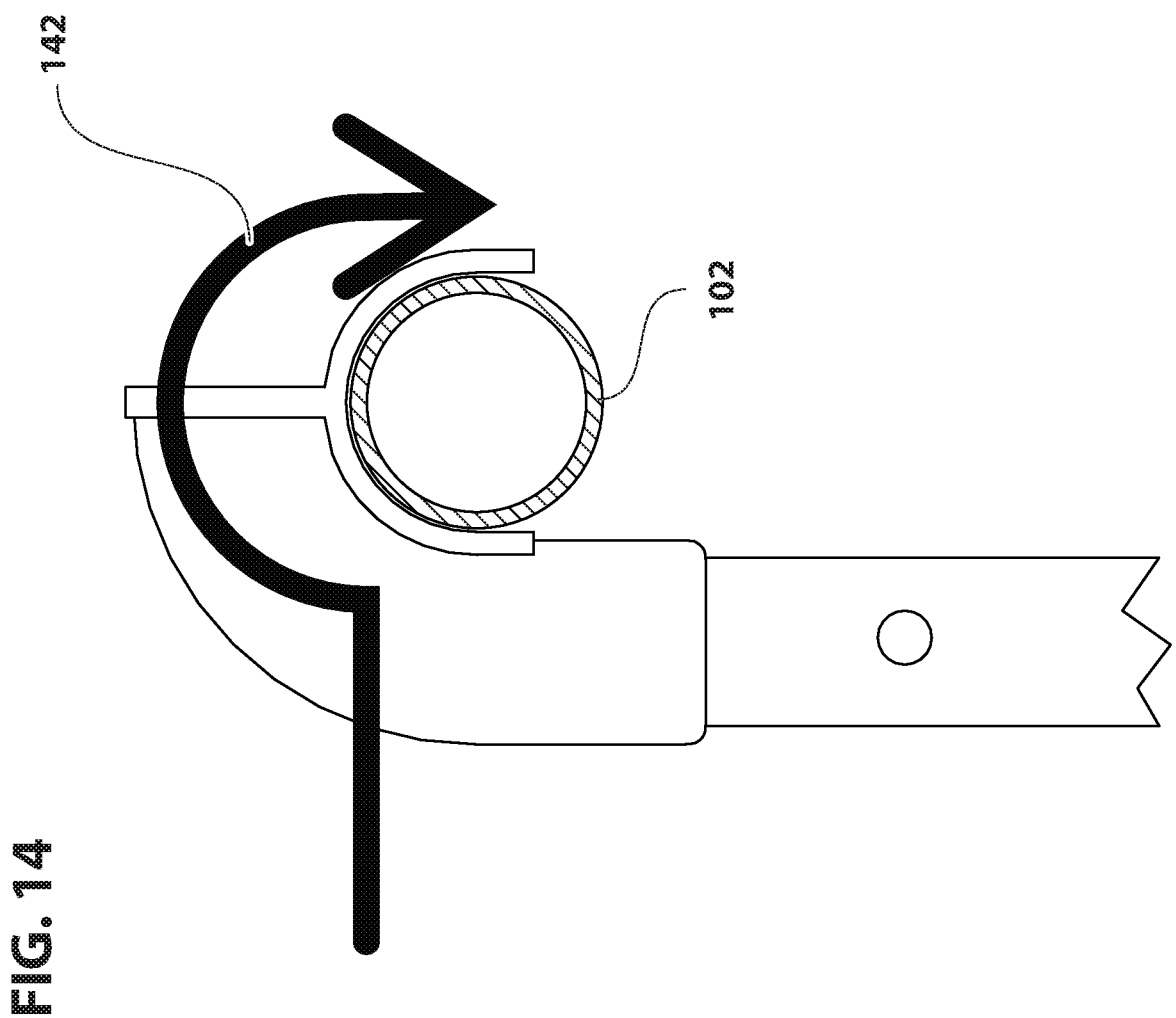

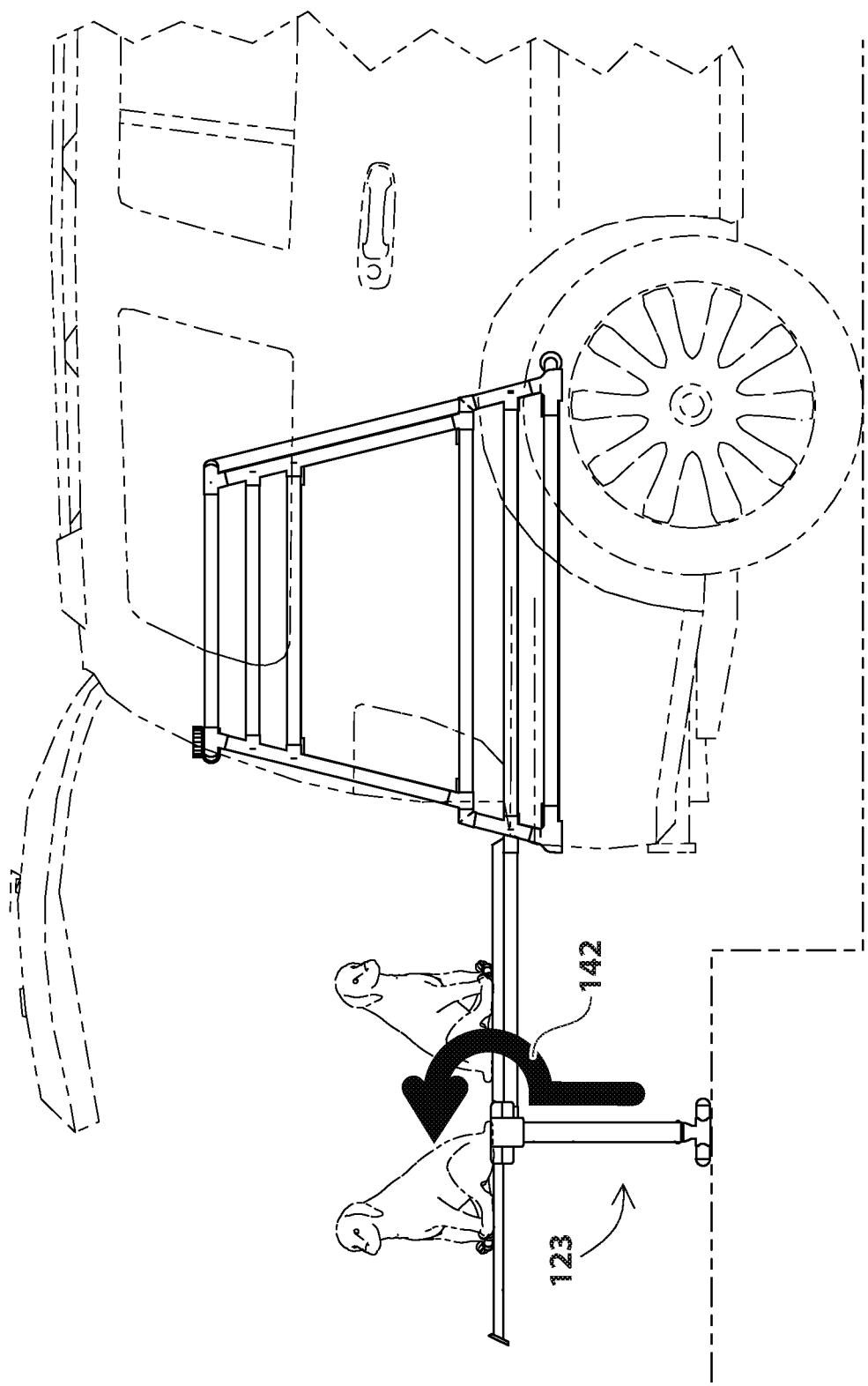

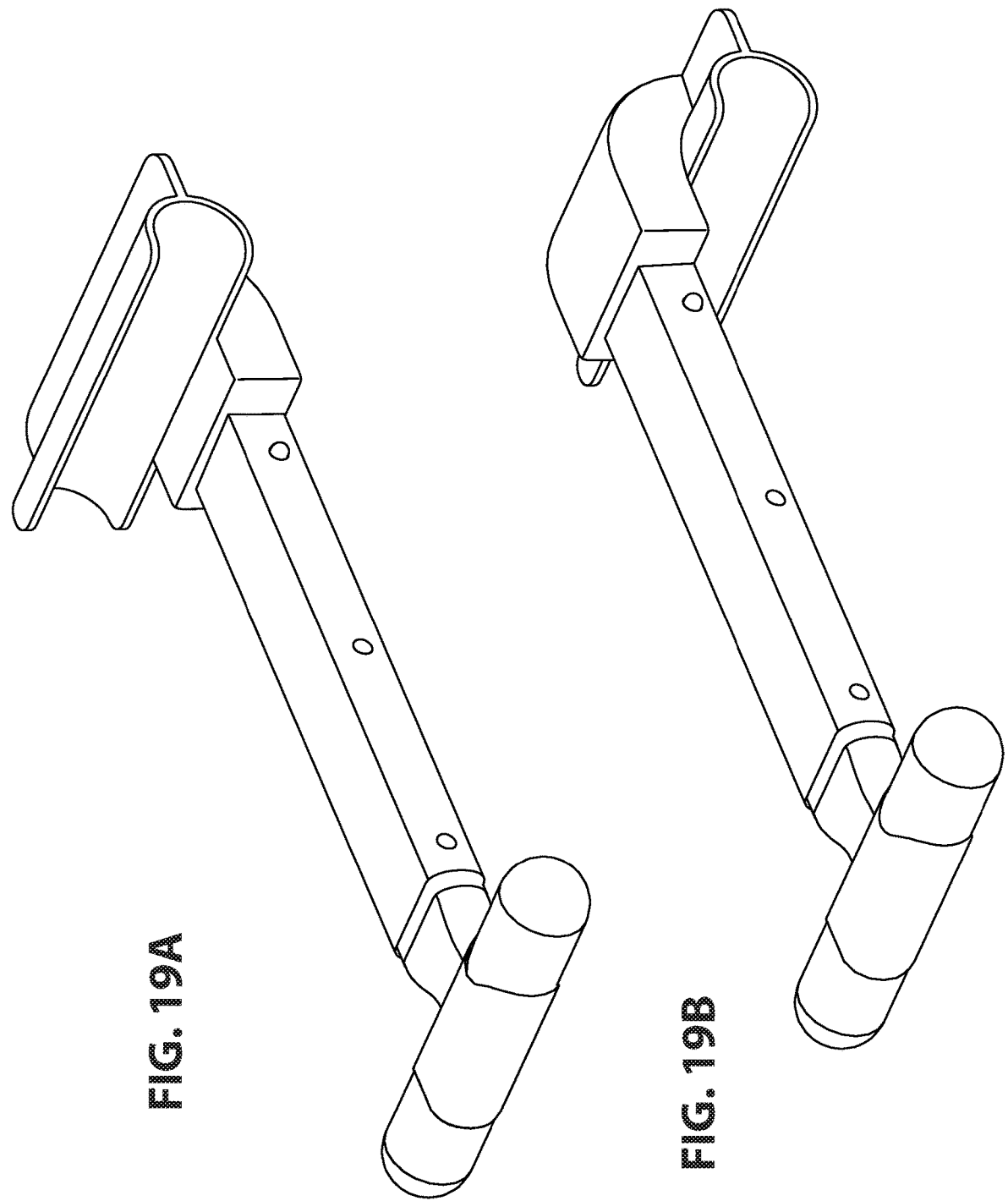

MULTI-FUNCTIONAL PET CRATE

1. FIELD OF THE INVENTION

The present invention relates to a pet crate, which is cheap to produce, is easy to ship as one unit, requires little assembly, and can be quickly and easily be unfolded. Particularly, the present invention relates to a crumplable rollable collapsible drying-grooming-platform-patio-crumple-zone-ramp-and-door pet crate, having:

1) Pet-safety-oriented panel system,
2) Multi-function drying-grooming-platform-patio-crumple-zone-ramp-and-door system,
3) Multi-function detachable storable seatback-attachable headrest-attachable leg-handle system, and
4) Temperature-sensor alarm system.

2. DESCRIPTION OF THE PRIOR ART

A number of pet crates have been introduced.

U.S. Pat. No. 1,550,829, issued 1924 Aug. 20, to Dwight D. McBride, relates to a dog crate which is mounted on the running board of an automobile so that a sportsman may transport his hunting dog to any desired place without the inconvenience of shipping. Another object of the invention is the provision of a dog crate which is slightly in appearance and which may be readily mounted upon and detached from the running board of an automobile without disfigurement of either the create or the automobile.

U.S. Pat. No. 2,790,414, issued 1957 Apr. 30, to August W. Rossow, relates to a portable pet house by means of which pets and other animals may be hygienically, comfortable and safely housed and may be readily and easily transported. A further object of the invention is to provide a portable pet house in accordance with the preceding object having an improved means for rendering the same portable, and especially to facilitate the carrying of the device by a handle in a level position, and to facilitate the resting of the same upon the floor in a level position and facilitating subsequent movements of the device over the floor.

U.S. Pat. No. 3,481,311, issued 1969 Dec. 2, to Pearl L. Schluttig, describes a pet carrier which can readily be converted into a compact unit for storage purposes. The carrier is so constructed that side and top wall members thereof can be folded to a collapsed position, and so that, in normal use, it permits one of the doors to function as a ramp to the carrier. The present invention relates generally to a collapsible pet carrier, and, in particular, to a per carrier which can be folded into a compact unit when not in use of for storage, and which can be readily erected when desired, for use in transporting small animals such as dogs and cats.

U.S. Pat. No. 3,785,344, issued 1974 Jan. 15, to Carol M. Patterson, describes a cage apparatus for confining an animal within a cage and preventing undesired movement of the cage including an animal cage having wheels mounted at the rear thereof, resilient support means mounted at the front of the cage to support the cage and to provide reaction forces in substantially the opposite direction from forces exerted by the animal in the cage such that the cage tends to move in substantially one direction only; and, transport means for connection to the front end of the cage to render the cage transportable.

U.S. Pat. No. 3,797,461, issued 1974 Mar. 19, to Earl W. Breeden, discloses a pet house which has a dual function of a piece of piece of furniture, attractive enough that it can be placed in any part of the living quarters of the human owner but may be readily converted to an attractive pet house by either lowering a side or unfolding the top to provide a ramp for the pet to enter. The floor of the pet house has bedding material placed therein to provide a comfortable bedding arrangement for the pet and the surrounding walls provide a feeling of security to that the pet can sleep without disturbance.

U.S. Pat. No. 4,140,080, issued 1979 Feb. 20, to Howard T. Snader, describes a portable combined animal cage and exercising device composed of open work material, such as wire mesh or the like, to provide ample ventilation at all times. The device is formed of a plurality of telescopic sections or units, preferably three or more, which may be telescoped to facilitate carrying or may be expanded to allow ample space for exercising or other purposes. One or more of the sections or units, preferably the end sections, may be provided with doors or the like, each having fastening means. The sections are separable, and one at least of the end sections may be separately used as a cage. Each section, or unit may be provided with readily removable doors or closures having releasable fastening means whereby each of the sections may be separately used as a portable cage.

U.S. Pat. No. 4,484,540, issued 1984 Nov. 27, to Yoshikazu Yamamoto, relates to an improved construction of a collapsible, portable domestic pet cage for carrying with a pet keeper such domestic pets as dogs, cats and the like, wherein bent portions of the cage can be readily constructed without using any connecting means and fixing means, and when collapsed dimensionally in a small form, the whole circumferential walls of the cage is accommodated between vertical walls of ceiling plate and erected walls of receptacle plate or dish so as to be made dimensionally in a small size.

U.S. Pat. No. 4,852,520, issued 1989 Aug. 1, to Charles R. Goetz, relates to a portable pet carrier having a lower section and a removable upper section attached thereto. The lower section has a bottom wall, spaced side walls, a rear wall and a front wall with an access opening, and the upper section has a top wall, spaced side walls, a rear wall and a front wall with an access opening. The upper section and the lower section are attached by clips which extend through aligned openings in horizontal lips extending outwardly from the edges of the walls of both sections. A gate is pivotally mounted in the access openings in the front walls of the upper section and the lower section, and a latch is located on the gate for retaining the gate in the closed position. A plurality of rollers are carried on the exterior of the bottom wall of the lower section, and lifting and towing handles are pivotally attached to the exterior of the top wall of the upper section for moving the portable pet carrier.

U.S. Pat. No. 5,113,793, issued 1992 May 19, to Harvey G Leader, relates to a mobile animal carrier having a cage-like enclosure mounted on a specially-designed carriage with wheels for holding and transporting the enclosure, the carriage having a handle to make pushing easy for the pet owner. The enclosure contains an access, preferably consisting of at least one door in a front end of the enclosure for inputting and removing a pet or other animal. A canopy is provided to cover the enclosure, said canopy having a fastener for adjustably opening the canopy as desired. The enclosure is designed to be removable from the carriage and collapsible for easy storage and transporting when not in use. Similarly, the carriage can be folded for easy storage and transportation as well.

U.S. Pat. No. 5,784,995, issued 1998 Jul. 28, to Jonathan Willinger, relates to a pet bed which includes a core of soft bedding material and a porous cover mounted over the bedding material. An opening is formed in the cover for receiving a removable porous cartridge. The cartridge is filled with any of a number of agents such as deodorants and insect repellents such as cedar wood chips. A retainer such as a pouch is provided between the cover and the bedding material for fixing the cartridge in a central location over which a pet rests.

U.S. Pat. No. 6,119,634, issued 2000 Sep. 19, to Kenneth W. Myrick, outlines a pet ramp assembly which includes a pair of elongated, molded first and second ramp components hinged together at adjoining ends by a simple pivot pin. A pair of side-locking pins serve the dual purpose of locking the folded structure together and alternatively locking the extended ramp-forming structure in its extended configuration while simultaneously providing additional structural support at the pivot point. The apparatus is made of lightweight, injection molded plastic material, and is provided with a non-slip surface on its upper side. The ground-engaging end and vehicle-engaging end are also specially configured to prevent slippage and dislodgment during use. The apparatus also includes disconnectable legs for allowing the ramp assembly to be used as a grooming table, examination table, game-cleaning table etc.

U.S. Pat. No. 6,230,656, issued 2001 May 15, to Christopher E. Walach, outlines a pet carrier which includes a cage like enclosure having a top, a bottom, a front end, and an opposite rear end. Two spaced wheels are connected to the cage like enclosure at the bottom rear end so that when the front end is lifted off of a support surface, the pet carrier can be rolled. A handle is pivotally connected to the cage like enclosure at the top near the front end. The handle is selectively lockable in a plurality of angular positions allowing the height of the handle to be adjusted to accommodate users of different heights.

U.S. Pat. No. 6,267,082, issued 2001 Jul. 31, to Richard L. Naragon, refers to a sturdy, portable, relatively light weight ramp which is provided for assisting an animal in inclined walking between two different levels. The ramp comprises two relatively narrow alignable ramp sections which are centrally hinged and designed to cause their edges adjacent the hinging to firmly abut and be interlocked. The ramp is transportable in a compact first condition in which it is folded at the hinge with the undersides of the two sections in a parallel, back-to-back folded state. When used to support an animal, it is unfolded and the two hinged sections are aligned and firmly locked in an aligned second animal-supporting condition. The hinge and locking interconnection are relatively closely toleranced so as to provide a stable linearly-extending ramp capable of supporting heavy large as well as light small pets. Carpeting is provided on the walking surface for traction, and a strap may be used to tie the ramp to a vehicle and further stabilize it, thereby overcoming any fear an animal may have in traversing the ramp.

U.S. Pat. No. 6,612,261, issued 2003 Sep. 2, to James P. Mazrolle, refers to a structure for training and exercising canines which is disclosed having a first and a second inclined surface joined at a hingeable joint. The first surface has generally parallel sides and the second surface has a first region having generally parallel sides and a transition region. The transition region having a first dimension corresponding to the dimension of the first surface and a second dimension corresponding to the dimension of the first region.

U.S. Pat. No. 6,732,676, issued 2004 May 11, to Douglas C. Smith, refers to an integrated pet storage crate and grooming table. The integrated table includes a structure having a pet storage area covered by an openable gate, an equipment storage area for storing equipment, a horizontal surface resting on a top portion of the pet storage area and the equipment storage area, and a grooming surface rotatably connected to the horizontal surface. The grooming surface, which may be optionally covered with a material, covers the equipment storage area in a vertical orientation and is rotated upwardly to a horizontal orientation against the horizontal surface to provide an area for grooming a pet. The structure also includes a plurality of wheels mounted on a bottom surface of the structure allowing mobility of the structure. In addition, a telescopic ramp is mounted under the bottom surface of the structure to facilitate movement of the structure.

U.S. Pat. No. 7,621,236, issued 2009 Nov. 24, to Sue Steffey, demonstrates a folding pet ramp and step apparatus which is described. The apparatus includes a frame supporting an upper platform member and a lower platform member. The lower platform member has a lower riser and a lower runner. The upper platform member has an upper riser and an upper runner which are movable between a ramp mode and a step mode. The upper riser fixedly supports the upper runner against the frame when in the step mode, and is moveable from the fixedly supported position to permit the upper runner to move to the ramp mode.

U.S. Pat. No. 7,878,150, issued 2011 Feb. 1, to Dan Dietz, demonstrates a multi-purpose furniture structure and system which may be used for caring for an animal throughout the life of the animal. For small animals such as puppies, this furniture system may be used to train the animal to behave in a desired manner. Animal toys are stored in the animal living space as well. Animals may use a detachable ramp member to climb to the top of the furniture structure. The ramp is extendable allowing for the ability to vary the length of the ramp. This feature enables the owner to change the angle of inclination of the ramp to accommodate animals that may have difficulty climbing steeper ramp inclines. For larger or older animals, the extendable ramp may serve as a bed or as a means to help the animal get into the bed of the owner. The furniture piece may be positioned adjacent an owner's bed.

U.S. Pat. No. 8,117,994, issued 2012 Feb. 21, to Troy K. Goodlow, demonstrates an animal ramp apparatus which includes a panel that has a top side, a bottom side, a first end, a second end, a first lateral edge and a second lateral edge. A base frame includes a front wall, a rear wall, a first side wall and a second side wall. The first end of the panel is pivotally coupled to the base frame adjacent to the rear wall. The second end of the panel is selectively pivoted upwardly from the frame to define a deployed position. A support member is pivotally attached to the frame and supports the panel in the deployed position at a selected angle relative to the base frame.

U.S. Pat. No. 8,544,417, issued 2013 Oct. 1, to Douglas L. Sangl, demonstrates a system for housetraining pets through the use of separated sleeping and waste areas contained within a pet cage. The cage encloses a waste tray section that runs along the floor of the cage, which holds an absorbent pad, secured by improved retention clips, for collecting pet waste that can be removed and replaced when soiled. A bedding area made of up a rectilinear frame covered in bedding material is raised above the floor of the cage by engaging frame extensions with perforations in the exterior of the cage. The system and associated method serve to aid in conditioning a pet for proper housetraining while the pet is confined to a cage.

U.S. Pat. No. 9,521,826, issued 2016 Dec. 20, to Gary Rybka, defines a wire crate comprising a top panel, a bottom panel, a front panel, a back panel, and a pair of side panels oppositely disposed from one another. The crate also includes a front opening defined in the front panel. The front opening is configured to provide access to the interior of the crate. The crate further includes a pair of tracks coupled to each side of the front opening and a door slidably coupled to the pair of tracks. The door slides along the pair of tracks between an open position and a closed position.

U.S. Pat. No. D734,570, issued 2015 Jul. 4, to T. Daniel Hawk, depicts an ornamental design for a pet ramp.

U.S. Pat. No. D736,484, issued 2015 Aug. 11, to Todd M. Jakubowski, depicts an ornamental design for a free standing pet ramp.

U.S. Pat. No. D756,573, issued 2016 May 17, to Chris Jakubowski, depicts an ornamental ornamental design for a pet ramp with reflective markings.

U.S. Publication No. 20060150346, published 2006 Jul. 13, by Kenneth W. Myrick, reveals a portable ramp and load support assembly including a pair of rigid, elongated, first and second ramp components hinged together at adjoining ends by a simple pivot pin. The apparatus is made of light-weight, injection molded plastic material, and is provided with a resilient, non-slip surface on its upper side. The ground-engaging end and vehicle-engaging end are also specially configured to prevent slippage and dislodgment during use. The assembly also includes a plurality of accessory parts that enable the ramp to have utility in numerous applications other than its use as a ramp. The assembly provides a sturdy, light-weight, long-lasting and easily cleanable ramp apparatus suitable for use by dog and other large animal owners with SUVs, pickups, RV's and station wagons. The assembly also includes disconnectable legs for allowing the ramp apparatus to be used as a grooming table, examination table, game-cleaning table, etc. Furthermore, floats, wheels, pull handles and other accessories can be attached to extend the utility of the apparatus.

U.S. Publication No. 20070006816, published 2007 Jan. 11, by Dan Dietz, reveals a multiple function animal furniture structure and method for providing housing to an animal which are disclosed. In an embodiment, the multiple function animal furniture structure comprises a plurality of sides. The plurality of sides comprises a top side, a bottom side, a back side, a front side, and at least one side wall. The front side comprises a front side opening. In addition, at least one of the sides comprises an opening comprising a character shape. The multiple function animal furniture structure further comprises a detachable and extendable ramp member, wherein the ramp member provides a surface suitable for an animal to climb to the top side.

U.S. Publication No. 20090038558, published 2009 Feb. 12, by Dan Schulte, reveals a vehicle-suspended pet trailer which is disclosed that includes at least one entry and exit facilitator and/or at least one storage tray, accessible through a cargo access door at the top of the trailer, for storing and transporting pet-related and other cargo. The pet trailer comprises a pet carrying box attached to the top of a mounting bar that can be docked with a trailer hitch attached to a vehicle. The trailer further comprises at least one entry and exit door on at least one side of the pet carrying box. In preferred embodiments, an entry and exit facilitator, such as a ramp or staircase, can be deployed between the ground and the at least one door when the pet trailer is docked with a vehicle and can be telescopically withdrawn into a door when not deployed. In some embodiments a trailer hitch ball can be docked with the mounting bar.

U.S. Publication No. 20100089336, published 2010 Apr. 15, by Mark A. Flannery, depicts a pet crate having a top, a bottom, and a cage between the top and bottom. The cage can be engaged to and disengaged from each of the top and bottom. When engaged to the top and bottom, or when disengaged from either one or both of the top and bottom, the cage is endless and can safely hold a pet therein. When disengaged from the top and bottom, the cage is foldable into a closed, endless and flat configuration such that the cage can be stored between the top and bottom such that the crate as a whole in such stored configuration is generally flat. When disengaged from the top and the bottom, the cage is foldable out into a fence configuration by disconnecting two ends of the cage.

U.S. Publication No. 20100192870, published 2010 Aug. 5, by Anthony Wood, depicts an airline approved pet carrier which includes retractable wheels that leave the exterior surface of the carrier smooth. Other components of the carrier are positioned in a recess in the carrier to maintain a smooth exterior surface. The wheels are quick to deploy and include a positive mechanism to keep them in the stowed and the deployed positions.

U.S. Publication No. 20110308476, published 2011 Dec. 22, by Jui Yang Chang, reveals a shelter which includes a base member having a bottom wall panel, a rear wall panel and a front wall panel foldably coupled to the bottom wall panel with folding lines, an upper member having a top wall panel and two opposed side wall panels foldably coupled to the top wall panel with folding lines, the side wall panels of the upper member are secured to the bottom wall panel of the base member for forming a three-dimensional structure, the front wall panel and the rear wall panel of the base member are selectively latched to the top wall panel and the side wall panels of the upper member, the base member and the upper member each include a number of air circulation openings, and each include a number of reinforcing curved portions.

U.S. Publication No. 20140123910, published 2014 May 8, by Brooks Rorke, reveals a pet ramp/step devices and associated methods, including a frame supporting at least one platform member. The at least one platform member includes a riser and a runner which are movable between a ramp mode configuration and a step mode configuration. The frame further includes a telescoping handle which is extendable relative to the frame based on a height of the supporting structure against which the telescoping handle is positioned. The frame includes a frame hinge for folding the frame into a folded position and a frame locking mechanism for locking the frame in the folded position. The riser fixedly supports the runner against a pair of riser supports of the frame when positioned in the step mode. The runner is further supported by the pair of riser supports when positioned in the ramp mode.

U.S. Publication No. 20160014994, published 2016 Jan. 21, by Yaomin Ma, reveals a foldable bag frame and a pet bag using the same are presented. The foldable bag frame includes four top support bars connected end-to-end in sequence, four bottom support bars connected end-to-end in sequence, and connecting rods. Each of the connecting rods consists of two hingedly-connected short-segment connecting rods. The foldable bag frame further includes a sleeve slidable along the connecting rod, and a spring fixedly connected to one end of the sleeve and sleeved over an outer side of the connecting rod, the other end of the spring being connected to the non-fixed end of a short-segment connecting rod. When the spring is in an initial state, the sleeve connected thereto covers the hinged portion of the connecting rod. By controlling foldability of the connecting rods, folding of the frame is conveniently achieved, making it possible to use a strong rigid material for the frame to meet stability during use.

DISADVANTAGES OF THE PRIOR ART

The prior art have failed to solve many problems associated with such pet crates, as follows:
1) No prior art mention or disclose any pet crates, having an inner drying-grooming-platform-patio-crumple-zone-ramp-and-door 118.
Therefore, the prior art of pet crates:
   a) Can not be used as a drying platform for pets,
      to dry pets after bathing
      (see FIG. 9B, FIG. 12, and FIG. 17C);
   b) Can not be used as grooming platform for pets,
      to groom pets
      (see FIG. 9B, FIG. 12, and FIG. 17C);
   c) Can not be used as a patio for pets,
      to give a place for pets to rest
      (see FIG. 9B, FIG. 12, and FIG. 17C);
   d) Can not be used as a crumple zone,
      to help protect pets in a collision
      (see FIG. 9B, FIG. 12, and FIG. 17C);
   e) Can not slidably be used as a ramp for pets to conveniently safely quickly and easily enter and exit,
      pulled out
      in the direction of the arrow 136
      to make entry and exit of the crate easier
      (see FIG. 3A, FIG. 3B, FIG. 4A, FIG. 4B, FIG. 8A, FIG. 8B, FIG. 18, FIG. 22A, FIG. 22B, and FIG. 22C); and
   f) Can not be used as a leg,
      in the direction or arrow 137
      to provide support for multi-function drying-grooming-platform-patio-crumple-zone-ramp-and-door system
      (see FIG. 9A, FIG. 9B, FIG. 12, and FIG. 17C).
2) No prior art mention or disclose any pet crates, having an outer drying-grooming-platform-patio-crumple-zone-ramp-and-door 119.
Therefore, the prior art of pet crates:
   a) Can not be used as a drying platform for pets,
      to dry pets after bathing
      (see FIG. 9B, FIG. 12, and FIG. 17C);
   b) Can not be used as grooming platform for pets,
      to groom pets
      (see FIG. 9B, FIG. 12, and FIG. 17C);
   c) Can not be used as a patio for pets,
      to give a place for pets to rest
      (see FIG. 9B, FIG. 12, and FIG. 17C);
   d) Can not be used as a crumple zone,
      to help protect pets in a collision
      (see FIG. 15A, FIG. 15B, FIG. 16A, and FIG. 16B); and
   e) Can not be used as a ramp for pets to conveniently safely quickly and easily enter and exit,
      to make entry and exit of the crate easier
      (see FIG. 3A, FIG. 3B, FIG. 4A, FIG. 4B, FIG. 8A, FIG. 8B, FIG. 18, FIG. 22A, FIG. 22B, and FIG. 22C).
3) No prior art mention or disclose any pet crates, having two drying-grooming-platform-patio-crumple-zone-ramp-and-door hinges 111.

Therefore, the prior art of pet crates:
   a) Can not be used with outer drying-grooming-platform-patio-crumple-zone-ramp-and-door 119 to create a door,
      to provide security to pets
      (see FIG. 3B, FIG. 3C, FIG. 3D, and FIG. 3E,);
   b) Can not be used with inner drying-grooming-platform-patio-crumple-zone-ramp-and-door 118 and outer drying-grooming-platform-patio-crumple-zone-ramp-and-door 11 to create a grooming platform,
      to allow pets a place to be groomed
      (see FIG. 3B, FIG. 3C, FIG. 3D, and FIG. 3E,);
   c) Can not be used with inner drying-grooming-platform-patio-crumple-zone-ramp-and-door 118 and outer drying-grooming-platform-patio-crumple-zone-ramp-and-door 11 to create a drying platform,
      to give pets a place to dry after bathing
      (see FIG. 8A, and FIG. 8B,);
   d) Can not be used with inner drying-grooming-platform-patio-crumple-zone-ramp-and-door 118 and outer drying-grooming-platform-patio-crumple-zone-ramp-and-door 11 to create a patio,
      to give pets a place to rest
      (see FIG. 8A, and FIG. 8B,) and
   e) Can not be used with inner drying-grooming-platform-patio-crumple-zone-ramp-and-door 118 and outer drying-grooming-platform-patio-crumple-zone-ramp-and-door 11 to create a patio,
      to give pets a place to rest
      (see FIG. 8A, and FIG. 8B).
4) No prior art mention or disclose any pet crates, having a crumple-zone-ramp-and-door-locking quick-release locking pin 121.
Therefore, the prior art of pet crates:
   a) Can not lock multi-function drying-grooming-platform-patio-crumple-zone-ramp-and-door system 117,
      to provide safety and security to pets
      (see FIG. 8A and FIG. 8B);
   b) Can not unlock multi-function drying-grooming-platform-patio-crumple-zone-ramp-and-door system 117,
      to allow pets to easily exit crate
      (see FIG. 8A and FIG. 8B); and
   c) Can not automatically and springedly lock multi-function drying-grooming-platform-patio-crumple-zone-ramp-and-door system 117,
      to make the operation of ramp-and-door system 117 easier.
5) No prior art mention or disclose any pet crates, having a multi-function T-shaped handle 124.
Therefore, the prior art of pet crates:
   a) Can not provide grip for multi-function detachable storable seatback-attachable headrest-attachable leg-handle system 123,
      to make hand operation easier
      (see FIG. 5A and FIG. 5B);
   b) Can not slidably lock between to car seats,
      in the direction of arrow 138
      to prevent crate from moving during travel
      (see FIG. 10A, FIG. 11, FIG. 12A, FIG. 12B, FIG. 13A, and FIG. 13B);
   c) Can not slidably lock between headrest posts,
      in the direction of arrow 139
      to prevent crate from moving during travel
      (see FIG. 10B, FIG. 11, FIG. 12A, FIG. 12B, FIG. 13A, and FIG. 13B); and d) Can not function as a support foot for multi-function drying-grooming-platform-patio-crumple-zone-ramp-and-door system 117,
    to create a grooming platform, a drying platform, and a patio
    (see FIG. 9A, FIG. 9B, FIG. 14, FIG. 16, and FIG. 21).
6) No prior art mention or disclose any pet crates, having a multi-function I-shaped leg 125.
Therefore, the prior art of pet crates:
  a) Can not function as a crumple-zone to protect the crumplable rollable collapsible drying-grooming-platform-patio-crumple-zone-ramp-and-door pet crate,
      in the direction of arrows 140 and 141
      to provide additional safety and security to pets
      (see FIG. 12A, FIG. 12B, FIG. 13A, and FIG. 13B);
  b) Can not function as a leg to support the multi-function drying-grooming-platform-patio-crumple-zone-ramp-and-door system 117 to act as a grooming platform,
      to provide a place for pets to be groomed
      (see FIG. 16 and FIG. 21);
  c) Can not function as a leg to support the multi-function drying-grooming-platform-patio-crumple-zone-ramp-and-door system 117 to act as a drying platform,
      to provide a place to dry after bathing
      (see FIG. 16 and FIG. 21); and
  d) Can not function as a leg to support multi-function drying-grooming-platform-patio-crumple-zone-ramp-and-door system 117 to act as a patio,
      to provide a place for pets to rest
      (see FIG. 16 and FIG. 21).
7) No prior art mention or disclose any pet crates, having a panel-snap-locking hook 126.
Therefore, the prior art of pet crates:
  a) Can not lock the multi-function detachable storable seatback-attachable headrest-attachable leg-handle system 123 to top handle-attaching foldable panel 102 in multiple locations and positions,
      in the direction of arrow 142
      to provide multiple configuration options
      (see FIG. 14, FIG. 15A, FIG. 15B, FIG. 15C and FIG. 15D);
  b) Can not lock the multi-function detachable storable seatback-attachable headrest-attachable leg-handle system 123 to bottom handle-attaching panel 103 in multiple locations and positions,
      in the direction of arrow 142
      to provide multiple configuration options
      (see FIG. 14, FIG. 15A, FIG. 15B, FIG. 15C, FIG. 15D, and FIG. 16A),
      and
      to lift and tow the crumplable rollable collapsible drying-grooming-platform-patio-crumple-zone-ramp-and-door pet crate in the directions of arrows 143 and 144, respectively
      (see FIG. 16B);
  c) Can not lock the multi-function detachable storable seatback-attachable headrest-attachable leg-handle system 123 to left handle-attaching foldable panel 104 in multiple locations and positions,
      in the direction of arrow 142
      to provide multiple configuration options
      (see FIG. 14, FIG. 15A, FIG. 15 B, FIG. 15 C, and FIG. 15D); and
  d) Can not lock multi-function detachable storable seatback-attachable headrest-attachable leg-handle system 123 to right handle-attaching foldable panel 105 in multiple locations and positions,
      in the direction of arrow 142
      to provide multiple configuration options
      (see FIG. 14, FIG. 15A, FIG. 15 B, FIG. 15 C, and FIG. 15D); and
  e) Can not lock multi-function detachable storable seatback-attachable headrest-attachable leg-handle system 123 to rear handle-attaching foldable panel 106 in multiple locations and positions,
      in the direction of arrow 142
      to provide multiple configuration options
      (see FIG. 14, FIG. 15A, FIG. 15 B, FIG. 15 C, and FIG. 15D).

OBJECTS AND ADVANTAGES OF THE INVENTION

The present invention substantially departs from the conventional concepts and designs of the prior art. In doing so, the present invention provides a crumplable rollable collapsible drying-grooming-platform-patio-crumple-zone-ramp-and-door pet crate (having: a) Pet-safety-oriented panel system, b) Multi-function drying-grooming-platform-patio-crumple-zone-ramp-and-door system, c) Multi-function detachable storable seatback-attachable headrest-attachable leg-handle system, d) and Temperature-sensor alarm system) having many unique and significant features, functions, and advantages, which overcome all the disadvantages of the prior art, as follows:
1) It is an object of the new invention to provide a crumplable rollable collapsible drying-grooming-platform-patio-crumple-zone-ramp-and-door pet crate, having
    an inner drying-grooming-platform-patio-crumple-zone-ramp-and-door 118.
Therefore, the crumplable rollable collapsible drying-grooming-platform-patio-crumple-zone-ramp-and-door pet crate:
  a) Can be used as a drying platform for pets,
      to dry pets after bathing
      (see FIG. 9B, FIG. 12, and FIG. 17C);
  b) Can be used as grooming platform for pets,
      to groom pets
      (see FIG. 9B, FIG. 12, and FIG. 17C);
  c) Can be used as a patio for pets,
      to give a place for pets to rest
      (see FIG. 9B, FIG. 12, and FIG. 17C);
  d) Can be used as a crumple zone,
      to help protect pets in a collision
      (see FIG. 9B, FIG. 12, and FIG. 17C);
  e) Can slidably be used as a ramp for pets to conveniently safely quickly and easily enter and exit,
      in the direction of the arrow 136, pulled out
      to make entry and exit of the crate easier
      (see FIG. 3A, FIG. 3B, FIG. 4A, FIG. 4B, FIG. 8A, FIG. 8B, FIG. 18, FIG. 22A, FIG. 22B, and FIG. 22C); and
  f) Can be used as a leg,
      in the direction or arrow 137
      to provide support for multi-function drying-grooming-platform-patio-crumple-zone-ramp-and-door system
      (see FIG. 9A, FIG. 9B, FIG. 12, and FIG. 17C).

2) It is another object of the new invention to provide a crumplable rollable collapsible drying-grooming-platform-patio-crumple-zone-ramp-and-door pet crate, having
an outer drying-grooming-platform-patio-crumple-zone-ramp-and-door 119.
Therefore, the crumplable rollable collapsible drying-grooming-platform-patio-crumple-zone-ramp-and-door pet crate:
  a) Can be used as a drying platform for pets,
    to dry pets after bathing
    (see FIG. 9B, FIG. 12, and FIG. 17C);
  b) Can be used as grooming platform for pets,
    to groom pets
    (see FIG. 9B, FIG. 12, and FIG. 17C);
  c) Can be used as a patio for pets,
    to give a place for pets to rest
    (see FIG. 9B, FIG. 12, and FIG. 17C);
  d) Can be used as a crumple zone,
    to help protect pets in a collision
    (see FIG. 15A, FIG. 15B, FIG. 16A, and FIG. 16B); and
  e) Can be used as a ramp for pets to conveniently safely quickly and easily enter and exit,
    to make entry and exit of the crate easier
    (see FIG. 3A, FIG. 3B, FIG. 4A, FIG. 4B, FIG. 8A, FIG. 8B, FIG. 18, FIG. 22A, FIG. 22B, and FIG. 22C).
3) It is still another object of the new invention to provide a crumplable rollable collapsible drying-grooming-platform-patio-crumple-zone-ramp-and-door pet crate, having
two drying-grooming-platform-patio-crumple-zone-ramp-and-door hinges 111.
Therefore, the crumplable rollable collapsible drying-grooming-platform-patio-crumple-zone-ramp-and-door pet crate:
  a) Can be used with outer drying-grooming-platform-patio-crumple-zone-ramp-and-door 119 to create a door,
    to provide security to pets
    (see FIG. 3B, FIG. 3C, FIG. 3D, and FIG. 3E,);
  b) Can be used with inner drying-grooming-platform-patio-crumple-zone-ramp-and-door 118 and outer drying-grooming-platform-patio-crumple-zone-ramp-and-door 11 to create a grooming platform,
    to allow pets a place to be groomed
    (see FIG. 3B, FIG. 3C, FIG. 3D, and FIG. 3E,);
  c) Can be used with inner drying-grooming-platform-patio-crumple-zone-ramp-and-door 118 and outer drying-grooming-platform-patio-crumple-zone-ramp-and-door 11 to create a drying platform,
    to give pets a place to dry after bathing
    (see FIG. 8A, and FIG. 8B,);
  d) Can be used with inner drying-grooming-platform-patio-crumple-zone-ramp-and-door 118 and outer drying-grooming-platform-patio-crumple-zone-ramp-and-door 11 to create a patio,
    to give pets a place to rest
    (see FIG. 8A, and FIG. 8B,) and
  e) Can be used with inner drying-grooming-platform-patio-crumple-zone-ramp-and-door 118 and outer drying-grooming-platform-patio-crumple-zone-ramp-and-door 11 to create a patio,
    to give pets a place to rest
    (see FIG. 8A, and FIG. 8B).
4) It is a further object of the new invention to provide a crumplable rollable collapsible drying-grooming-platform-patio-crumple-zone-ramp-and-door pet crate, having
a crumple-zone-ramp-and-door-locking quick-release locking pin 121.
Therefore, the crumplable rollable collapsible drying-grooming-platform-patio-crumple-zone-ramp-and-door pet crate:
  a) Can lock multi-function drying-grooming-platform-patio-crumple-zone-ramp-and-door system 117,
    to provide safety and security to pets
    (see FIG. 8A and FIG. 8B);
  b) Can unlock multi-function drying-grooming-platform-patio-crumple-zone-ramp-and-door system 117,
    to allow pets to easily exit crate
    (see FIG. 8A and FIG. 8B); and
  c) Can automatically and springedly lock multi-function drying-grooming-platform-patio-crumple-zone-ramp-and-door system 117,
    to make the operation of ramp-and-door system 117 easier.
5) It is an even further object of the new invention to provide a crumplable rollable collapsible drying-grooming-platform-patio-crumple-zone-ramp-and-door pet crate, having
a multi-function T-shaped handle 124.
Therefore, the crumplable rollable collapsible drying-grooming-platform-patio-crumple-zone-ramp-and-door pet crate:
  a) Can provide grip for multi-function detachable storable seatback-attachable headrest-attachable leg-handle system 123,
    to make hand operation easier
    (see FIG. 5A and FIG. 5B);
  b) Can slidably lock between to car seats,
    in the direction of arrow 138
    to prevent crate from moving during travel
    (see FIG. 10A, FIG. 11, FIG. 12A, FIG. 12B, FIG. 13A, and FIG. 13B);
  c) Can slidably lock between headrest posts,
    in the direction of arrow 139
    to prevent crate from moving during travel
    (see FIG. 10B, FIG. 11, FIG. 12A, FIG. 12B, FIG. 13A, and FIG. 13B); and
  d) Can function as a support foot for multi-function drying-grooming-platform-patio-crumple-zone-ramp-and-door system 117,
    to create a grooming platform, a drying platform, and a patio
    (see FIG. 9A, FIG. 9B, FIG. 14, FIG. 16, and FIG. 21).
6) It is still another object of the new invention to provide a crumplable rollable collapsible drying-grooming-platform-patio-crumple-zone-ramp-and-door pet crate, having
a multi-function I-shaped leg 125.
Therefore, the crumplable rollable collapsible drying-grooming-platform-patio-crumple-zone-ramp-and-door pet crate:
  a) Can function as a crumple-zone to protect the crumplable rollable collapsible drying-grooming-platform-patio-crumple-zone-ramp-and-door pet crate, in the direction of arrows 140 and 141
to provide additional safety and security to pets
(see FIG. 12A, FIG. 12B, FIG. 13A, and FIG. 13B);
b) Can function as a leg to support the multi-function drying-grooming-platform-patio-crumple-zone-ramp-and-door system 117 to act as a grooming platform,
to provide a place for pets to be groomed
(see FIG. 16 and FIG. 21);
c) Can function as a leg to support the multi-function drying-grooming-platform-patio-crumple-zone-ramp-and-door system 117 to act as a drying platform,
to provide a place to dry after bathing
(see FIG. 16 and FIG. 21); and
d) Can function as a leg to support multi-function drying-grooming-platform-patio-crumple-zone-ramp-and-door system 117 to act as a patio,
to provide a place for pets to rest
(see FIG. 16 and FIG. 21).
7) It is yet another object of the new invention to provide a crumplable rollable collapsible drying-grooming-platform-patio-crumple-zone-ramp-and-door pet crate, having
a panel-snap-locking hook 126.
Therefore, the crumplable rollable collapsible drying-grooming-platform-patio-crumple-zone-ramp-and-door pet crate:
a) Can lock the multi-function detachable storable seatback-attachable headrest-attachable leg-handle system 123 to top handle-attaching foldable panel 102 in multiple locations and positions,
in the direction of arrow 142
to provide multiple configuration options
(see FIG. 14, FIG. 15A, FIG. 15B, FIG. 15C and FIG. 15D);
b) Can lock the multi-function detachable storable seatback-attachable headrest-attachable leg-handle system 123 to bottom handle-attaching panel 103 in multiple locations and positions,
in the direction of arrow 142
to provide multiple configuration options
(see FIG. 14, FIG. 15A, FIG. 15B, FIG. 15C, FIG. 15D, and FIG. 16A),
and
to lift and tow the crumplable rollable collapsible drying-grooming-platform-patio-crumple-zone-ramp-and-door pet crate in the directions of arrows 143 and 144, respectively
(see FIG. 16B);
c) Can lock the multi-function detachable storable seatback-attachable headrest-attachable leg-handle system 123 to left handle-attaching foldable panel 104 in multiple locations and positions,
in the direction of arrow 142
to provide multiple configuration options
(see FIG. 14, FIG. 15A, FIG. 15 B, FIG. 15 C, and FIG. 15D); and
d) Can lock multi-function detachable storable seatback-attachable headrest-attachable leg-handle system 123 to right handle-attaching foldable panel 105 in multiple locations and positions,
in the direction of arrow 142
to provide multiple configuration options
(see FIG. 14, FIG. 15A, FIG. 15 B, FIG. 15 C, and FIG. 15D); and
e) Can lock multi-function detachable storable seatback-attachable headrest-attachable leg-handle system 123 to rear handle-attaching foldable panel 106 in multiple locations and positions,
in the direction of arrow 142
to provide multiple configuration options
(see FIG. 14, FIG. 15A, FIG. 15 B, FIG. 15 C, and FIG. 15D).
Other objects and advantages of the present invention will become apparent from a consideration of the accompanying drawings and ensuing description.

SUMMARY OF THE INVENTION

A crumplable rollable collapsible drying-grooming-platform-patio-crumple-zone-ramp-and-door pet crate, comprises: a top handle-attaching foldable panel, a bottom handle-attaching panel, a left handle-attaching foldable panel pivotably attached to the bottom handle-attaching panel, a right handle-attaching foldable panel pivotably attached to the bottom handle-attaching panel, a rear handle-attaching foldable panel pivotably attached to the top handle-attaching foldable panel and the bottom handle-attaching panel, a front handle-attaching foldable panel pivotably attached to the bottom handle-attaching panel, four top corner connectors respectively attached to the top handle-attaching foldable panel, the left handle-attaching foldable panel, the right handle-attaching foldable panel, the rear handle-attaching foldable panel, and the front handle-attaching foldable panel, four bottom corner connectors respectively attached to the bottom handle-attaching panel, the left handle-attaching foldable panel, the right handle-attaching foldable panel, the rear handle-attaching foldable panel, and the front handle-attaching foldable panel, two wheels respectively rotatably attached to the bottom handle-attaching panel, a tray attached to the bottom handle-attaching panel, an outer drying-grooming-platform-patio-crumple-zone-ramp-and-door swingably attached to the front handle-attaching foldable panel for functioning as an adjustable ramp and for providing a drying platform and a grooming platform and a patio and a crumple zone and a ramp, an inner drying-grooming-platform-patio-crumple-zone-ramp-and-door slid inside the outer drying-grooming-platform-patio-crumple-zone-ramp-and-door for functioning as an adjustable leg and an adjustable ramp and for providing a drying platform and a grooming platform and a patio and a crumple zone and a ramp, an alarm-housing attached to the top handle-attaching foldable panel, a processor secured within the alarm-housing, a memory electronically connected to the processor, a display electronically connected to the processor and the memory, a software installed inside the processor, a temperature sensor electronically connected to the processor, an alert speaker electronically connected to the processor, and an alert light electronically connected to the processor.

BRIEF DESCRIPTION OF THE DRAWINGS

FIG. 2C illustrates a side view of the crumplable rollable collapsible drying-grooming-platform-patio-crumple-zone-ramp-and-door pet crate.

FIG. 4A illustrates a perspective view of the crumplable rollable collapsible drying-grooming-platform-patio-crumple-zone-ramp-and-door pet crate, with outer drying-grooming-platform-patio-crumple-zone-ramp-and-door opened and the Inner drying-grooming-platform-patio-crumple-zone-ramp-and-door extended.

FIG. 4B illustrates a side view of the crumplable rollable collapsible drying-grooming-platform-patio-crumple-zone-ramp-and-door pet crate, with outer drying-grooming-platform-patio-crumple-zone-ramp-and-door opened and the Inner drying-grooming-platform-patio-crumple-zone-ramp-and-door extended.

FIG. 5A and FIG. 5B illustrate perspective views of the multi-function detachable storable seatback-attachable headrest-attachable leg-handle system.

FIG. 6A and FIG. 6B illustrate perspective and front views of the temperature-sensor alarm system.

FIG. 8A and FIG. 8B illustrate perspective and side views of the crumplable rollable collapsible drying-grooming-platform-patio-crumple-zone-ramp-and-door pet crate in a car and demonstrates the functions of the inner drying-grooming-platform-patio-crumple-zone-ramp-and-door and the outer drying-grooming-platform-patio-crumple-zone-ramp-and-door.

FIG. 9A and FIG. 9B illustrate perspective and side views of the crumplable rollable collapsible drying-grooming-platform-patio-crumple-zone-ramp-and-door pet crate and how the inner drying-grooming-platform-patio-crumple-zone-ramp-and-door can be folded down forming a leg.

FIG. 10A, FIG. 10B, and FIG. 11 illustrate side and perspective views of the crumplable rollable collapsible drying-grooming-platform-patio-crumple-zone-ramp-and-door pet crate and how it can be attached to a standard car seat using the multi-function detachable storable seatback-attachable headrest-attachable leg-handle system.

FIG. 13A and FIG. 13B illustrate side views demonstrating how the multi-function detachable storable seatback-attachable headrest-attachable leg-handle system can be used as a crumple zone.

FIG. 14 illustrates a side view demonstrating how the multi-function detachable storable seatback-attachable headrest-attachable leg-handle system is attached to the top, bottom, left, right, rear and front handle attaching foldable panels.

FIG. 16A illustrates a side view of a car containing the crumplable rollable collapsible drying-grooming-platform-patio-crumple-zone-ramp-and-door pet crate with the inner drying-grooming-platform-patio-crumple-zone-ramp-and-door and outer drying-grooming-platform-patio-crumple-zone-ramp-and-door fully extended and demonstrates how to attach the multi-function detachable storable seatback-attachable headrest-attachable leg-handle system to be used as a support leg to create a grooming platform, a drying platform and a patio.

FIG. 19A and FIG. 19B illustrate perspective views of an adjustable the multi-function detachable storable seatback-attachable headrest-attachable leg-handle system.

DETAILED DESCRIPTION OF THE INVENTION

Figure 1A:
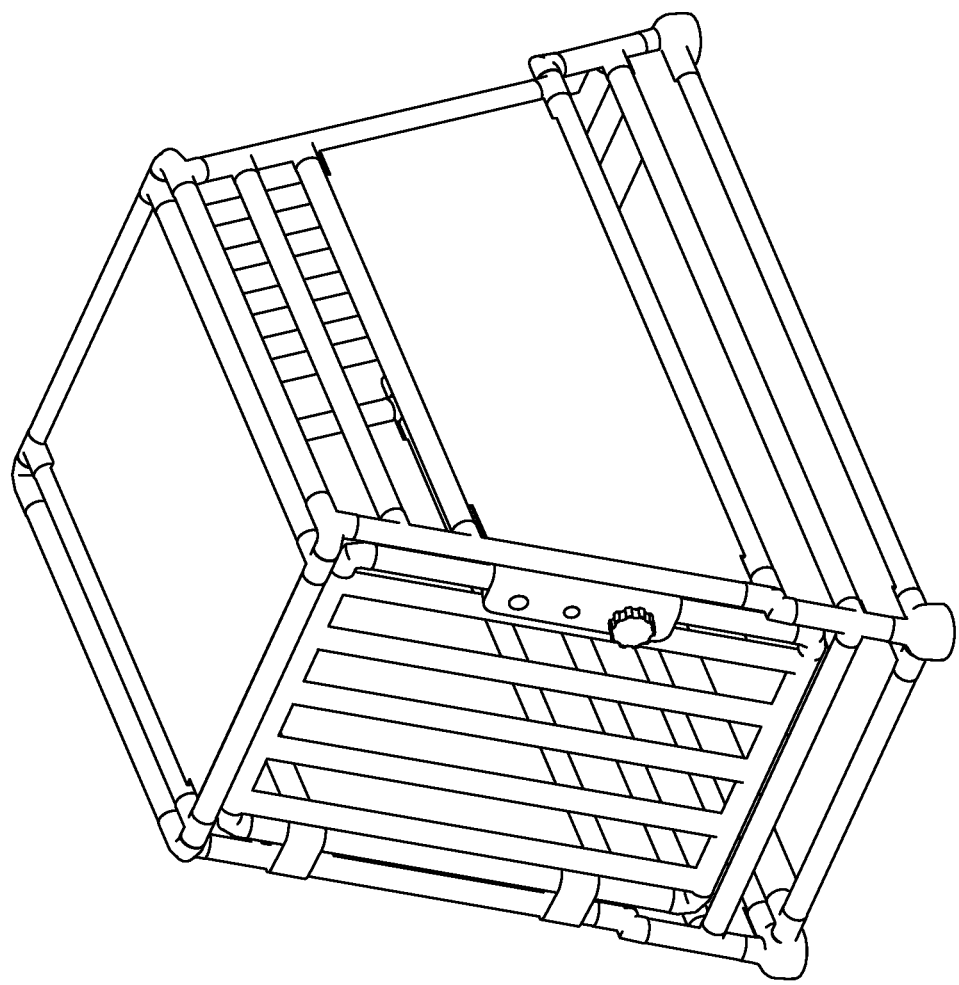
FIG. 1A (Prior Art) and FIG. 1B (Prior Art) illustrate perspective views of a prior art pet crate.
Figure 1B:
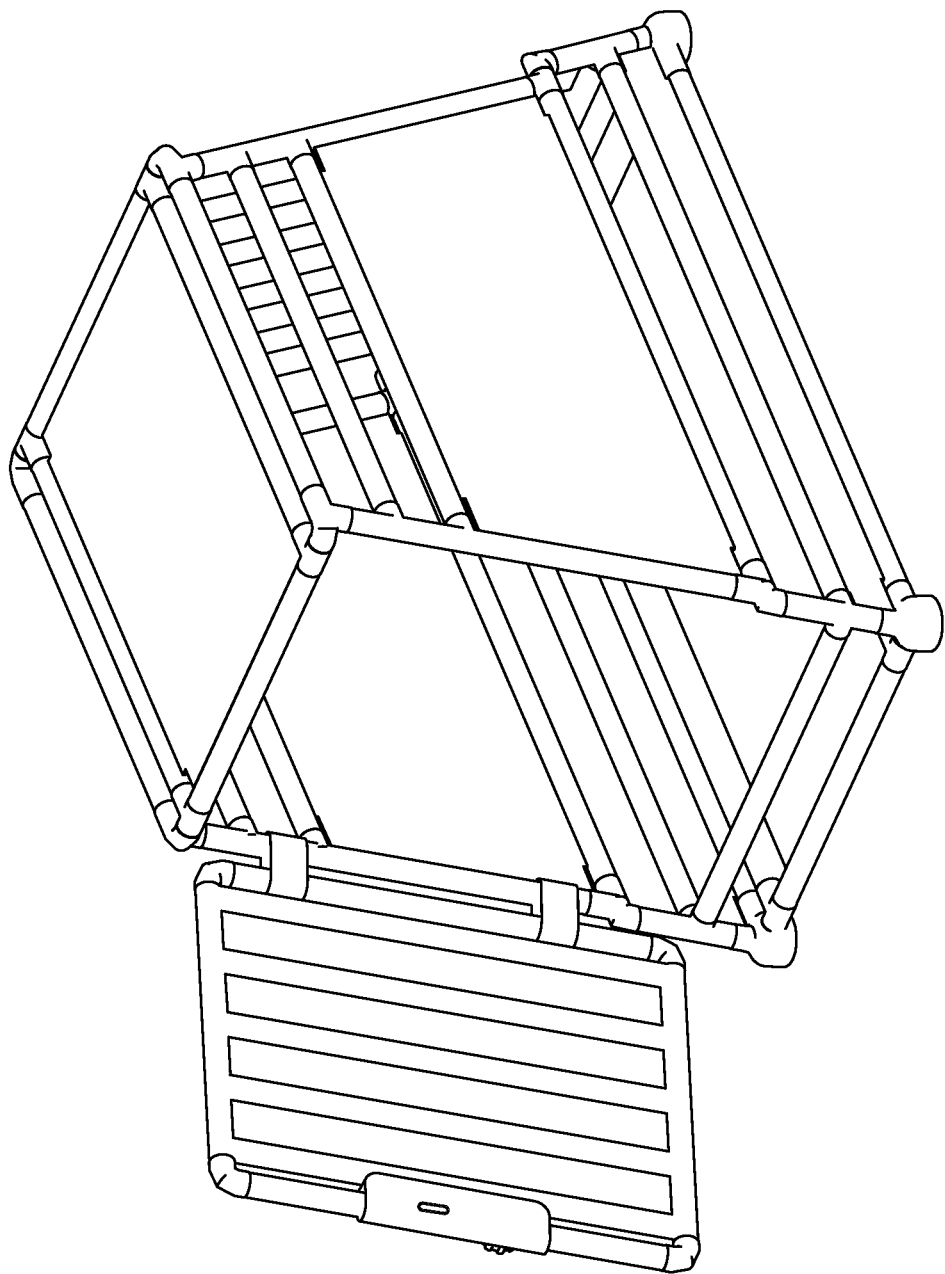
Figure 2A:
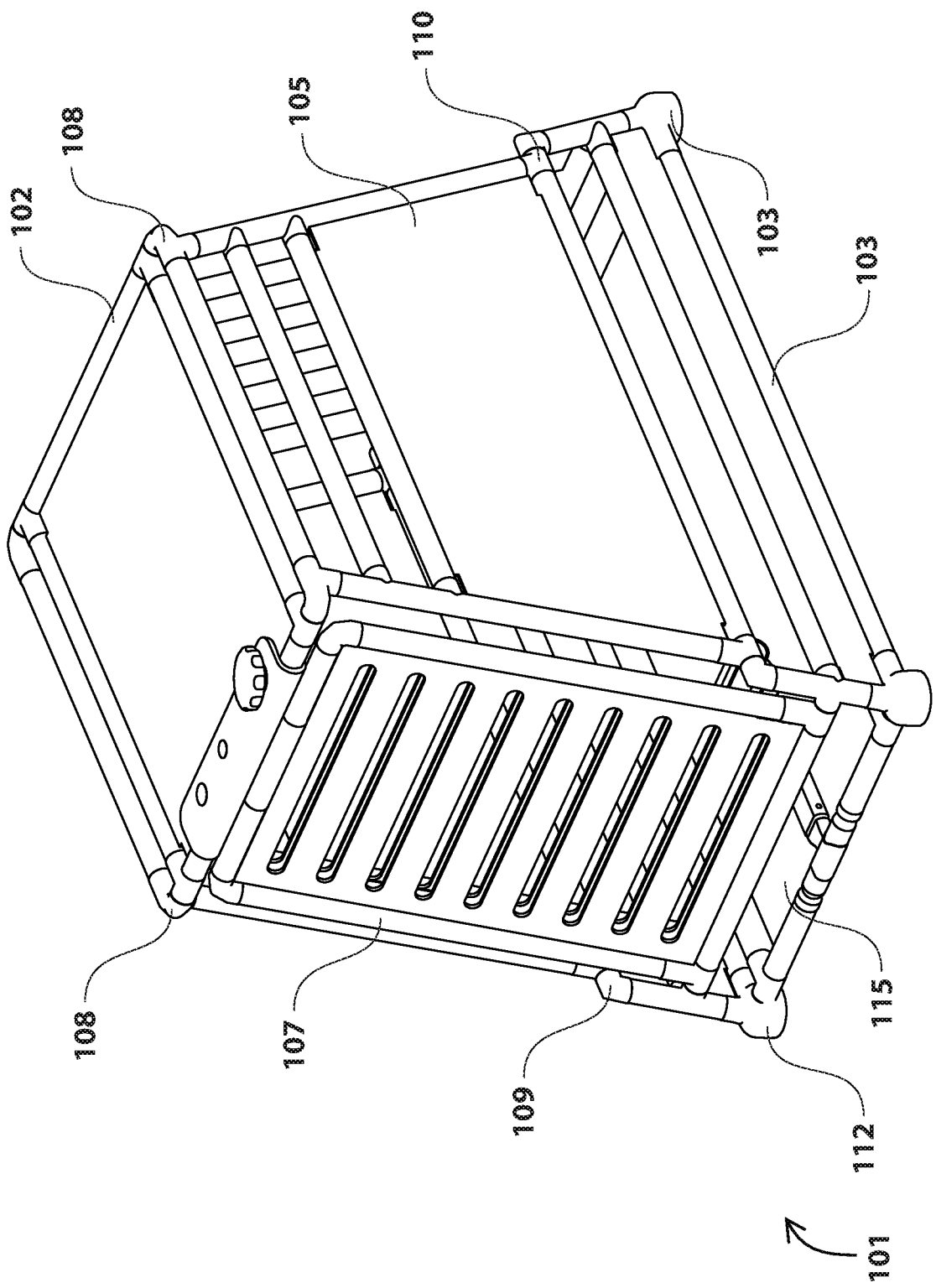
FIG. 2A and FIG. 2B illustrate perspective views of the crumplable rollable collapsible drying-grooming-platform-patio-crumple-zone-ramp-and-door pet crate.
Figure 2B:
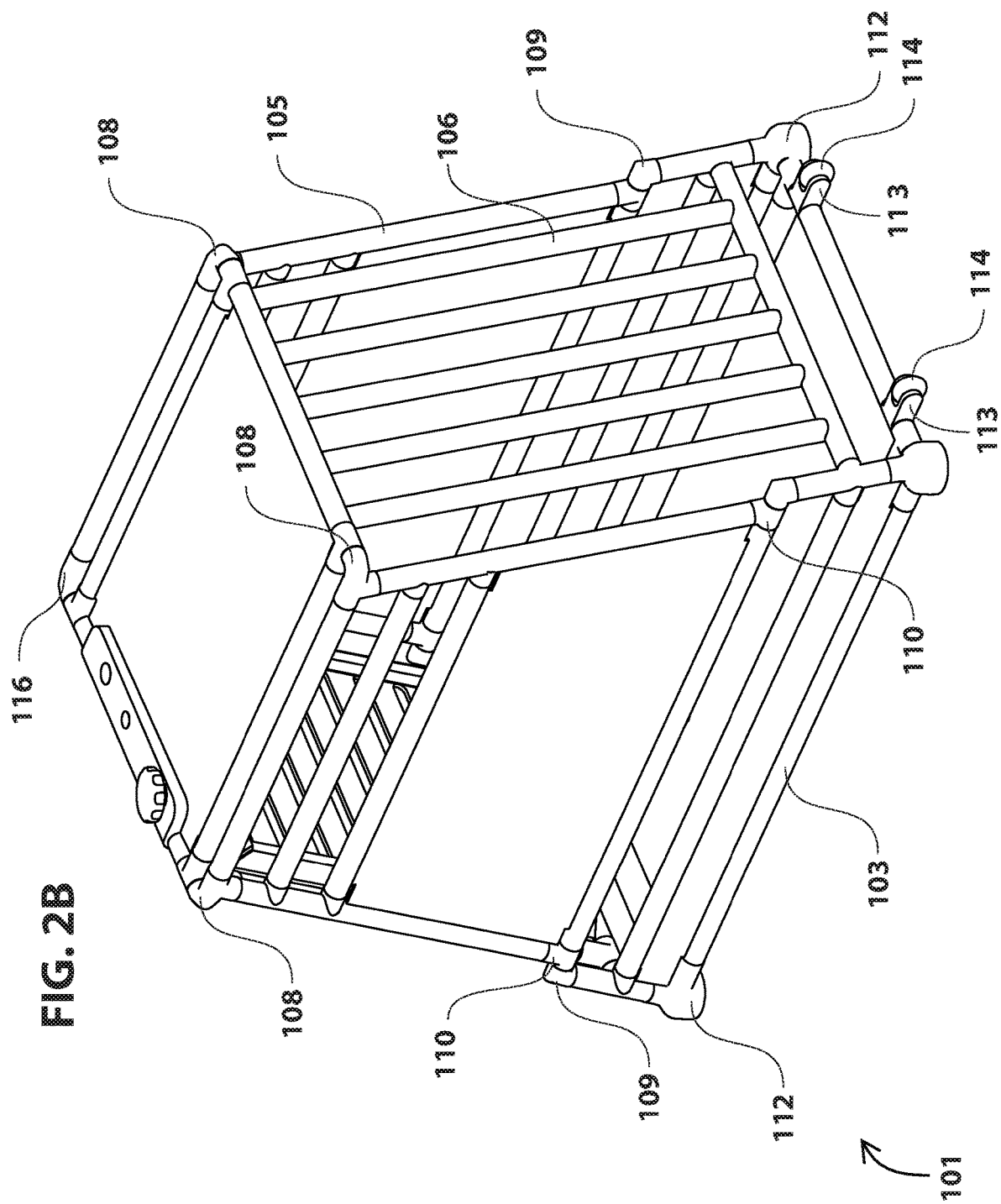
Figure 3A:
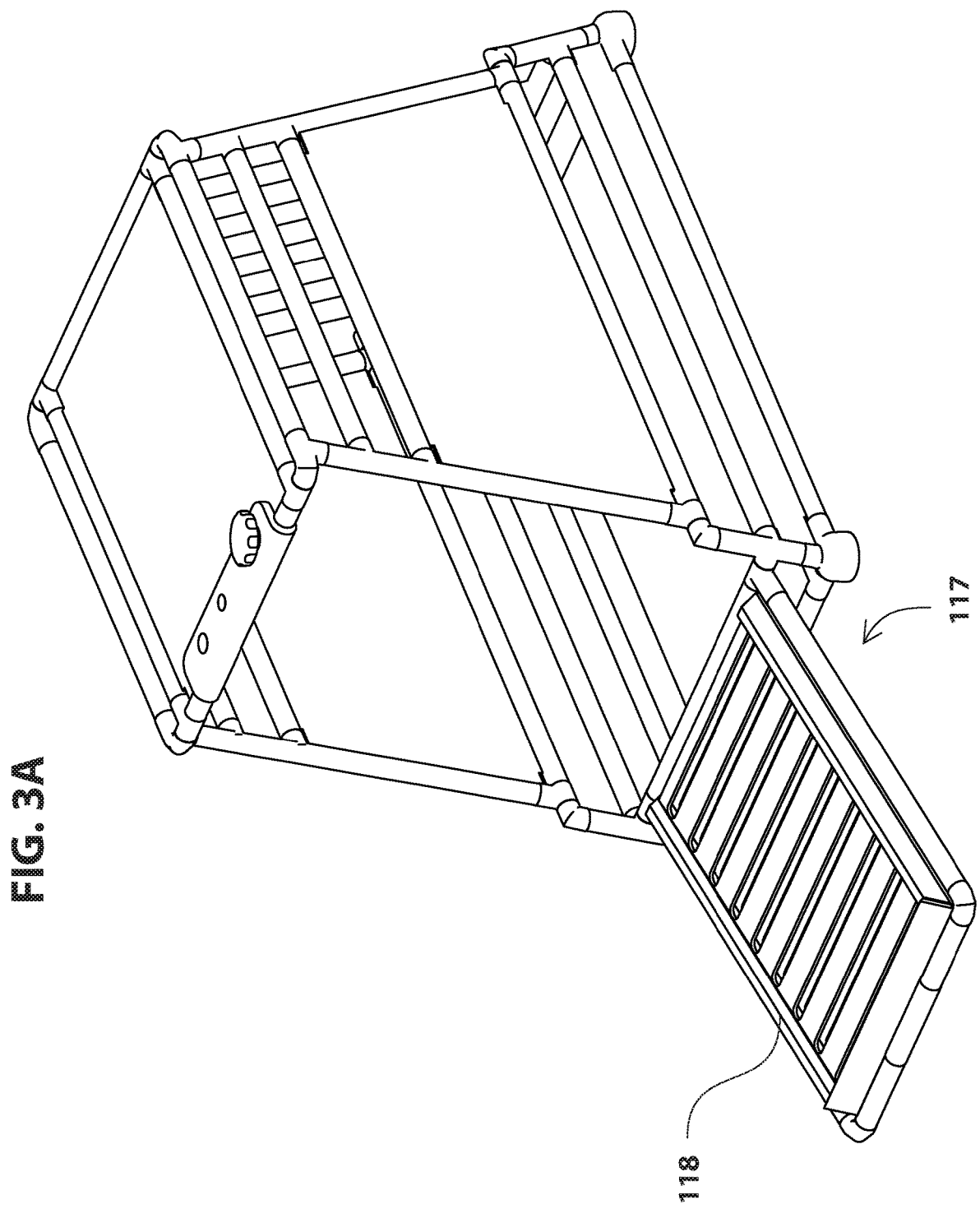
FIG. 3A illustrates a perspective view of the crumplable rollable collapsible drying-grooming-platform-patio-crumple-zone-ramp-and-door pet crate, with outer drying-grooming-platform-patio-crumple-zone-ramp-and-door opened.
Figure 3B:
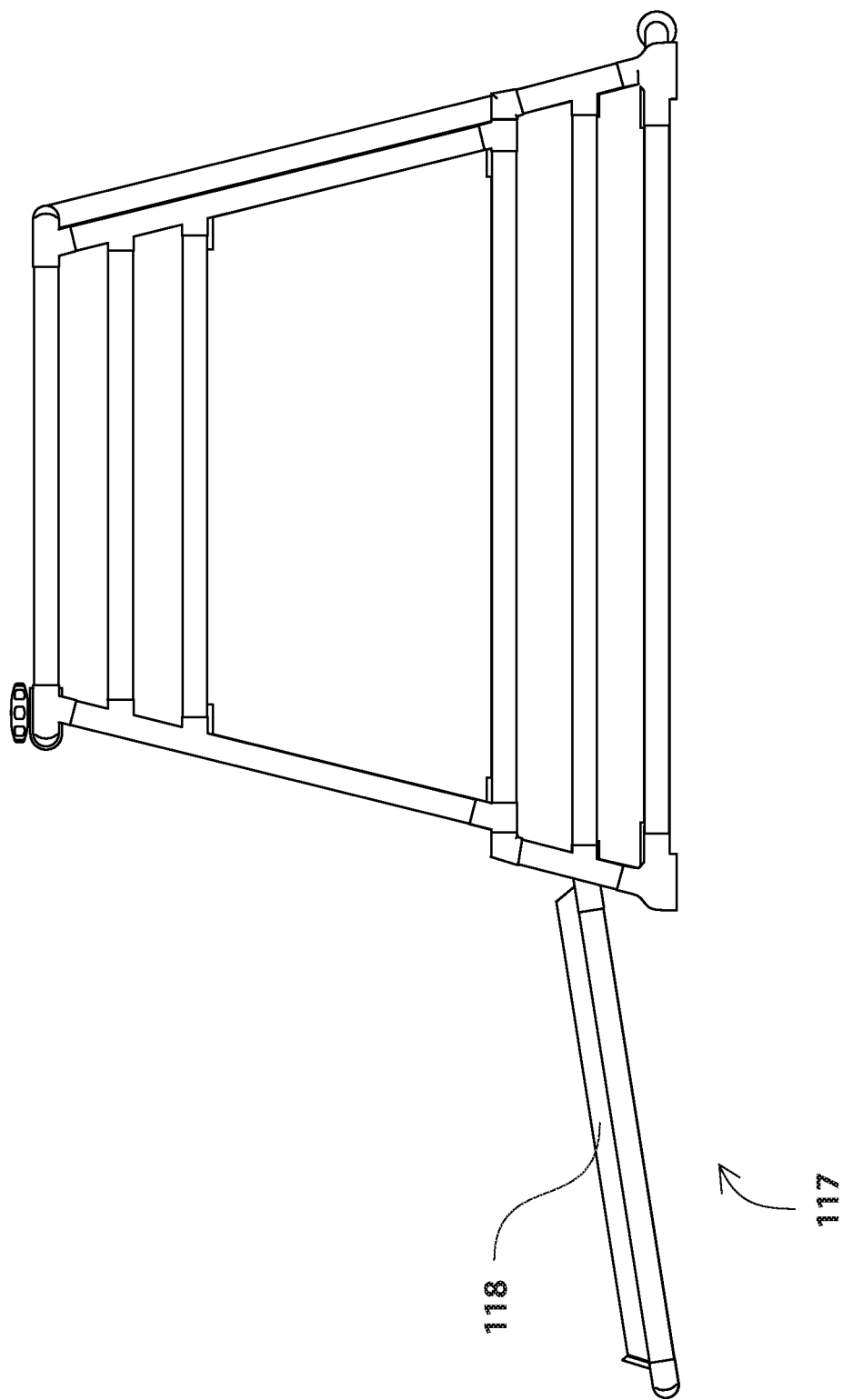
FIG. 3B illustrates a side view of the crumplable rollable collapsible drying-grooming-platform-patio-crumple-zone-ramp-and-door pet crate, with outer drying-grooming-platform-patio-crumple-zone-ramp-and-door opened.
Figure 6C:
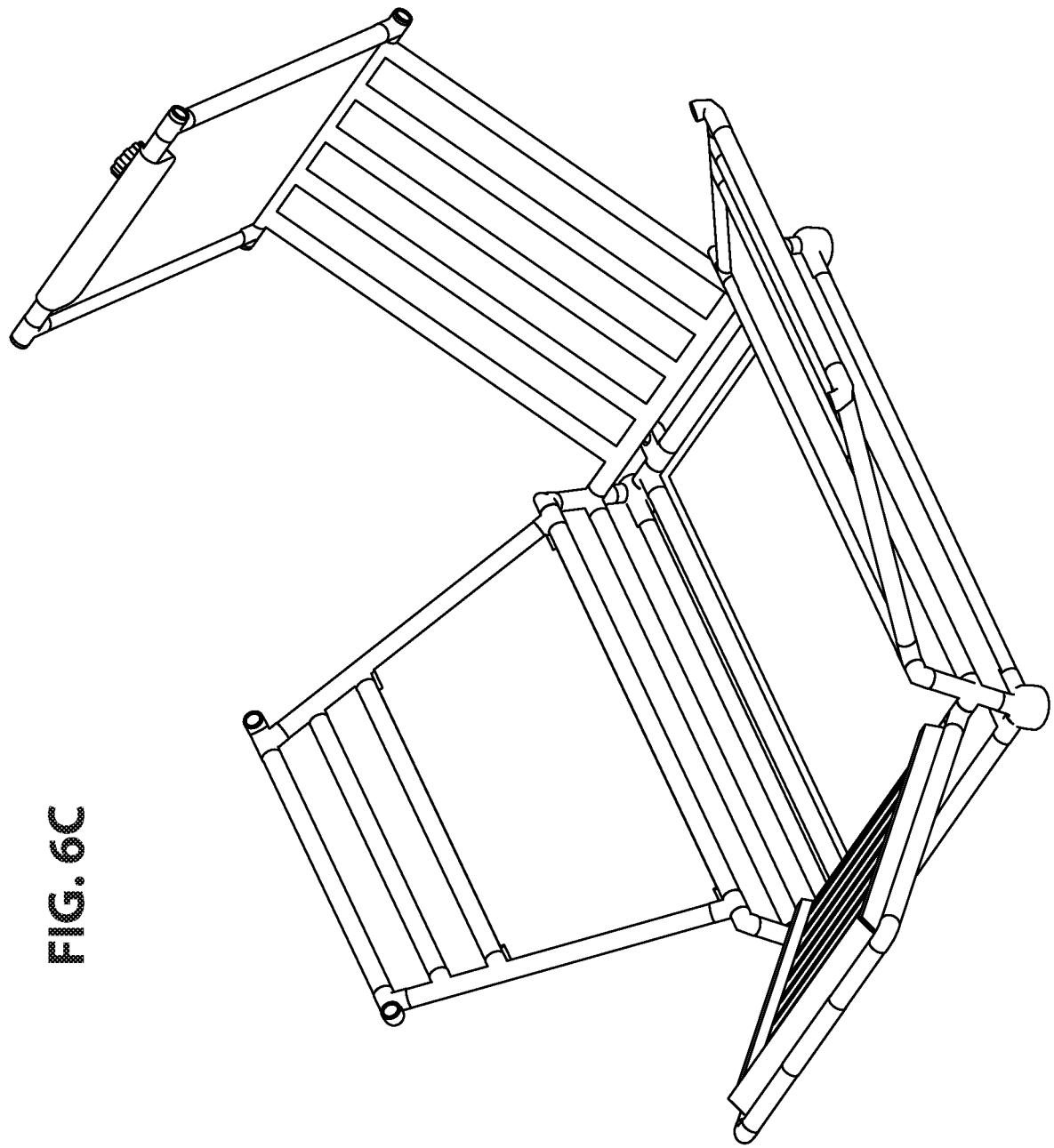
FIG. 6C and FIG. 6D illustrate perspective views of the disassembling and collapsing of the crumplable rollable collapsible drying-grooming-platform-patio-crumple-zone-ramp-and-door pet crate
Figure 6D:
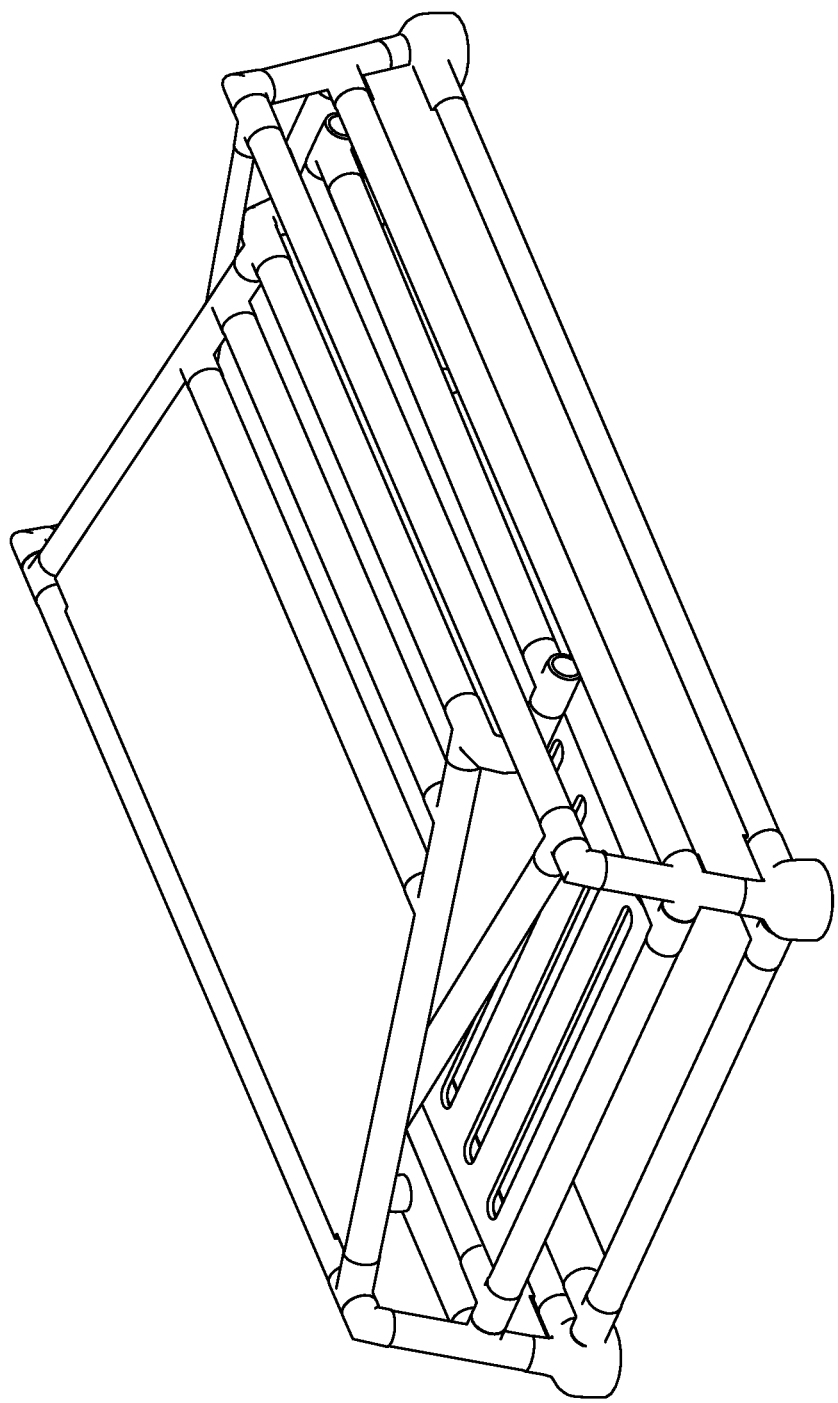
Figure 7:
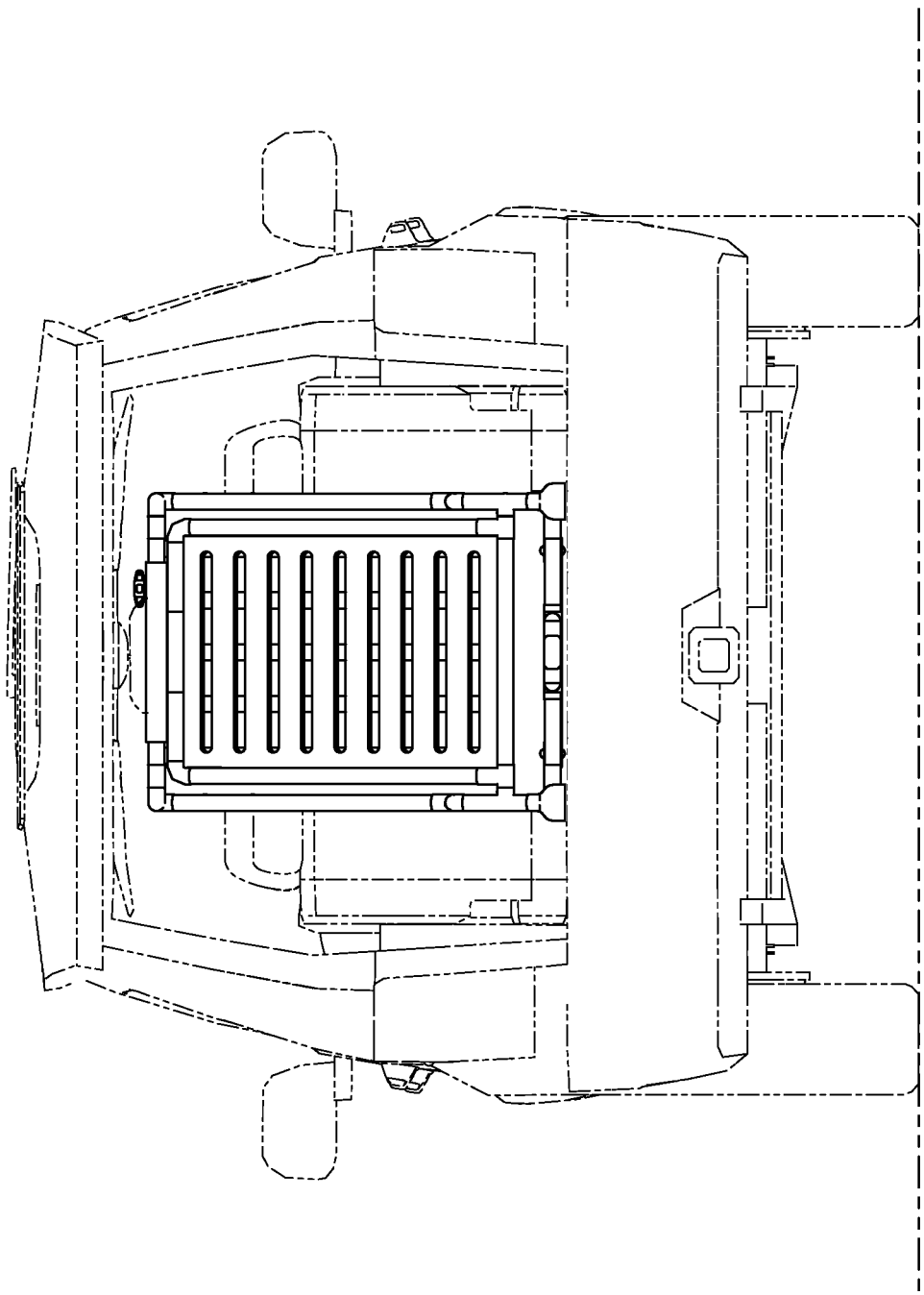
FIG. 7 illustrates a front view of the series of the crumplable rollable collapsible drying-grooming-platform-patio-crumple-zone-ramp-and-door pet crate and demonstrates how it fits in the back of a car.
Figure 8A:
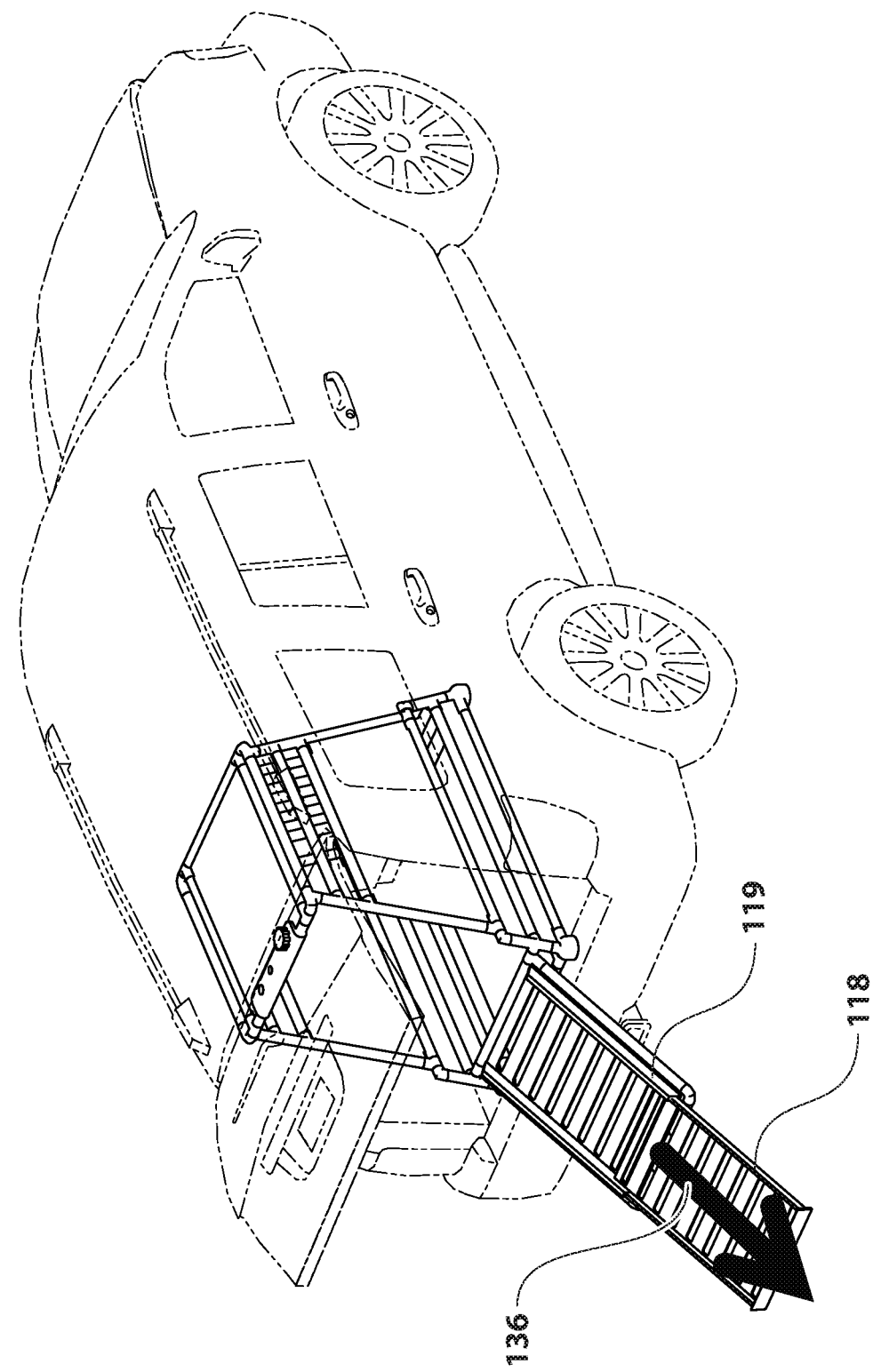

The crumplable rollable collapsible drying-grooming-platform-patio-crumple-zone-ramp-and-door pet crate has:

1) Pet-safety-oriented panel system,
2) Multi-function drying-grooming-platform-patio-crumple-zone-ramp-and-door system,
3) Multi-function detachable storable seatback-attachable headrest-attachable leg-handle system, and
4) Temperature-sensor alarm system.

Component

Referring to FIG. 2A, FIG. 2B, FIG. 2C, FIG. 3A, FIG. 3B, FIG. 4A, FIG. 4B, FIG. 5A, FIG. 5B, FIG. 6A, FIG. 6B, FIG. 6C, FIG. 6D, and FIG. 7, the crumplable rollable collapsible drying-grooming-platform-patio-crumple-zone-ramp-and-door pet crate comprises:

1) Pet-safety-oriented panel system 101 comprising:
2) Top handle-attaching foldable panel 102,
3) Bottom handle-attaching panel 103,
4) Left handle-attaching foldable panel 104,
5) Right handle-attaching foldable panel 105,
6) Rear handle-attaching foldable panel 106,
7) Front handle-attaching foldable panel 107,
8) Four top corner connectors 108,
9) Four bottom corner connectors 109,
10) Six hinges 110,
11) Two drying-grooming-platform-patio-crumple-zone-ramp-and-door hinges 111,
12) Four crate-stabilizing flaring feet 112,
13) Two wheel brackets 113,
14) Two wheels 114,
15) Tray 115,
16) Panel-unlocking spring-loaded buttons 116;
17) Multi-function drying-grooming-platform-patio-crumple-zone-ramp-and-door system 117 comprising:
18) Inner drying-grooming-platform-patio-crumple-zone-ramp-and-door 118,
19) Outer drying-grooming-platform-patio-crumple-zone-ramp-and-door 119,
20) Crumple-zone-ramp-and-door-locking quick-release hand knob 120,
21) Crumple-zone-ramp-and-door-locking quick-release locking pin 121,
22) Locking-pin recess 122;
23) Multi-function detachable storable seatback-attachable headrest-attachable leg-handle system 123 comprising:
24) Multi-function T-shaped handle 124,
25) Multi-function I-shaped leg 125,
26) Panel-snap-locking hook 126;
27) Temperature-sensor alarm system 127 comprising:
28) Alarm-housing 128,
29) Processor 129,
30) Memory 130,
31) Display 131,
32) Software 132,
33) Temperature sensor 133,
34) Alert speaker 134,
35) Alert light 135.

Material

Referring to FIG. 2A, FIG. 2B, FIG. 2C, FIG. 3A, FIG. 3B, FIG. 4A, FIG. 4B, FIG. 5A, FIG. 5B, FIG. 6A, FIG. 6B, FIG. 6C, FIG. 6D, and FIG. 7, the crumplable rollable collapsible drying-grooming-platform-patio-crumple-zone-ramp-and-door pet crate comprises:
1) Pet-safety-oriented panel system 101 is made of the combined materials of its components.
2) Top handle-attaching foldable panel 102 is made of metallic material.
3) Bottom handle-attaching panel 103 is made of metallic material.
4) Left handle-attaching foldable panel 104 is made of metallic material.
5) Right handle-attaching foldable panel 105 is made of metallic material.
6) Rear handle-attaching foldable panel 106 is made of metallic material.
7) Front handle-attaching foldable panel 107 is made of metallic material.
8) Four top corner connectors 108 each are made of plastic material.
9) Four bottom corner connectors 109 each are made of plastic material.
10) Six hinges 110 each are made of plastic material.
11) Two drying-grooming-platform-patio-crumple-zone-ramp-and-door hinges 111 each are made of plastic material.
12) Four crate-stabilizing flaring feet 112 each are made of plastic material.
13) Two wheel brackets 113 each are made of plastic or metallic material.
14) Two wheels 114 is made of plastic material.
15) Tray 115 is made of plastic or metallic material.
16) Panel-unlocking spring-loaded buttons 116 each are made of plastic material;
17) Multi-function drying-grooming-platform-patio-crumple-zone-ramp-and-door system 117 is made of the combined materials of its components.
18) Inner drying-grooming-platform-patio-crumple-zone-ramp-and-door 118 is made of metallic material.
19) Outer drying-grooming-platform-patio-crumple-zone-ramp-and-door 119 is made of metallic material.
20) Crumple-zone-ramp-and-door-locking quick-release hand knob 120 is made of plastic or metallic material.
21) Crumple-zone-ramp-and-door-locking quick-release locking pin 121 is made of plastic or metallic material.
22) Locking-pin recess 122 is made of empty space;
23) Multi-function detachable storable seatback-attachable headrest-attachable leg-handle system 123 is made of the combined materials of its components.
24) Multi-function T-shaped handle 124 is made of plastic and metallic material.
25) Multi-function I-shaped leg 125 is made of metallic material.
26) Panel-snap-locking hook 126 is made of metallic material;
27) Temperature-sensor alarm system 127 is made of the combined materials of its components.
28) Alarm-housing 128 is made of plastic material.
29) Processor 129 is made of computer and electronic material.
30) Memory 130 is made of computer and electronic material.
31) Display 131 is made of display and electronic material.
32) Software 132 is made of coding material.
33) Temperature sensor 133 is made of sensor and electronic material.

34) Alert speaker 134
  made of speaker and electronic material.
35) Alert light 135 is
  made of plastic and electronic material.
Shape
  Referring to FIG. 2A, FIG. 2B, FIG. 2C, FIG. 3A, FIG. 3B, FIG. 4A, FIG. 4B, FIG. 5A, FIG. 5B, FIG. 6A, FIG. 6B, FIG. 6C, FIG. 6D, and FIG. 7, the crumplable rollable collapsible drying-grooming-platform-patio-crumple-zone-ramp-and-door pet crate comprises:
1) Pet-safety-oriented panel system 101 is formed into the combined shapes of its components.
2) Top handle-attaching foldable panel 102
  is formed into a rectangular shape with a round-cross-section-tube-shaped perimeter.
3) Bottom handle-attaching panel 103
  is formed into a rectangular shape with a round-cross-section-tube-shaped perimeter.
4) Left handle-attaching foldable panel 104
  is formed into a trapazoidal shape with a round-cross-section-tube-shaped perimeter and two round-cross-section-bisecting tubes.
5) Right handle-attaching foldable panel 105
  is formed into a trapazoidal shape with a round-cross-section-tube-shaped perimeter and two round-cross-section-bisecting tubes.
6) Rear handle-attaching foldable panel 106
  is formed into a rectangular shape having tube shapes with a round cross-section.
7) Front handle-attaching foldable panel 107
  is formed into a rectangular shape with a round-cross-section-tube-shaped perimeter.
8) Four top corner connectors 108
  each are formed into an L shape.
9) Four bottom corner connectors 109
  each are formed into an L shape.
10) Six hinges 110
  each are formed into an T shape.
11) Two drying-grooming-platform-patio-crumple-zone-ramp-and-door hinges 111
  each are formed into a round-cross-section-tube-shaped top and an inverted-half-spherical-shaped bottom.
12) Four crate-stabilizing-flaring feet 112
  each are formed into a U shape.
13) Two wheel brackets 113
  each are formed into a wheel shape.
14) Two wheels 114
  is formed into a rectangle shape with raised sides.
15) Tray 115
  is formed into a rectangular recess shape with a raised perimeter.
16) Panel-unlocking spring-loaded buttons 116
  each are formed into a cylindrical shape;
17) Multi-function drying-grooming-platform-patio-crumple-zone-ramp-and-door system 117 is formed into the combined shapes of its components.
18) Inner drying-grooming-platform-patio-crumple-zone-ramp-and-door 118
  is formed into a rectangle shape with a U-shaped cross-section.
19) Outer drying-grooming-platform-patio-crumple-zone-ramp-and-door 119
  is formed into a rectangle shape with a U-shaped cross-section.
20) Crumple-zone-ramp-and-door-locking quick-release hand knob 120
  is formed into a cylindrical knob shape.
21) Crumple-zone-ramp-and-door-locking quick-release locking pin 121
  is formed into a cylinder shape with a circular spiral wing and a rectangular end.
22) Locking-pin recess 122
  is formed into a rectangular shape;
23) Multi-function detachable storable seatback-attachable headrest-attachable leg-handle system 123 is formed into the combined shapes of its components.
24) Multi-function T-shaped handle 124
  is formed into a T-shape with a round cross-section.
25) Multi-function I-shaped leg 125
  is formed into an I shape with a round cross-section.
26) Panel-snap-locking hook 126
  is formed into a semi-circular shape with a U-shaped cross-section.
27) Temperature-sensor alarm system 127 is formed into the combined shapes of its components.
28) Alarm-housing 128
  is formed into a rectangle shape.
29) Processor 129
  is formed into a processor shape.
30) Memory 130
  is formed into a memory shape.
31) Display 131
  is formed into a round or square shape.
32) Software 132
  is formed into a software shape.
33) Temperature sensor 133
  is formed into a round or square shape.
34) Alert speaker 134
  is formed into a round or square shape.
35) Alert Light 135
  is formed into a round or square shape.
Connection
  Referring to FIG. 2A, FIG. 2B, FIG. 2C, FIG. 3A, FIG. 3B, FIG. 4A, FIG. 4B, FIG. 5A, FIG. 5B, FIG. 6A, FIG. 6B, FIG. 6C, FIG. 6D, and FIG. 7, the crumplable rollable collapsible drying-grooming-platform-patio-crumple-zone-ramp-and-door pet crate comprises:
1) Pet-safety-oriented panel system 101 is connected by the combined connections of its components.
2) Top handle-attaching foldable panel 102
  is attached to left handle-attaching foldable panel 104, right handle-attaching foldable panel 105 and pivotably attached to rear handle-attaching foldable panel 106.
3) Bottom handle-attaching panel 103
  is attached to left handle-attaching foldable panel 104, right handle-attaching foldable panel 105, and rear handle-attaching foldable panel 106.
4) Left handle-attaching foldable panel 104
  is pivotably attached to bottom handle-attaching panel 103.
5) Right handle-attaching foldable panel 105
  is pivotably attached to bottom handle-attaching panel 103.
6) Rear handle-attaching foldable panel 106
  is pivotably attached to top handle-attaching foldable panel 102 and bottom handle-attaching panel 103.
7) Front handle-attaching foldable panel 107
  is pivotably attached to bottom handle-attaching panel 103.
8) Four top corner connectors 108
  respectively are attached to top handle-attaching foldable panel 102, left handle-attaching foldable panel 104, right handle-attaching foldable panel 105, rear handle-attaching foldable panel 106, and front handle-attaching foldable panel 107.
9) Four bottom corner connectors 109
respectively are attached to bottom handle-attaching panel 103, left handle-attaching foldable panel 104, right handle-attaching foldable panel 105, rear handle-attaching foldable panel 106, and front handle-attaching foldable panel 107.
10) Six hinges 110
respectively pivotably are attached to bottom handle-attaching panel 103, left handle-attaching foldable panel 104, right handle-attaching foldable panel 105, and rear handle-attaching foldable panel 106.
11) Two drying-grooming-platform-patio-crumple-zone-ramp-and-door hinges 111
respectively are pivotably attached to bottom handle-attaching panel 103 and front handle-attaching foldable panel 107.
12) Four crate-stabilizing flaring feet 112
respectively are attached to four bottom corner connectors 109.
13) Two wheel brackets 113
respectively are attached to bottom handle-attaching panel 103.
14) Two wheels 114
respectively rotatably are attached to two wheel brackets 113.
15) Tray 115
is attached to bottom handle-attaching panel 103.
16) Panel-unlocking spring-loaded buttons 116
respectively are attached to four top corner connectors 108.
17) Multi-function drying-grooming-platform-patio-crumple-zone-ramp-and-door system 117 is connected by the combined connections of its components.
18) Inner drying-grooming-platform-patio-crumple-zone-ramp-and-door 118
is slidably inserted inside outer drying-grooming-platform-patio-crumple-zone-ramp-and-door 119.
19) Outer drying-grooming-platform-patio-crumple-zone-ramp-and-door 119
is swingably attached to front handle-attaching foldable panel 107.
20) Crumple-zone-ramp-and-door-locking quick-release hand knob 120
is springingly attached to alarm-housing 128.
21) Crumple-zone-ramp-and-door-locking quick-release locking pin 121
is attached to crumple-zone-ramp-and-door-locking quick-release hand knob 120.
22) Locking-pin recess 122
is formed in alarm-housing 128.
23) Multi-function detachable storable seatback-attachable headrest-attachable leg-handle system 123 is connected by the combined connections of its components.
24) Multi-function T-shaped handle 124
is attached to multi-function I-shaped leg 125.
25) Multi-function I-shaped leg 125
is attached to multi-function T-shaped handle 124.
26) Panel-snap-locking hook 126
is attached to multi-function I-shaped leg 125.
27) Temperature-sensor alarm system 127 is connected by the combined connections of its components.
28) Alarm-housing 128
is attached to top handle-attaching foldable panel 102.
29) Processor 129
is secured within alarm-housing 128.
30) Memory 130
is electronically connected to processor 129.
31) Display 131
is electronically connected to processor 129 and memory 130.
32) Software 132
is installed inside processor 129.
33) Temperature sensor 133
is electronically connected to processor 129.
34) Alert speaker 134
is electronically connected to processor 129.
35) Alert Light 135
is electronically connected to processor 129.

Function

Figure 9B:
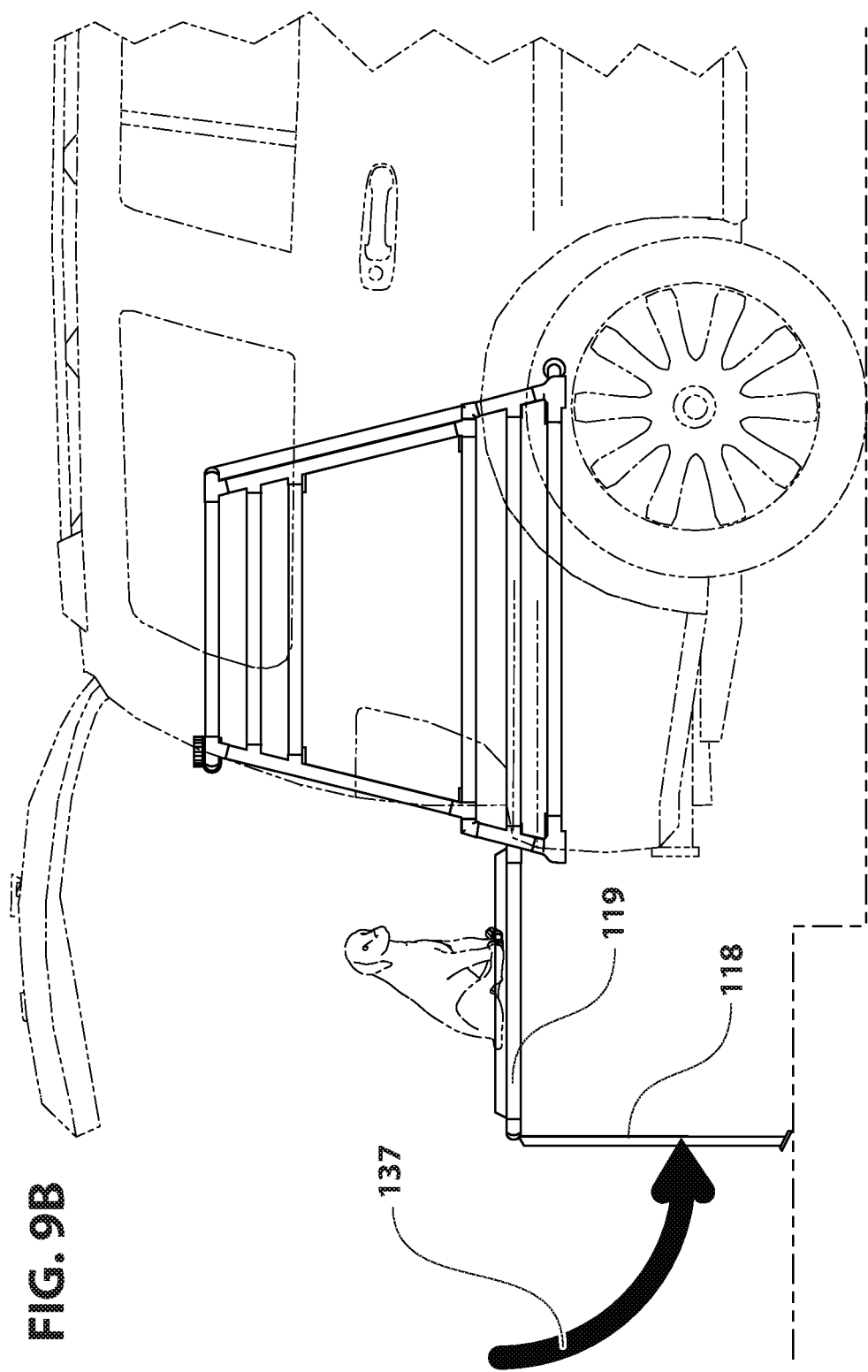
Figure 10A:
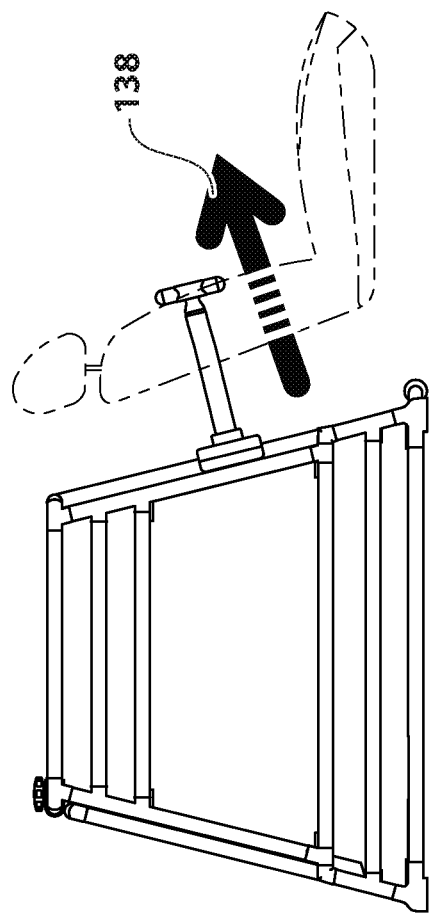
Figure 10B:
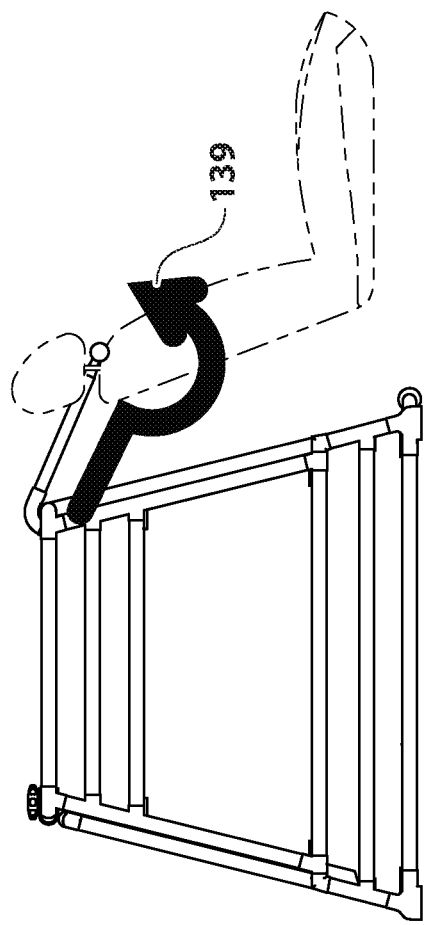
Figure 12A:
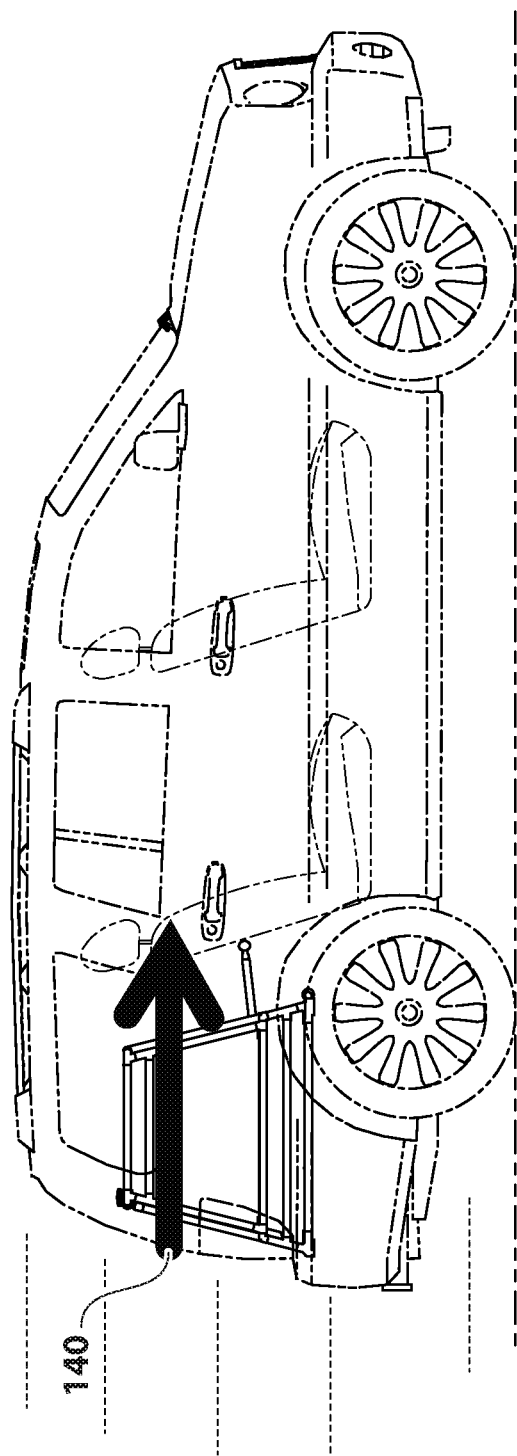
FIG. 12A illustrates a side view of a car traveling in a forward direction with the crumplable rollable collapsible drying-grooming-platform-patio-crumple-zone-ramp-and-door pet crate in the back.
Figure 12B:
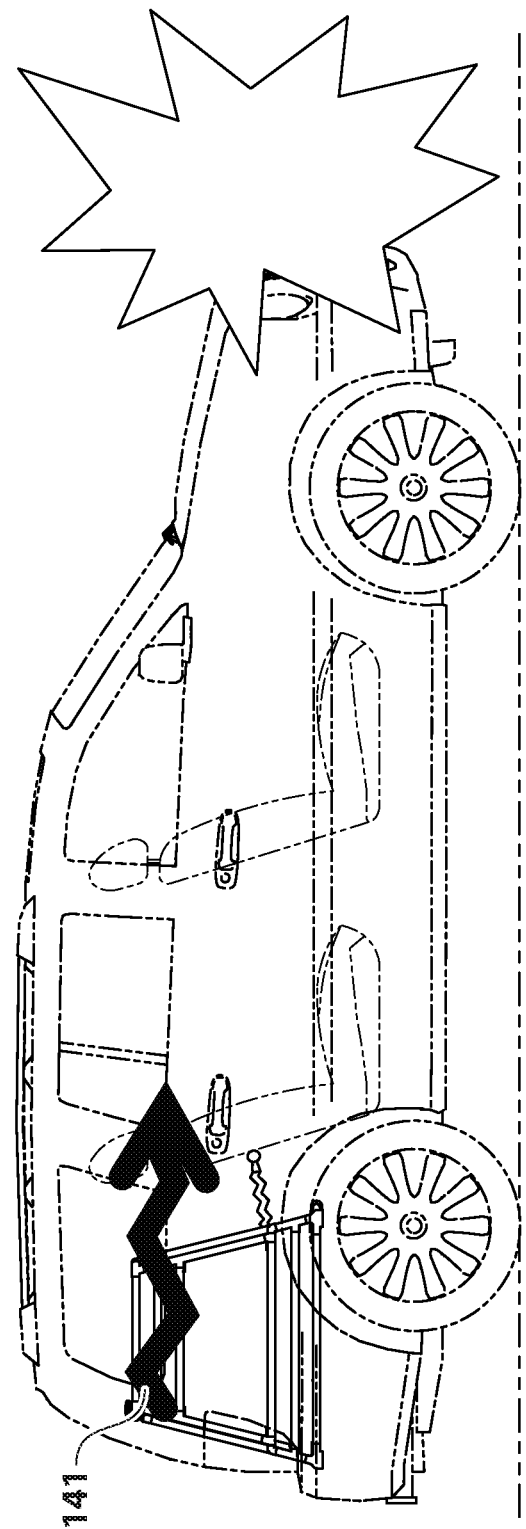
FIG. 12B illustrates a side view of a car collision and demonstrates how the multi-function detachable storable seatback-attachable headrest-attachable leg-handle system can be used as a crumple zone.
Figure 15A:
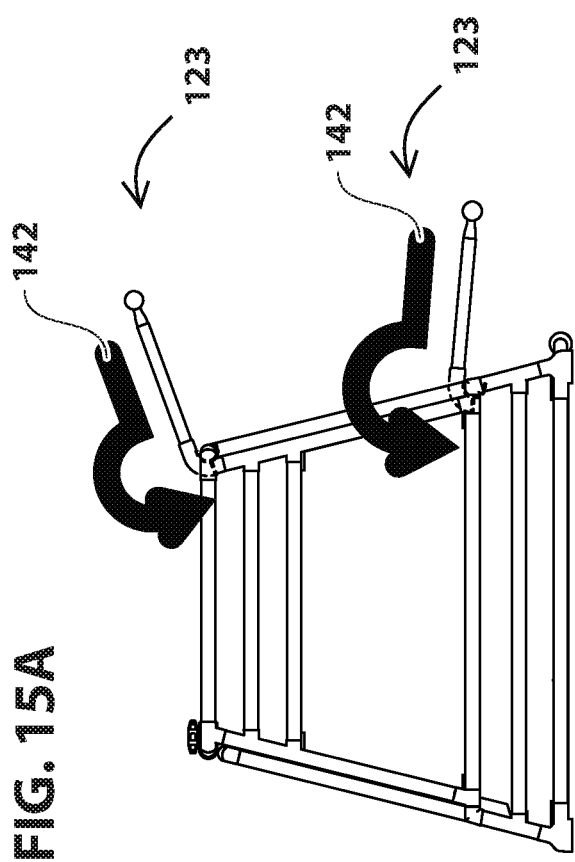
FIG. 15A, FIG. 15B, FIG. 15C, and FIG. 15D illustrates front views of the crumplable rollable collapsible drying-grooming-platform-patio-crumple-zone-ramp-and-door pet crate and demonstrates how the multi-function detachable storable seatback-attachable headrest-attachable leg-handle system can be attached in different positions and locations.
Figure 15B:
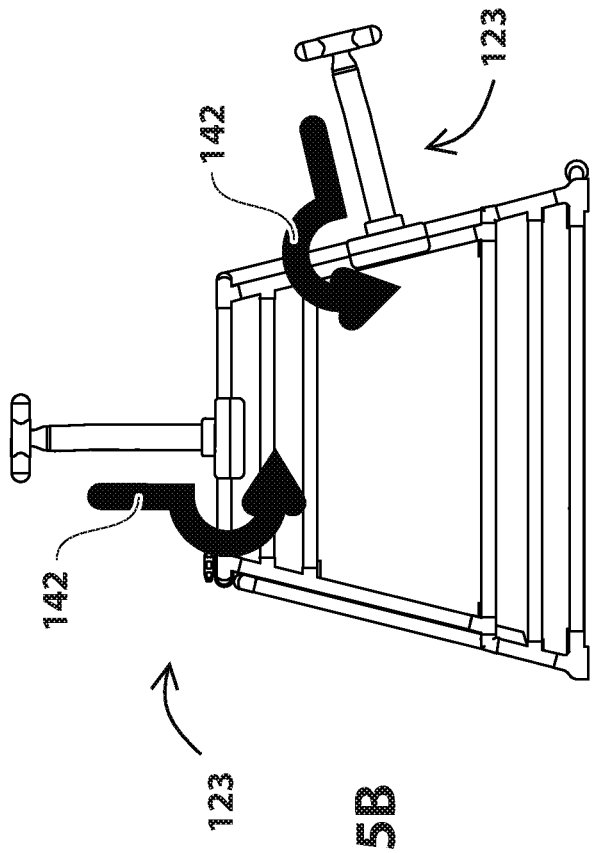
Figure 15D:
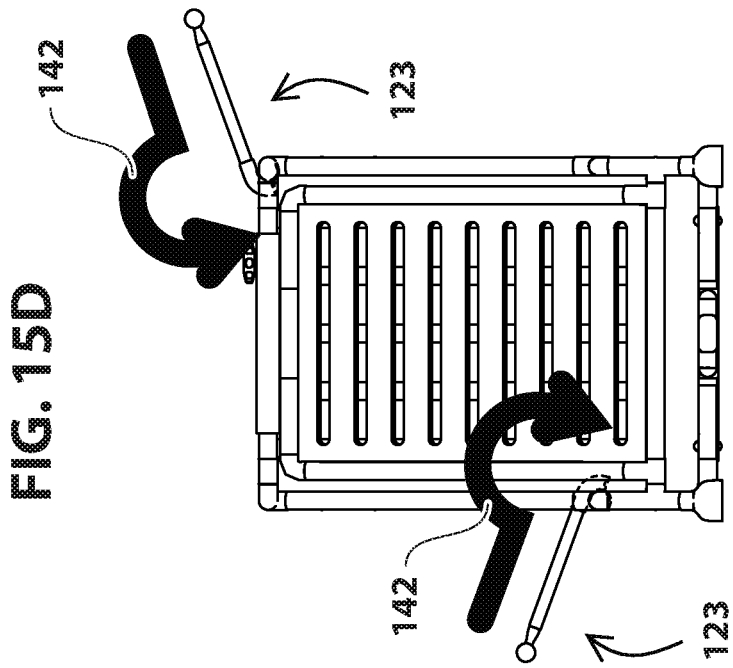
Figure 15C:
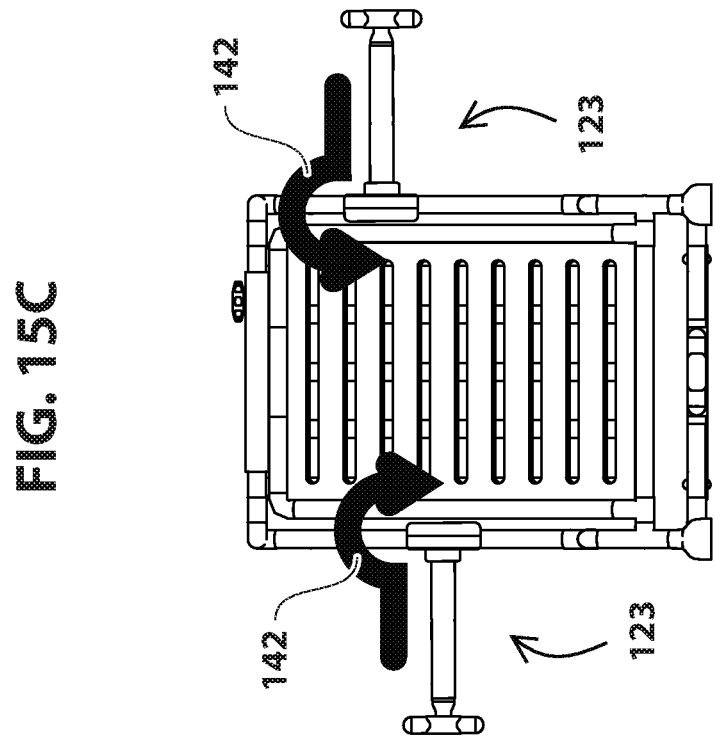
Figure 16B:
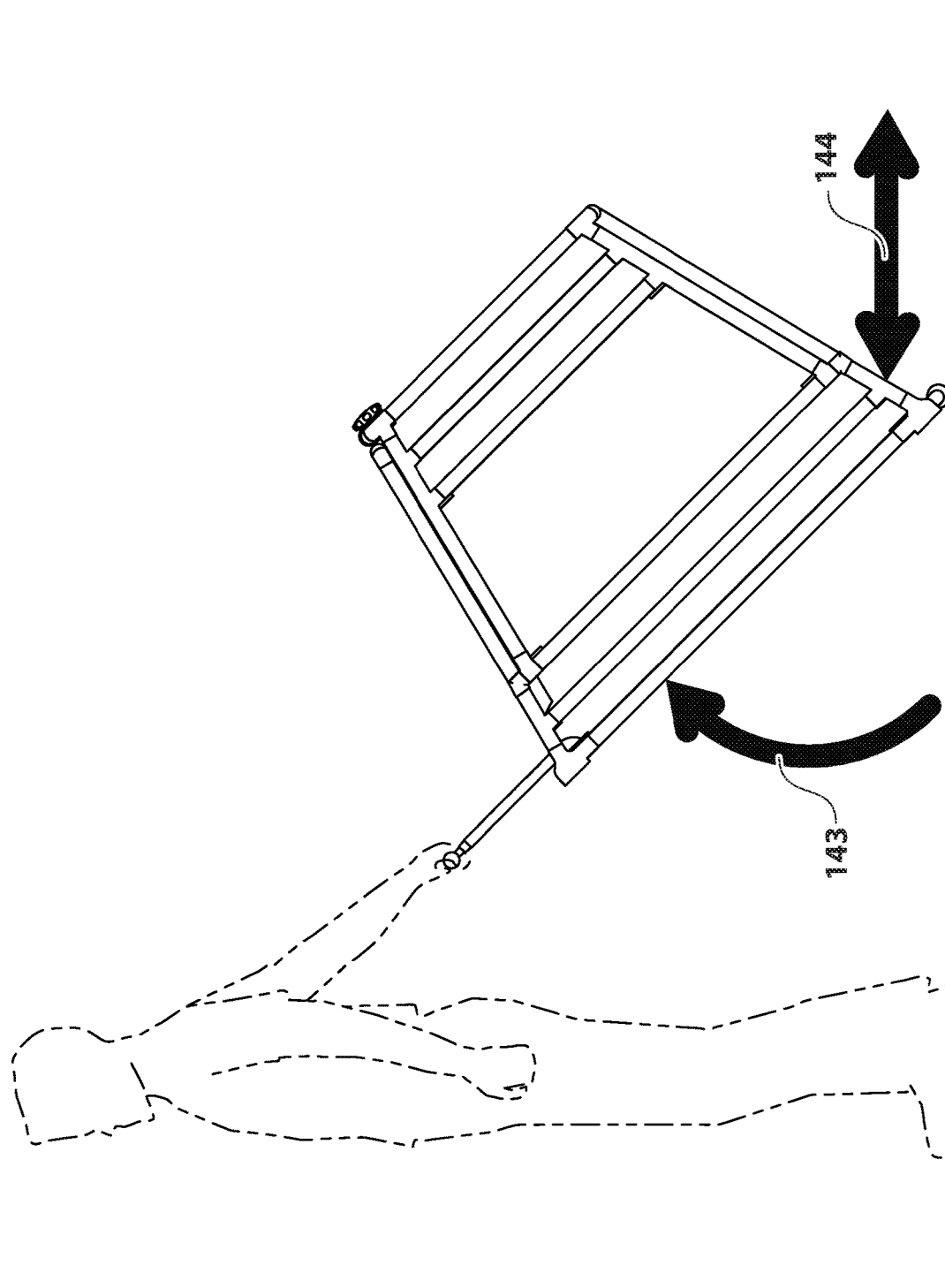
FIG. 16B illustrates a side view of the lifting and towing of the crumplable rollable collapsible drying-grooming-platform-patio-crumple-zone-ramp-and-door pet crate.

Referring to FIG. 8A, FIG. 8B, FIG. 9A, FIG. 9B, FIG. 10A, FIG. 10B, FIG. 11, FIG. 12A, FIG. 12B, FIG. 13A, FIG. 13B, FIG. 14, FIG. 15A, FIG. 15B, FIG. 15C, FIG. 15D, FIG. 16A, and FIG. 16B, the crumplable rollable collapsible drying-grooming-platform-patio-crumple-zone-ramp-and-door pet crate comprises:
1) Pet-safety-oriented panel system 101 is for performing the combined functions of its components.
2) Top handle-attaching foldable panel 102 is for:
Foldably and collapsibly providing a roof to secure pets inside and keep them safe.
3) Bottom handle-attaching panel 103 is for:
Providing a comfortable floor to secure pets inside and keep them safe.
4) Left handle-attaching foldable panel 104 is for:
Foldably and collapsibly providing a breathable wall to secure pets inside and keep them safe.
5) Right handle-attaching foldable panel 105 is for:
Foldably and collapsibly providing a breathable wall to secure pets inside and keep them safe.
6) Rear handle-attaching foldable panel 106 is for:
Foldably and collapsibly providing a back breathable wall to secure pets inside and keep them safe.
7) Front handle-attaching foldable panel 107 is for:
Foldably and collapsibly providing a front frame to secure pets inside and keep them safe.
8) Four top corner connectors 108 respectively are for:
Connecting top handle-attaching foldable panel 102 to left handle-attaching foldable panel 104 and right handle-attaching foldable panel 105.
9) Four bottom corner connectors 109 respectively are for:
Connecting bottom handle-attaching panel 103 to left handle-attaching foldable panel 104 and right handle-attaching foldable panel 105.
10) Six hinges 110 respectively are for:
Hingedly connecting top handle-attaching foldable panel 102, bottom handle-attaching panel 103, left handle-attaching foldable panel 104, right handle-attaching foldable panel 105, and rear handle-attaching foldable panel 106 together.
11) Two drying-grooming-platform-patio-crumple-zone-ramp-and-door hinges 111 respectively are for:
a) Hingedly attaching multi-function drying-grooming-platform-patio-crumple-zone-ramp-and-door system 117 to front handle-attaching foldable panel 107 (see FIG. 2A and FIG. 2B);
b) Hingedly creating a grooming platform for pets by allowing inner drying-grooming-platform-patio-crumple-zone-ramp-and-door 118 and outer drying-grooming-platform-patio-crumple-zone-ramp-and-door 119 to be situated horizontally (see FIG. 9B, FIG. 12, and FIG. 17C);

c) Hingedly creating a drying platform for pets by allowing inner drying-grooming-platform-patio-crumple-zone-ramp-and-door 118 and outer drying-grooming-platform-patio-crumple-zone-ramp-and-door 119 to be situated horizontally
(see FIG. 9B, FIG. 12, and FIG. 17C);
d) Hingedly creating a patio for pets by allowing inner drying-grooming-platform-patio-crumple-zone-ramp-and-door 118 and outer drying-grooming-platform-patio-crumple-zone-ramp-and-door 119 to be situated horizontally
(see FIG. 9B, FIG. 12, and FIG. 17C);
e) Allowing inner drying-grooming-platform-patio-crumple-zone-ramp-and-door 118 and outer drying-grooming-platform-patio-crumple-zone-ramp-and-door 119 to be an adjustable ramp for pets to conveniently safely quickly and easily enter and exit the crumplable rollable collapsible drying-grooming-platform-patio-crumple-zone-ramp-and-door pet crate from many different angles
(see FIG. 8A, FIG. 12, and FIG. 17C).
12) Four crate-stabilizing flaring feet 112 respectively are for:
Stabilizing the crumplable rollable collapsible drying-grooming-platform-patio-crumple-zone-ramp-and-door pet crate.
13) Two wheel brackets 113 respectively are for:
Attaching two wheels 114.
14) Two wheels 114 is for:
Helping provide easier transportation of the crumplable rollable collapsible drying-grooming-platform-patio-crumple-zone-ramp-and-door pet crate.
15) Tray 115 is for:
16) Panel-unlocking spring-loaded buttons 116 respectively are for:
Springedly disengaging the left handle-attaching foldable panel 104 and right handle-attaching foldable panel 105 from top handle-attaching foldable panel 102 to foldibly collapse the crumplable rollable collapsible drying-grooming-platform-patio-crumple-zone-ramp-and-door pet crate for easier storage;
17) Multi-function drying-grooming-platform-patio-crumple-zone-ramp-and-door system 117 is for performing the combined functions of its components.
18) Inner drying-grooming-platform-patio-crumple-zone-ramp-and-door 118 is for:
a) Providing a drying platform for pets
to dry after bathing
(see FIG. 9B, FIG. 12, and FIG. 17C);
b) Providing a grooming platform for pets
to groom pets
(see FIG. 9B, FIG. 12, and FIG. 17C);
c) Providing a patio for pets
to give a place for pets to rest
(see FIG. 9B, FIG. 12, and FIG. 17C);
d) Providing a crumple zone in a collision
to help protect pets in a collision
(see FIG. 9B, FIG. 12, and FIG. 17C);
e) Slidably providing a ramp for dog to conveniently safely quickly and easily enter and exit the crumplable rollable collapsible drying-grooming-platform-patio-crumple-zone-ramp-and-door pet crate, pulled out
in the direction or the arrow 136
to make entry and exit of the crate easier
(see FIG. 3A, FIG. 3B, FIG. 4A, FIG. 4B, FIG. 8A, FIG. 8B, FIG. 18, FIG. 22A, FIG. 22B, and FIG. 22C); and
f) Foldably being a leg
in the direction of arrow 137
to support the multi-function drying-grooming-platform-patio-crumple-zone-ramp-and-door system 117,
(see FIG. 9A, FIG. 9B, FIG. 12, and FIG. 17C).
19) Outer drying-grooming-platform-patio-crumple-zone-ramp-and-door 119 is for:
a) Providing a drying platform for pets
to dry pets after bathing
(see FIG. 9B, FIG. 12, and FIG. 17C);
b) Providing a grooming platform for pets
(see FIG. 9B, FIG. 12, and FIG. 17C);
c) Providing a patio for pets
(see FIG. 9B, FIG. 12, and FIG. 17C);
d) Providing a crumple zone in a collision
(see FIG. 15A, FIG. 15B, FIG. 16A, and FIG. 16B); and
e) Providing a ramp for dog to conveniently safely quickly and easily enter and exit the crumplable rollable collapsible drying-grooming-platform-patio-crumple-zone-ramp-and-door pet crate
to make entry and exit of the crate easier
(see FIG. 3A, FIG. 3B, FIG. 4A, FIG. 4B, FIG. 8A, FIG. 8B, FIG. 18, FIG. 22A, FIG. 22B, and FIG. 22C).
20) Crumple-zone-ramp-and-door-locking quick-release hand knob 120 is for:
Rotatably and springedly releasing and locking crumple-zone-ramp-and-door-locking quick-release locking pin 121 from locking-pin recess 122.
21) Crumple-zone-ramp-and-door-locking quick-release locking pin 121 is for:
a) Locking multi-function drying-grooming-platform-patio-crumple-zone-ramp-and-door system 117
to provide safety and security to pets
(see FIG. 6A and FIG. 6B);
b) Unlocking multi-function drying-grooming-platform-patio-crumple-zone-ramp-and-door system 117
to allow pets to easily exit the crate
(see FIG. 6A and FIG. 6B); and
c) Automatically and springedly locking multi-function drying-grooming-platform-patio-crumple-zone-ramp-and-door system 117
to make the operation of ramp-and-door system 117 easier
(see FIG. 6A and FIG. 6B).
22) Locking-pin recess 122 is for:
Allowing crumple-zone-ramp-and-door-locking quick-release locking pin 121 to securely lock multi-function drying-grooming-platform-patio-crumple-zone-ramp-and-door system 117.
23) Multi-function detachable storable seatback-attachable headrest-attachable leg-handle system 123 is for performing the combined functions of its components.
24) Multi-function T-shaped handle 124 is for:
a) Providing grip for multi-function detachable storable seatback-attachable headrest-attachable leg-handle system 123
to make hand operation easier
(see FIG. 5A and FIG. 5B);
b) Slidably locking between two car seat,
in the direction of arrow 138
to prevent the crumplable rollable collapsible drying-grooming-platform-patio-crumple-zone-ramp-and-door pet crate from moving during travel to prevent crate from moving during travel (see FIG. 10A, FIG. 11, FIG. 12A, FIG. 12B, FIG. 13A, and FIG. 13B);
c) Slidably locking between headrest posts
in the direction of arrow 139
to prevent the crumplable rollable collapsible drying-grooming-platform-patio-crumple-zone-ramp-and-door pet crate from moving during travel to prevent the crate from moving during travel
(see FIG. 10B, FIG. 11, FIG. 12A, FIG. 12B, FIG. 13A, and FIG. 13B);
d) Functioning as a support foot for multi-function drying-grooming-platform-patio-crumple-zone-ramp-and-door system 117
to create a grooming platform, a drying platform, and a patio
(see FIG. 9A, FIG. 9B, FIG. 14, FIG. 16, and FIG. 21).

Figure 21:
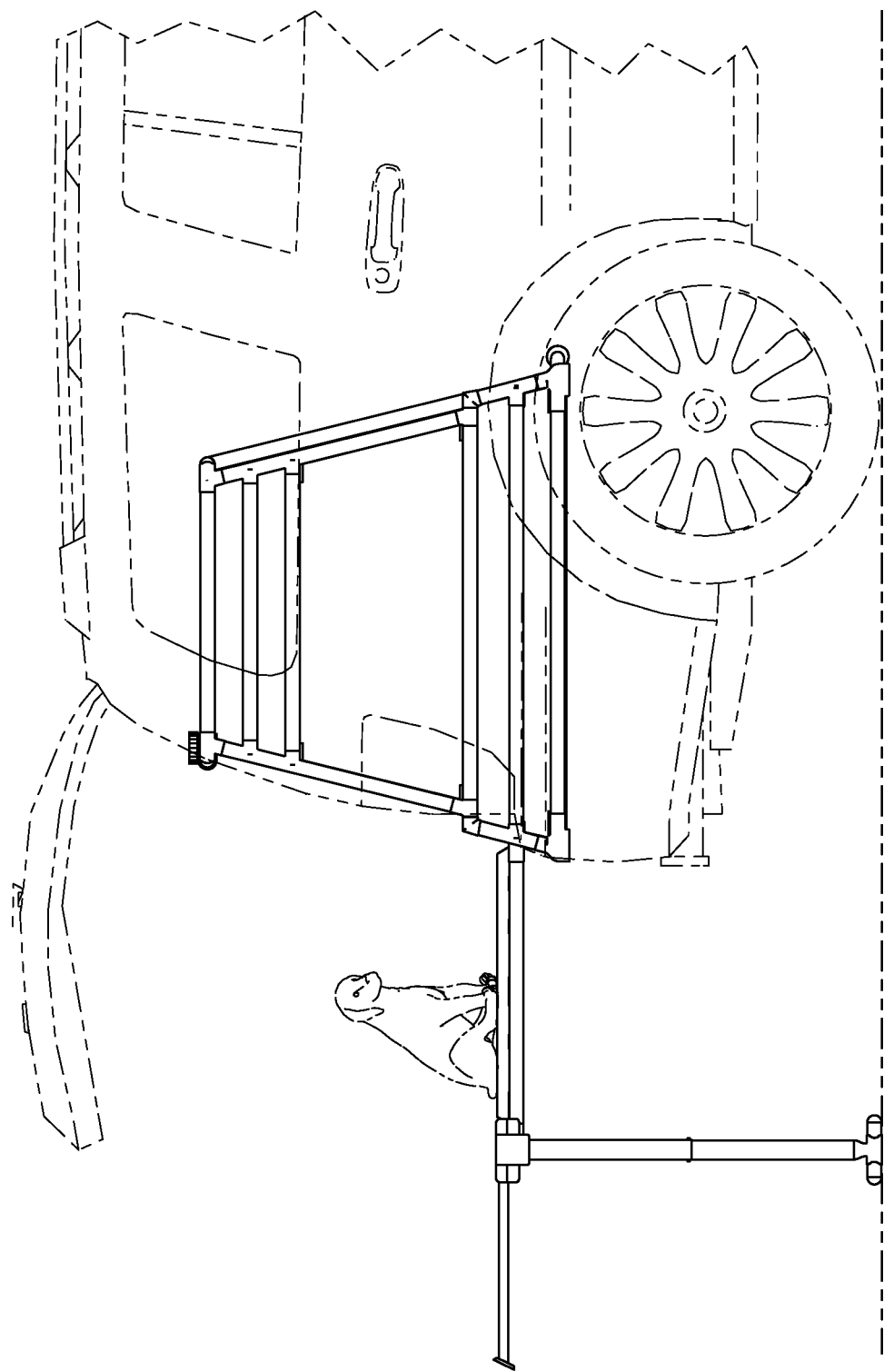
FIG. 21 illustrates a side view of how the variant adjustable the multi-function detachable storable seatback-attachable headrest-attachable leg-handle system can be used as a support leg to create a grooming platform, a drying platform and a patio.

25) Multi-function I-shaped leg 125 is for:
a) Functioning as a crumple-zone
in the direction of arrows 140 and 141
to protect the crumplable rollable collapsible drying-grooming-platform-patio-crumple-zone-ramp-and-door pet crate, and
to provide additional safety and security to pets
(see FIG. 12A, FIG. 12B, FIG. 13A, and FIG. 13B);
b) Functioning as a leg to support multi-function drying-grooming-platform-patio-crumple-zone-ramp-and-door system 117
to act as a grooming platform
(see FIG. 16 and FIG. 21);
c) Functioning as a leg to support multi-function drying-grooming-platform-patio-crumple-zone-ramp-and-door system 117
to act as a drying platform
(see FIG. 16 and FIG. 21);
d) Functioning as a leg to support multi-function drying-grooming-platform-patio-crumple-zone-ramp-and-door system 117
to act as a patio for pets to rest
(see FIG. 16 and FIG. 21).

26) Panel-snap-locking hook 126 is for:
a) Locking multi-function detachable storable seatback-attachable headrest-attachable leg-handle system 123
to top handle-attaching foldable panel 102 in multiple locations and positions
in the direction of arrow 142
to provide multiple configuration options
(see FIG. 14, FIG. 15A, FIG. 15B, FIG. 15C, and FIG. 15D);
b) Locking multi-function detachable storable seatback-attachable headrest-attachable leg-handle system 123
to bottom handle-attaching panel 103 in multiple locations and positions
in the direction of arrow 142
to provide multiple configuration options
(see FIG. 14, FIG. 15A, FIG. 15B, FIG. 15C, FIG. 15D, and FIG. 16A), and
to lift and tow the crumplable rollable collapsible drying-grooming-platform-patio-crumple-zone-ramp-and-door pet crate
in the directions of arrows 143 and 144, respectively
(see FIG. 16B);
c) Locking multi-function detachable storable seatback-attachable headrest-attachable leg-handle system 123
to left handle-attaching foldable panel 104 in multiple locations and positions
in the direction of arrow 142
to provide multiple configuration options
(see FIG. 14, FIG. 15A, FIG. 15B, FIG. 15C and FIG. 15D);
d) Locking multi-function detachable storable seatback-attachable headrest-attachable leg-handle system 123
to right handle-attaching foldable panel 105 in multiple locations and positions
in the direction of arrow 142
to provide multiple configuration options
(see FIG. 14, FIG. 15A, FIG. 15B, FIG. 15C and FIG. 15D);
e) Locking multi-function detachable storable seatback-attachable headrest-attachable leg-handle system 123
to rear handle-attaching foldable panel 106 in multiple locations and positions
in the direction of arrow 142
to provide multiple configuration options
(see FIG. 14, FIG. 15A, FIG. 15B, FIG. 15C and FIG. 15D);

27) Temperature-sensor alarm system 127 is for performing the combined functions of its components.

28) Alarm-housing 128 is for:
Housing processor 129, memory 130, display 131, software 132, temperature sensor 133, alert Speaker 134, and alert Light 135
(see FIG. 6A and FIG. 6B).

29) Processor 129 is for:
Processing data from temperature sensor 133 against data from memory 130
(see FIG. 6A and FIG. 6B).

30) Memory 130 is for:
Storing data
(see FIG. 6A and FIG. 6B).

31) Display 131 is for:
Displaying data
(see FIG. 6A and FIG. 6B).

32) Software 132 is for:
Operating processor 129.
(see FIG. 6A and FIG. 6B).

33) Temperature sensor 133 is for:
Measuring the temperature inside crumplable rollable collapsible drying-grooming-platform-patio-crumple-zone-ramp-and-door pet crate
(see FIG. 6A and FIG. 6B).

34) Alert speaker 134 is for:
Emitting audible alert when the temperature inside crumplable rollable collapsible drying-grooming-platform-patio-crumple-zone-ramp-and-door pet crate exceeds a preset temperature
(see FIG. 6A and FIG. 6B).

35) Alert light 135 is for:
Emitting light when alert speaker 134 emits audible alert
(see FIG. 6A and FIG. 6B).

Variation

Figure 17A:
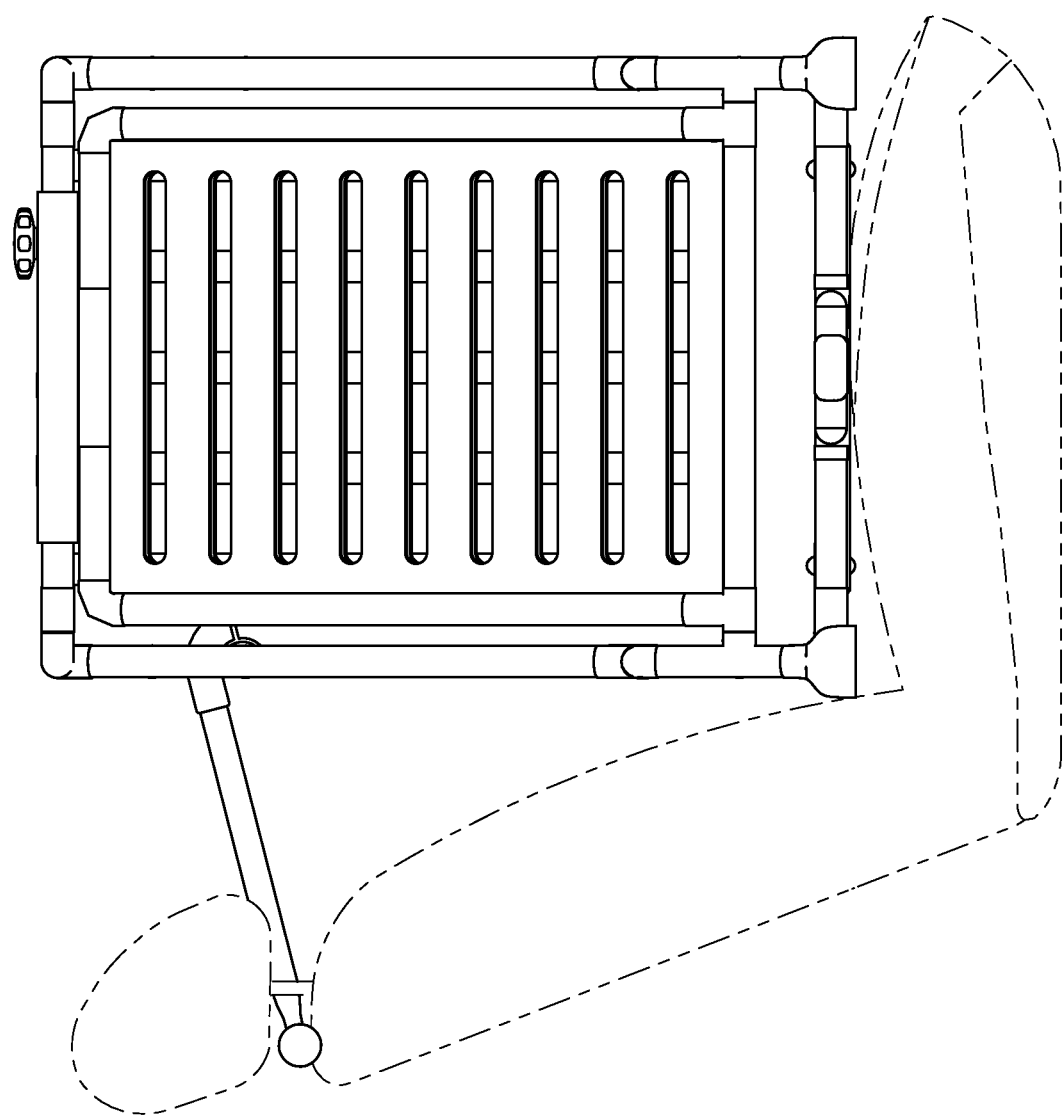
FIG. 17A, FIG. 17B, FIG. 17C, and FIG. 18 illustrate side, perspective and rear views of the crumplable rollable collapsible drying-grooming-platform-patio-crumple-zone-ramp-and-door pet crate and how it can be attached to the back seat using the multi-function detachable storable seatback-attachable headrest-attachable leg-handle system extending out of the rear passenger doors, as a variation.
Figure 17B:
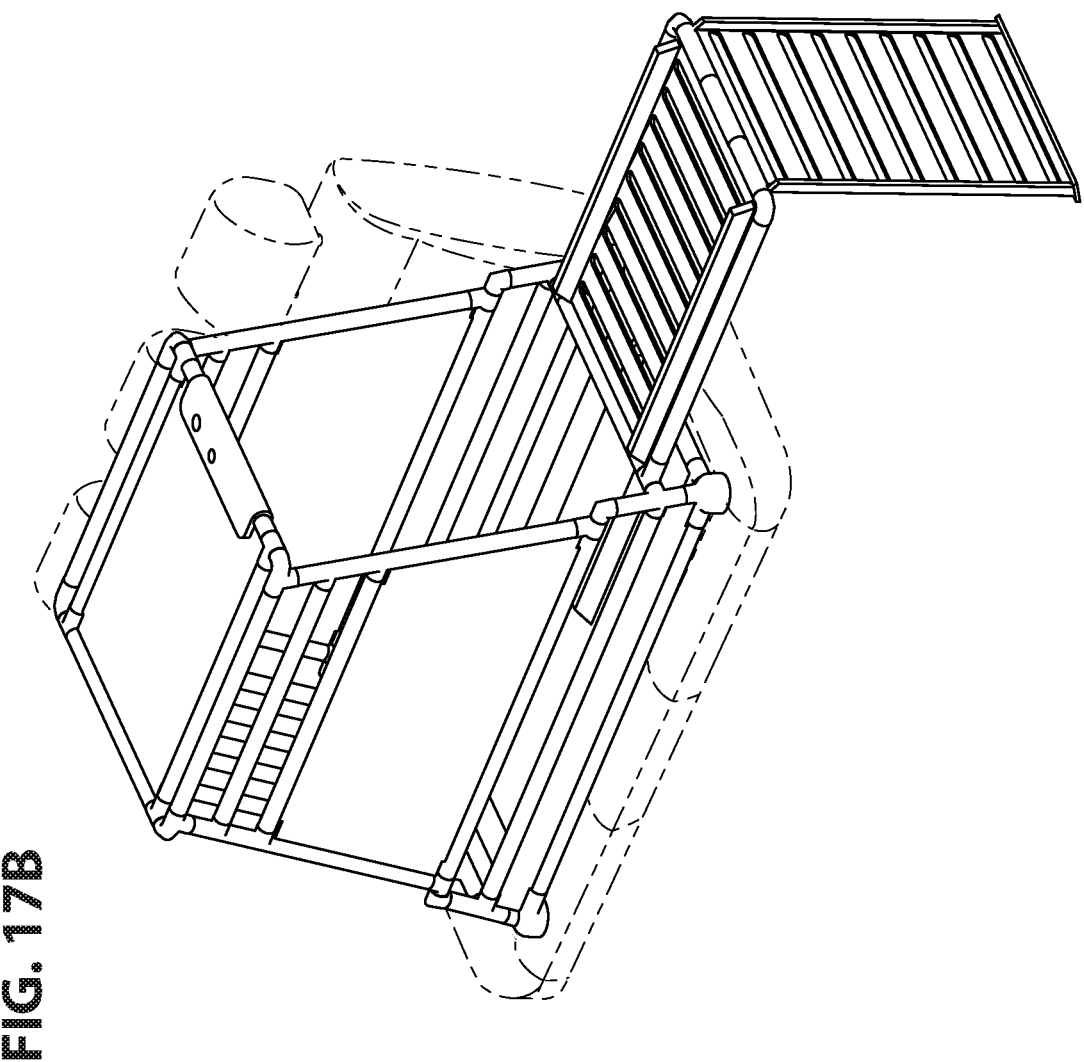
Figure 17C:
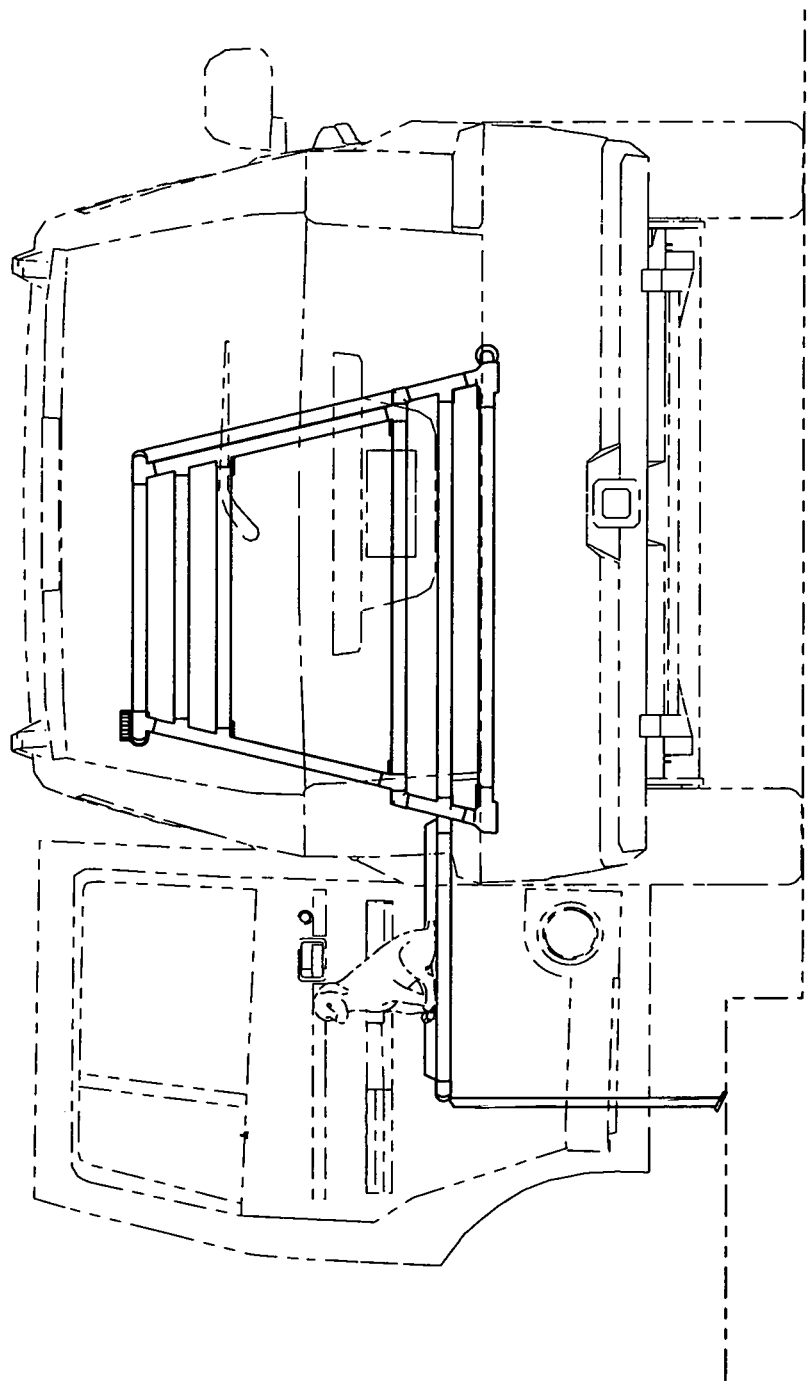
Figure 18:
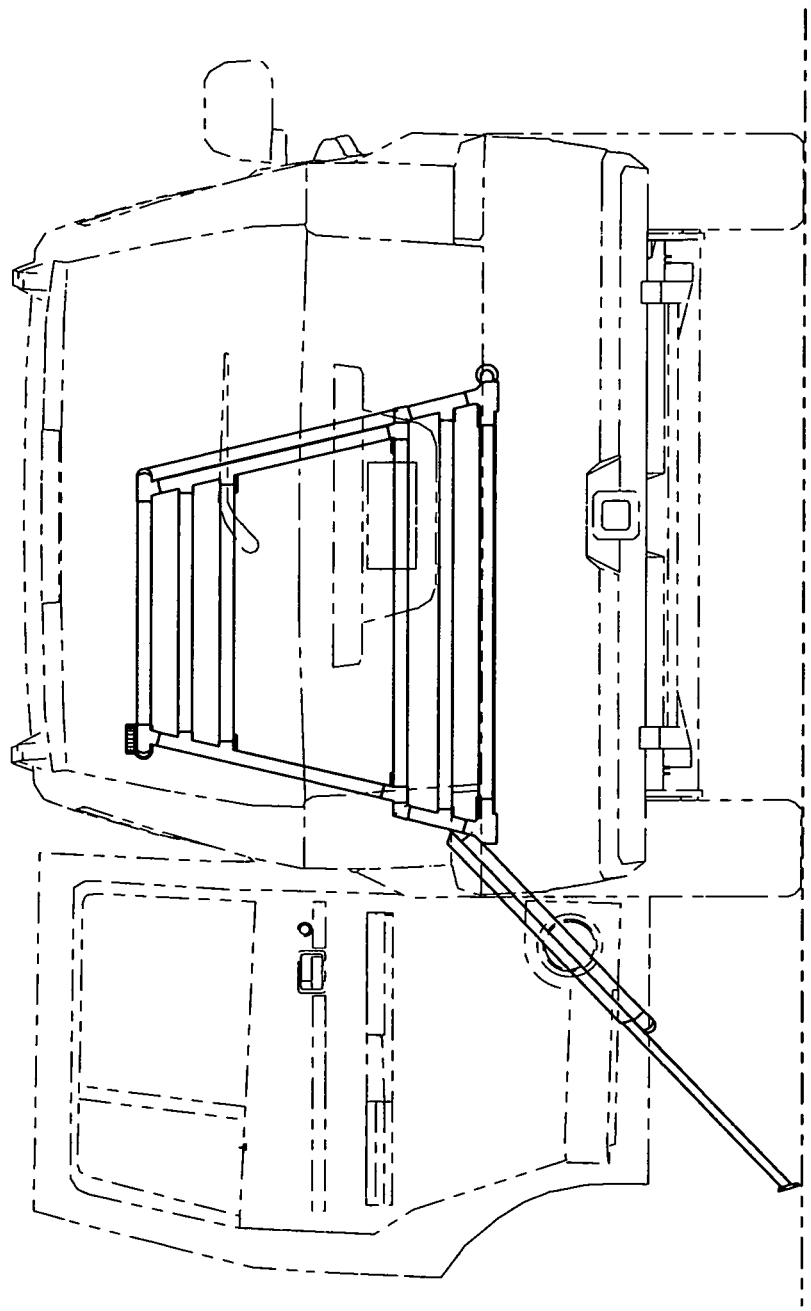
Figure 20C:
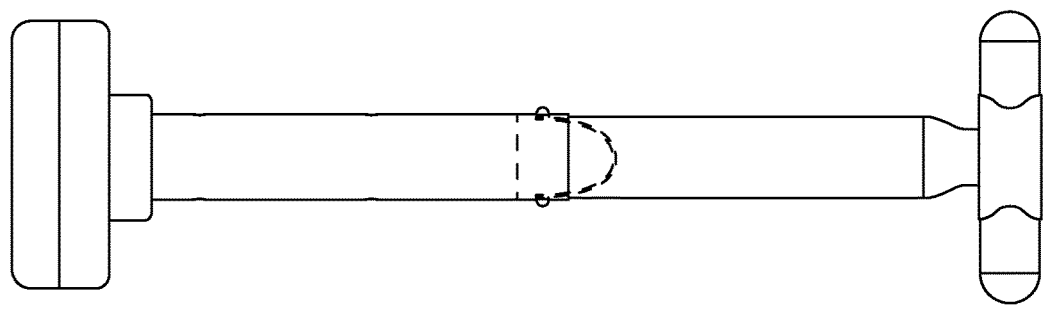
FIG. 20A, FIG. 20B, and FIG. 20C, illustrates the different adjustable lengths of the variant the multi-function detachable storable seatback-attachable headrest-attachable leg-handle system.
Figure 20B:
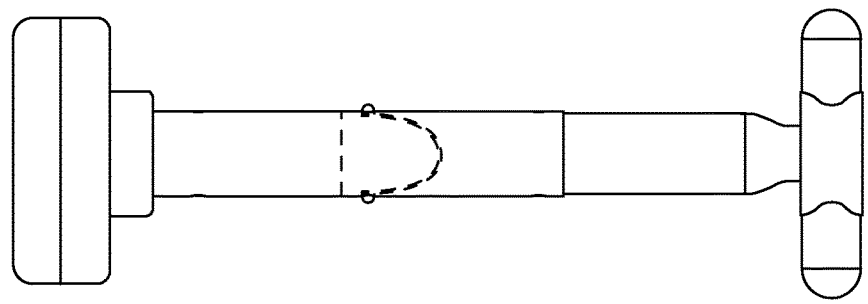
Figure 20A:
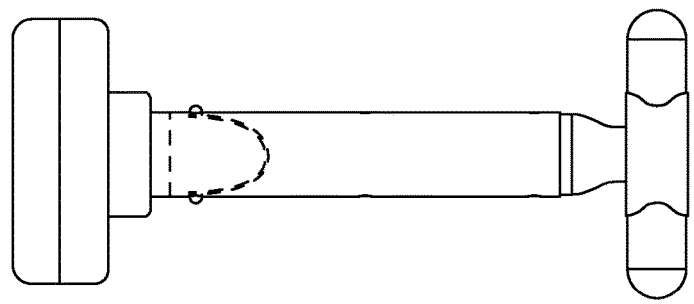
Figure 22A:
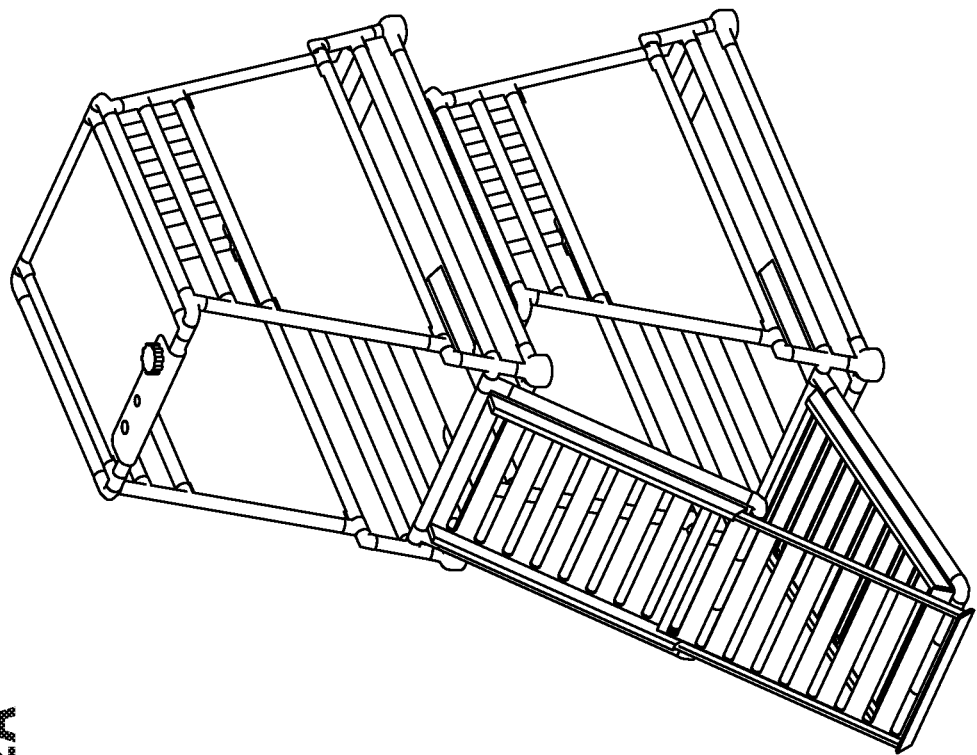
FIG. 22A, FIG. 22B, and FIG. 22C illustrate side and perspective views of how the crumplable rollable collapsible drying-grooming-platform-patio-crumple-zone-ramp-and-door pet crate can be stacked and transported this way with a larger vehicle.
Figure 22B:
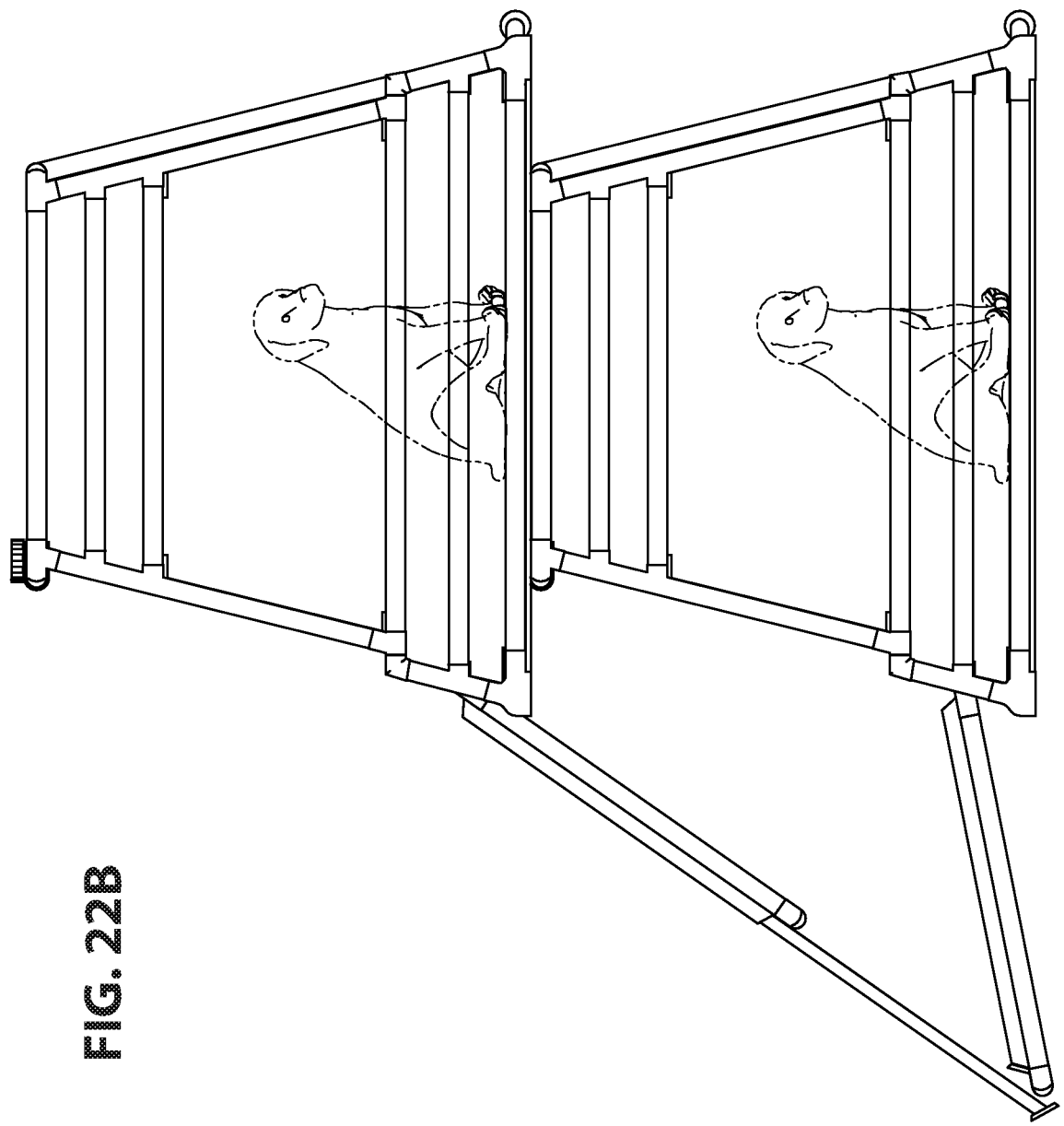
Figure 22C:
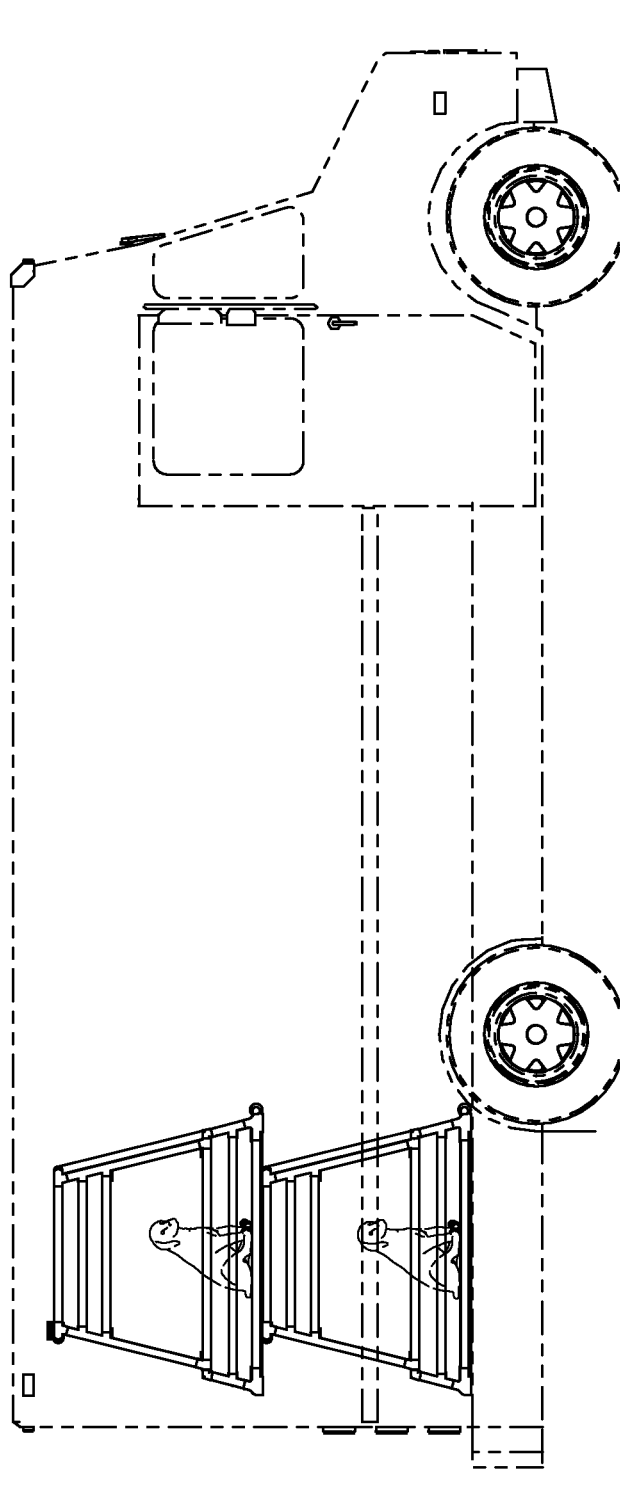
Figure 23:
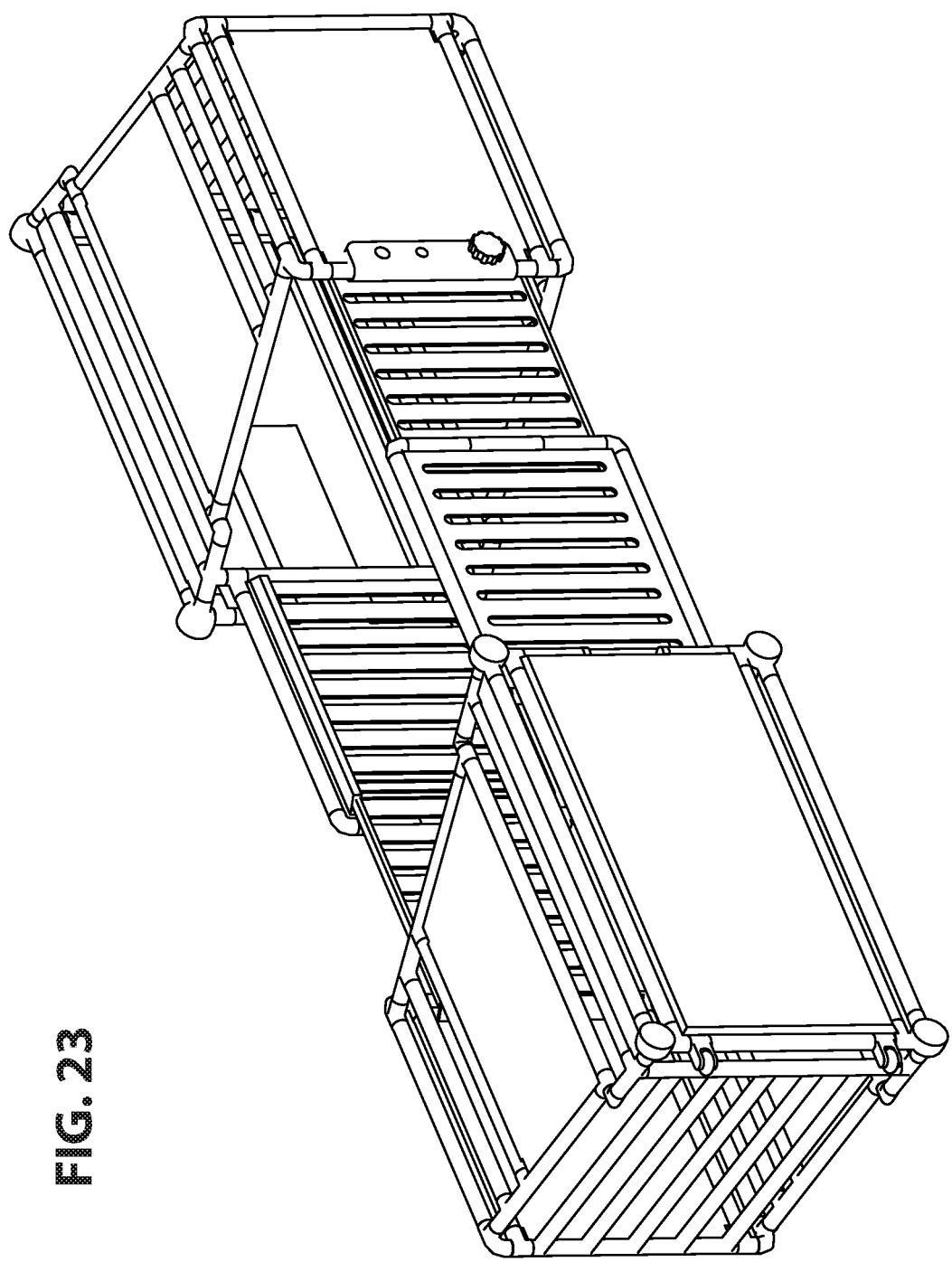
FIG. 23, FIG. 24, FIG. 25, FIG. 26, and FIG. 27 illustrate perspective views of how you can create various kennels by adding more crates and turning them on their sides and using the multi-function drying-grooming-platform-patio-crumple-zone-ramp-and-door system as a fence to help contain pets.
Figure 24:
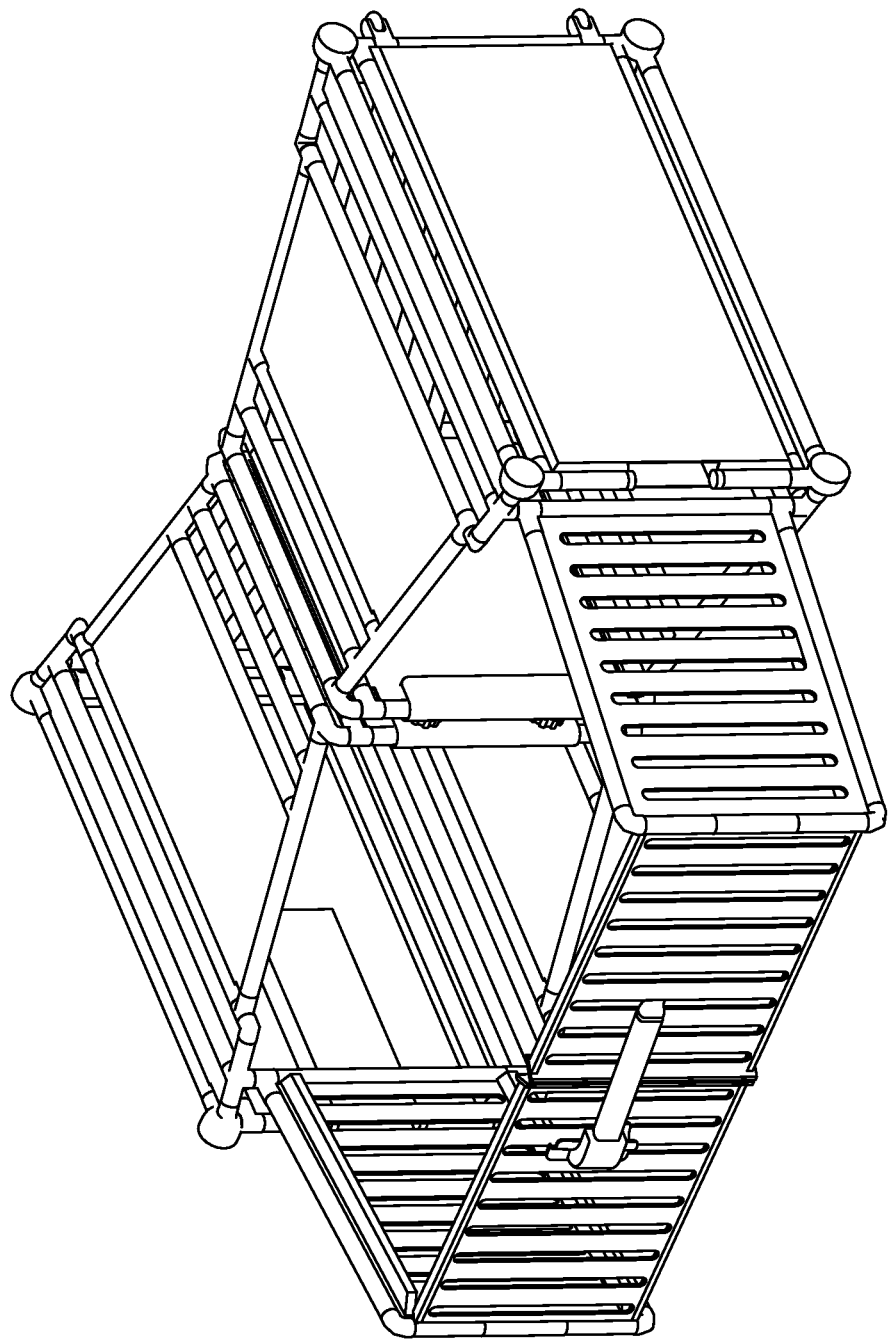
Figure 25:
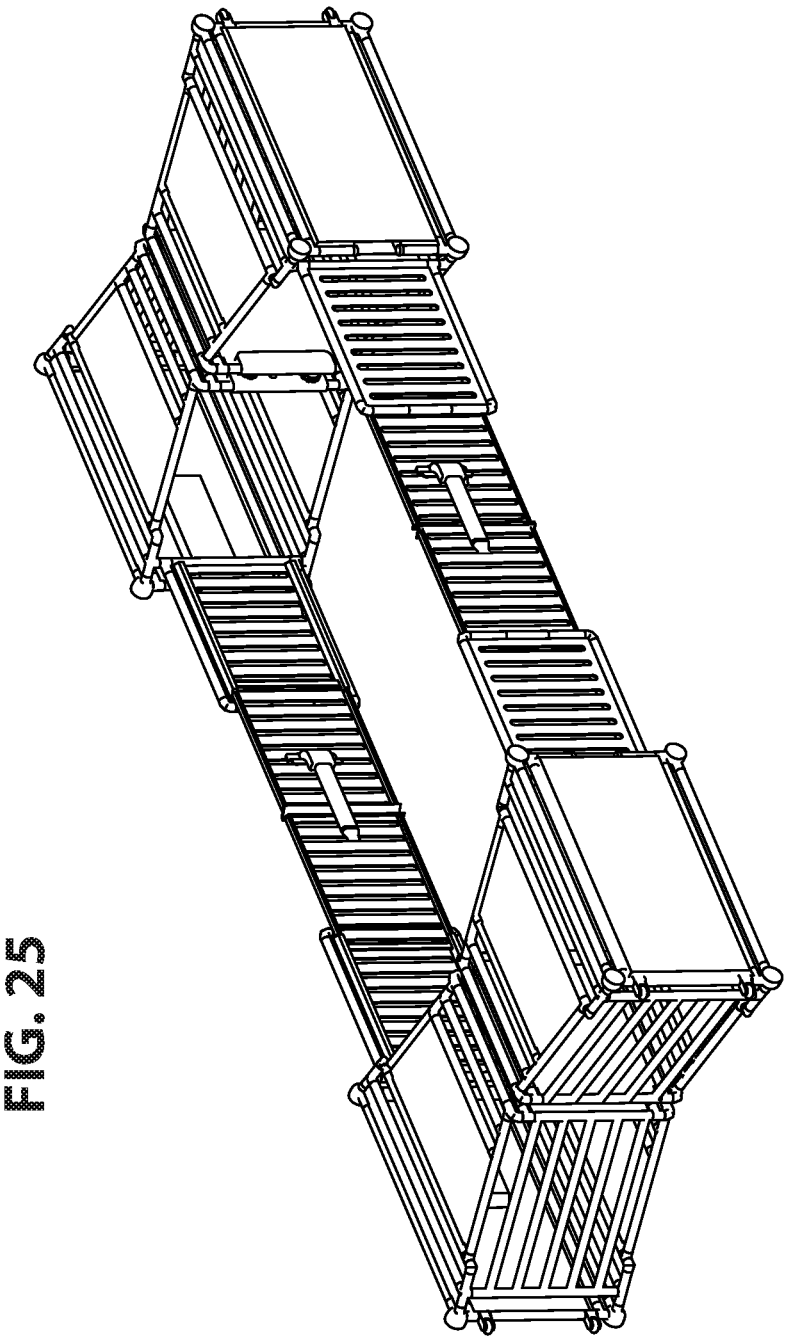
Figure 26:
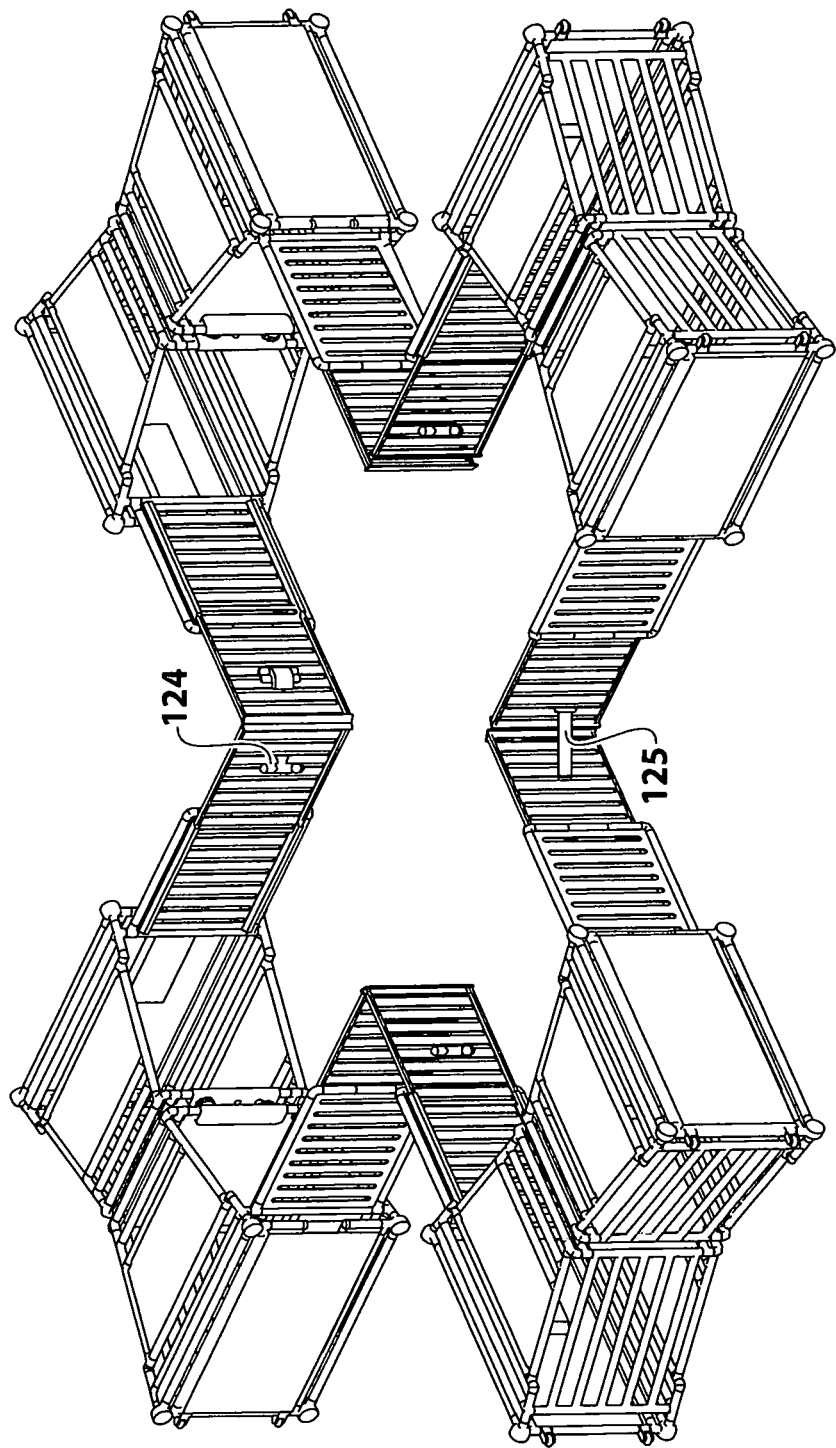
Figure 27:
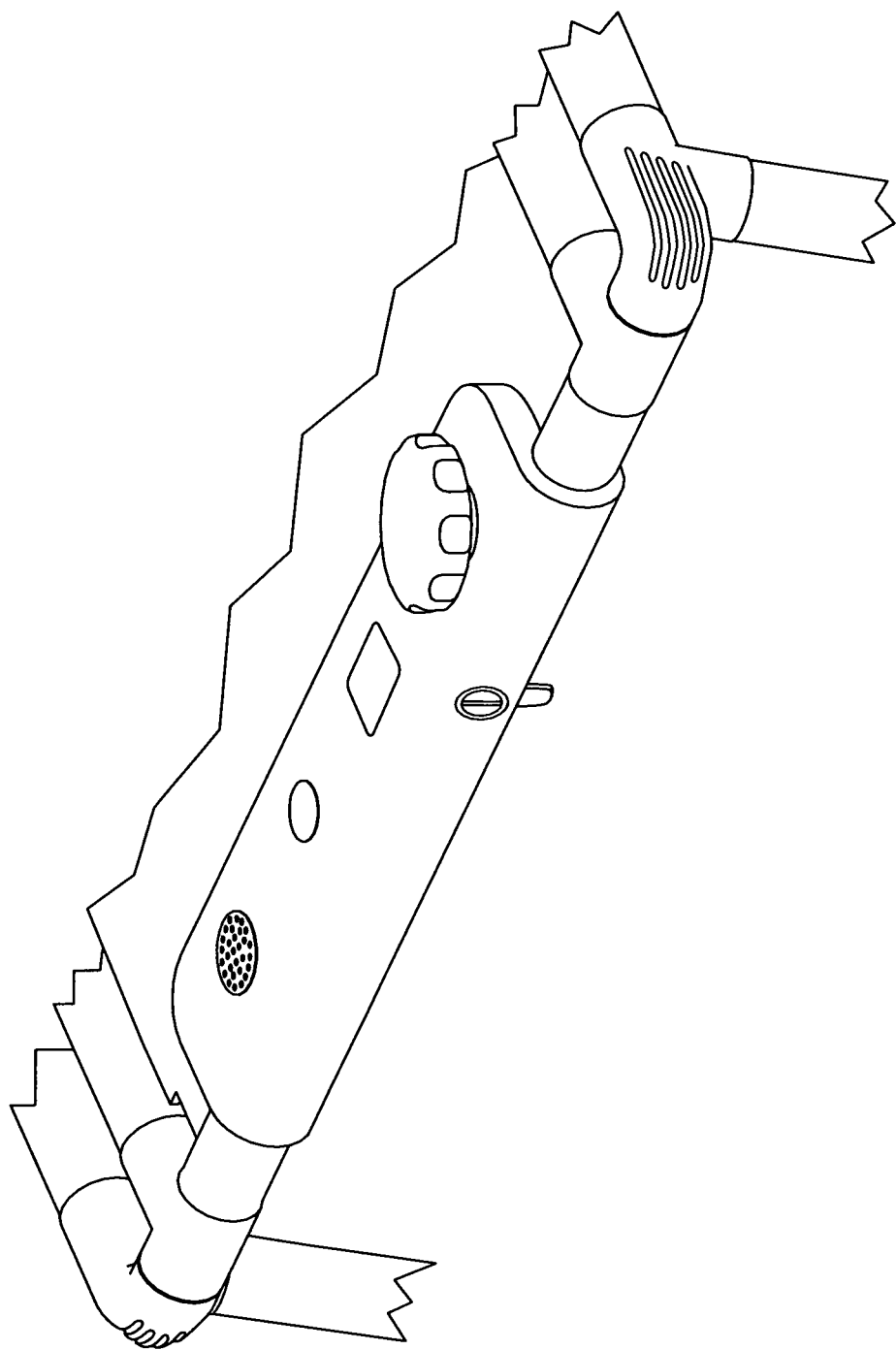
Figure 30:
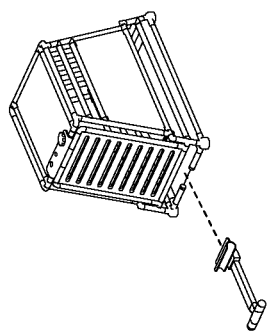
FIG. 28, FIG. 29 and FIG. 30 illustrates perspective views of variant designs of the crumplable rollable collapsible drying-grooming-platform-patio-crumple-zone-ramp-and-door pet crate and its components.
Figure 29:
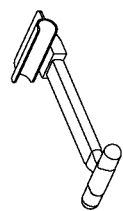
Figure 28:
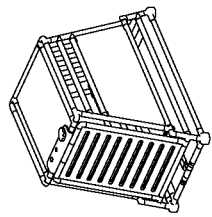
Figure 31D:
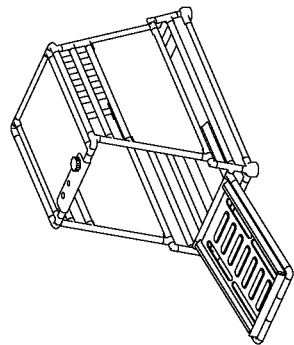
FIG. 31A, FIG. 31B, FIG. 31C, and FIG. 31D illustrate perspective views of variant designs of the crumplable rollable collapsible drying-grooming-platform-patio-crumple-zone-ramp-and-door pet crate and its components.
Figure 31C:
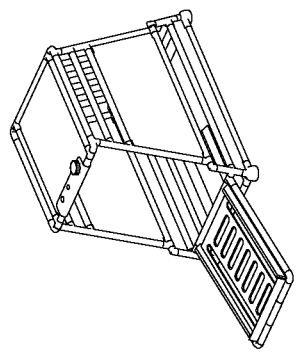
Figure 31B:
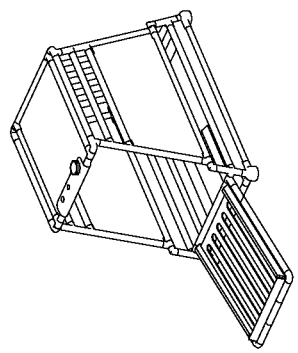
Figure 31A:
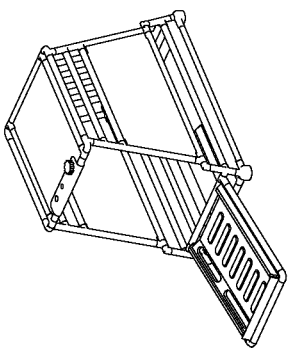

Any component of the crumplable rollable collapsible drying-grooming-platform-patio-crumple-zone-ramp-and-door pet crate can have any shape and size. Any component of the crumplable rollable collapsible drying-grooming-platform-patio-crumple-zone-ramp-and-door pet crate can be made of any material(s). FIG. 17A and FIG. 17B illustrate front and perspective views of a variation of how to attach the crumplable rollable collapsible drying-grooming-platform-patio-crumple-zone-ramp-and-door pet crate in the back seat. FIG. 17C and FIG. 18 illustrate side views of variations of attaching the crumplable rollable collapsible drying-grooming-platform-patio-crumple-zone-ramp-anddoor pet crate in the back seat and accessing the crate using the passenger doors. FIG. 19A and FIG. 19B illustrate perspective views of variations of a length-adjustable multi-function detachable storable seatback-attachable headrest-attachable leg-handle system. FIG. 20A, FIG. 20B, and FIG. 20C illustrate front views of the length-adjustable multi-function detachable storable seatback-attachable headrest-attachable leg-handle system variation and demonstrates the different adjustable lengths. FIG. 21 illustrates a side view of a variation of how to use the variation multi-function detachable storable seatback-attachable headrest-attachable leg-handle system to create a grooming platform, drying platform and patio. FIG. 22A, FIG. 22B, and FIG. 22C illustrate perspective and side views of a variation of the crumplable rollable collapsible drying-grooming-platform-patio-crumple-zone-ramp-and-door pet crate and how multiple crates are stackable. FIG. 23, FIG. 24, FIG. 25, FIG. 26, and FIG. 27 illustrate perspective views of variation kennel configurations that can be achieved by adding addition crates and turning them on their sides and using multi-function drying-grooming-platform-patio-crumple-zone-ramp-and-door systems to contain pets. FIG. 28, FIG. 29, and FIG. 30 illustrate perspective views of variations of the crumplable rollable collapsible drying-grooming-platform-patio-crumple-zone-ramp-and-door pet crate and the multi-function detachable storable seatback-attachable headrest-attachable leg-handle system. FIG. 31A, FIG. 31B, FIG. 31C, and FIG. 31D illustrate perspective views of variant designs of the crumplable rollable collapsible drying-grooming-platform-patio-crumple-zone-ramp-and-door pet crate and its components. FIG. 31A illustrates the inner and outer doors, equivalent to inner drying-grooming-platform-patio-crumple-zone-ramp-and-door 118 and outer drying-grooming-platform-patio-crumple-zone-ramp-and-door 119. The inner door has a U-shaped cross-section with central grooves, and the outer door has a U-shaped cross-section with central ridges.

MAJOR ADVANTAGES OF THE INVENTION

The present invention substantially departs from the conventional concepts and designs of the prior art. In doing so, the present invention provides a crumplable rollable collapsible drying-grooming-platform-patio-crumple-zone-ramp-and-door pet crate (having: a) Pet-safety-oriented panel system, b) Multi-function drying-grooming-platform-patio-crumple-zone-ramp-and-door system, c) Multi-function detachable storable seatback-attachable headrest-attachable leg-handle system, and d) Temperature-sensor alarm system), having many unique and significant features, functions, and advantages, which overcome all the disadvantages of the prior art, as follows:
1) It is an object of the new invention to provide a crumplable rollable collapsible drying-grooming-platform-patio-crumple-zone-ramp-and-door pet crate, having
   an inner drying-grooming-platform-patio-crumple-zone-ramp-and-door 118.
   Therefore, the crumplable rollable collapsible drying-grooming-platform-patio-crumple-zone-ramp-and-door pet crate:
   a) Can be used as a drying platform for pets,
      to dry pets after bathing
      (see FIG. 9B, FIG. 12, and FIG. 17C);
   b) Can be used as grooming platform for pets,
      to groom pets
      (see FIG. 9B, FIG. 12, and FIG. 17C);
   c) Can be used as a patio for pets,
      to give a place for pets to rest
      (see FIG. 9B, FIG. 12, and FIG. 17C);
   d) Can be used as a crumple zone,
      to help protect pets in a collision
      (see FIG. 9B, FIG. 12, and FIG. 17C);
   e) Can slidably be used as a ramp for pets to conveniently safely quickly and easily enter and exit,
      pulled out
      in the direction of the arrow 136
      to make entry and exit of the crate easier
      (see FIG. 3A, FIG. 3B, FIG. 4A, FIG. 4B, FIG. 8A, FIG. 8B, FIG. 18, FIG. 22A, FIG. 22B, and FIG. 22C); and
   f) Can be used as a leg,
      in the direction of the arrow 137
      to provide support for multi-function drying-grooming-platform-patio-crumple-zone-ramp-and-door system
      (see FIG. 9A, FIG. 9B, FIG. 12, and FIG. 17C).
2) It is another object of the new invention to provide a crumplable rollable collapsible drying-grooming-platform-patio-crumple-zone-ramp-and-door pet crate, having
   an outer drying-grooming-platform-patio-crumple-zone-ramp-and-door 119.
   Therefore, the crumplable rollable collapsible drying-grooming-platform-patio-crumple-zone-ramp-and-door pet crate:
   a) Can be used as a drying platform for pets,
      to dry pets after bathing
      (see FIG. 9B, FIG. 12, and FIG. 17C);
   b) Can be used as grooming platform for pets,
      to groom pets
      (see FIG. 9B, FIG. 12, and FIG. 17C);
   c) Can be used as a patio for pets,
      to give a place for pets to rest
      (see FIG. 9B, FIG. 12, and FIG. 17C);
   d) Can be used as a crumple zone,
      to help protect pets in a collision
      (see FIG. 15A, FIG. 15B, FIG. 16A, and FIG. 16B); and
   e) Can be used as a ramp for pets to conveniently safely quickly and easily enter and exit,
      to make entry and exit of the crate easier
      (see FIG. 3A, FIG. 3B, FIG. 4A, FIG. 4B, FIG. 8A, FIG. 8B, FIG. 18, FIG. 22A, FIG. 22B, and FIG. 22C).
3) It is still another object of the new invention to provide a crumplable rollable collapsible drying-grooming-platform-patio-crumple-zone-ramp-and-door pet crate, having
   two drying-grooming-platform-patio-crumple-zone-ramp-and-door hinges 111.
   Therefore, the crumplable rollable collapsible drying-grooming-platform-patio-crumple-zone-ramp-and-door pet crate:
   a) Can be used with outer drying-grooming-platform-patio-crumple-zone-ramp-and-door 119 to create a door,
      to provide security to pets
      (see FIG. 3B, FIG. 3C, FIG. 3D, and FIG. 3E,);
   b) Can be used with inner drying-grooming-platform-patio-crumple-zone-ramp-and-door 118 and outer drying-grooming-platform-patio-crumple-zone-ramp-and-door 11 to create a grooming platform, to allow pets a place to be groomed
(see FIG. 3B, FIG. 3C, FIG. 3D, and FIG. 3E,);
c) Can be used with inner drying-grooming-platform-patio-crumple-zone-ramp-and-door 118 and outer drying-grooming-platform-patio-crumple-zone-ramp-and-door 11 to create a drying platform,
to give pets a place to dry after bathing
(see FIG. 8A, and FIG. 8B,);
d) Can be used with inner drying-grooming-platform-patio-crumple-zone-ramp-and-door 118 and outer drying-grooming-platform-patio-crumple-zone-ramp-and-door 11 to create a patio,
to give pets a place to rest
(see FIG. 8A, and FIG. 8B,) and
e) Can be used with inner drying-grooming-platform-patio-crumple-zone-ramp-and-door 118 and outer drying-grooming-platform-patio-crumple-zone-ramp-and-door 11 to create a patio,
to give pets a place to rest
(see FIG. 8A, and FIG. 8B).
4) It is a further object of the new invention to provide a crumplable rollable collapsible drying-grooming-platform-patio-crumple-zone-ramp-and-door pet crate, having
a crumple-zone-ramp-and-door-locking quick-release locking pin 121.
Therefore, the crumplable rollable collapsible drying-grooming-platform-patio-crumple-zone-ramp-and-door pet crate:
a) Can lock multi-function drying-grooming-platform-patio-crumple-zone-ramp-and-door system 117,
to provide safety and security to pets
(see FIG. 8A and FIG. 8B);
b) Can unlock multi-function drying-grooming-platform-patio-crumple-zone-ramp-and-door system 117,
to allow pets to easily exit crate
(see FIG. 8A and FIG. 8B); and
c) Can automatically and springedly lock multi-function drying-grooming-platform-patio-crumple-zone-ramp-and-door system 117,
to make the operation of ramp-and-door system 117 easier.
5) It is an even further object of the new invention to provide a crumplable rollable collapsible drying-grooming-platform-patio-crumple-zone-ramp-and-door pet crate, having
a multi-function T-shaped handle 124.
Therefore, the crumplable rollable collapsible drying-grooming-platform-patio-crumple-zone-ramp-and-door pet crate:
a) Can provide grip for multi-function detachable storable seatback-attachable headrest-attachable leg-handle system 123,
to make hand operation easier
(see FIG. 5A and FIG. 5B);
b) Can slidably lock between to car seats,
in the direction of arrow 138
to prevent crate from moving during travel
(see FIG. 10A, FIG. 11, FIG. 12A, FIG. 12B, FIG. 13A, and FIG. 13B);
c) Can slidably lock between headrest posts,
in the direction of arrow 139
to prevent crate from moving during travel
(see FIG. 10B, FIG. 11, FIG. 12A, FIG. 12B, FIG. 13A, and FIG. 13B); and
d) Can function as a support foot for multi-function drying-grooming-platform-patio-crumple-zone-ramp-and-door system 117,
to create a grooming platform, a drying platform, and a patio
(see FIG. 9A, FIG. 9B, FIG. 14, FIG. 16, and FIG. 21).
6) It is still another object of the new invention to provide a crumplable rollable collapsible drying-grooming-platform-patio-crumple-zone-ramp-and-door pet crate, having
a multi-function I-shaped leg 125.
Therefore, the crumplable rollable collapsible drying-grooming-platform-patio-crumple-zone-ramp-and-door pet crate:
a) Can function as a crumple-zone to protect the crumplable rollable collapsible drying-grooming-platform-patio-crumple-zone-ramp-and-door pet crate,
in the direction of arrows 140 and 141
to provide additional safety and security to pets
(see FIG. 12A, FIG. 12B, FIG. 13A, and FIG. 13B);
b) Can function as a leg to support the multi-function drying-grooming-platform-patio-crumple-zone-ramp-and-door system 117 to act as a grooming platform,
to provide a place for pets to be groomed
(see FIG. 16 and FIG. 21);
c) Can function as a leg to support the multi-function drying-grooming-platform-patio-crumple-zone-ramp-and-door system 117 to act as a drying platform,
to provide a place to dry after bathing
(see FIG. 16 and FIG. 21); and
d) Can function as a leg to support multi-function drying-grooming-platform-patio-crumple-zone-ramp-and-door system 117 to act as a patio,
to provide a place for pets to rest
(see FIG. 16 and FIG. 21).
7) It is yet another object of the new invention to provide a crumplable rollable collapsible drying-grooming-platform-patio-crumple-zone-ramp-and-door pet crate, having
a panel-snap-locking hook 126.
Therefore, the crumplable rollable collapsible drying-grooming-platform-patio-crumple-zone-ramp-and-door pet crate:
a) Can lock the multi-function detachable storable seatback-attachable headrest-attachable leg-handle system 123 to top handle-attaching foldable panel 102 in multiple locations and positions,
in the direction of arrow 142
to provide multiple configuration options
(see FIG. 14, FIG. 15A, FIG. 15B, FIG. 15C and FIG. 15D);
b) Can lock the multi-function detachable storable seatback-attachable headrest-attachable leg-handle system 123 to bottom handle-attaching panel 103 in multiple locations and positions,
in the direction of arrow 142
to provide multiple configuration options
(see FIG. 14, FIG. 15A, FIG. 15B, FIG. 15C, FIG. 15D, and FIG. 16A),
and
to lift and tow the crumplable rollable collapsible drying-grooming-platform-patio-crumple-zoneramp-and-door pet crate in the directions of arrows 143 and 144, respectively
(see FIG. 16B);
c) Can lock the multi-function detachable storable seatback-attachable headrest-attachable leg-handle system 123 to left handle-attaching foldable panel 104 in multiple locations and positions,
in the direction of arrow 142
to provide multiple configuration options
(see FIG. 14, FIG. 15A, FIG. 15 B, FIG. 15 C, and FIG. 15D); and
d) Can lock multi-function detachable storable seatback-attachable headrest-attachable leg-handle system 123 to right handle-attaching foldable panel 105 in multiple locations and positions,
in the direction of arrow 142
to provide multiple configuration options
(see FIG. 14, FIG. 15A, FIG. 15 B, FIG. 15 C, and FIG. 15D); and
e) Can lock multi-function detachable storable seatback-attachable headrest-attachable leg-handle system 123 to rear handle-attaching foldable panel 106 in multiple locations and positions,
in the direction of arrow 142
to provide multiple configuration options
(see FIG. 14, FIG. 15A, FIG. 15 B, FIG. 15 C, and FIG. 15D).

What is claimed is:

1. A crumplable rollable collapsible drying-grooming-platform-patio-crumple-zone-ramp-and-door pet crate, comprising:

a top handle-attaching foldable panel;
a bottom handle-attaching panel;
a left handle-attaching foldable panel
   pivotably attached to said bottom handle-attaching panel;
a right handle-attaching foldable panel
   pivotably attached to said bottom handle-attaching panel;
a rear handle-attaching foldable panel
   pivotably attached to said top handle-attaching foldable panel and said bottom handle-attaching panel;
a front handle-attaching foldable panel
   pivotably attached to said bottom handle-attaching panel;
four top corner connectors
   respectively attached to said top handle-attaching foldable panel, said left handle-attaching foldable panel, said right handle-attaching foldable panel, said rear handle-attaching foldable panel, and said front handle-attaching foldable panel;
four bottom corner connectors
   respectively attached to said bottom handle-attaching panel, said left handle-attaching foldable panel, said right handle-attaching foldable panel, said rear handle-attaching foldable panel, and said front handle-attaching foldable panel;
six hinges
   respectively pivotably attached to said bottom handle-attaching panel, said left handle-attaching foldable panel, said right handle-attaching foldable panel, and said rear handle-attaching foldable panel;
two drying-grooming-platform-patio-crumple-zone-ramp-and-door hinges
   respectively pivotably attached to said bottom handle-attaching panel and said front handle-attaching foldable panel;
four crate-stabilizing flaring feet
   respectively attached to said four bottom corner connectors;
two wheel brackets
   respectively attached to said bottom handle-attaching panel;
two wheels
   respectively rotatably attached to said two wheel brackets;
a tray
   attached to said bottom handle-attaching panel;
a plurality of panel-unlocking spring-loaded buttons
   respectively attached to said four top corner connectors;
an inner drying-grooming-platform-patio-crumple-zone-ramp-and-door
   for providing a drying platform for pets to dry after bathing,
   for providing a grooming platform to groom pets,
   for providing a patio for pets to rest,
   for providing a crumple zone in a collision to help protect pets,
   for slidably providing a ramp for pets to conveniently quickly and easily enter and exit said crumplable rollable collapsible drying-grooming-platform-patio-crumple-zone-ramp-and-door pet crate,
   for foldably being a leg
      to support said inner and said outer drying-grooming-platform-patio-crumple-zone-ramp-and-doors, and
   for functioning as an adjustable ramp for pets to conveniently safely quickly and easily enter and exit said crumplable rollable collapsible drying-grooming-platform-patio-crumple-zone-ramp-and-door pet crate from many different angles;
an outer drying-grooming-platform-patio-crumple-zone-ramp-and-door swingably attached to said front handle-attaching foldable panel and
   slid over said inner drying-grooming-platform-patio-crumple-zone-ramp-and-door
   for providing a drying platform for pets to dry after bathing,
   for providing a grooming platform to groom pets,
   for providing a patio for pets to rest,
   for providing a crumple zone in a collision to help protect pets,
   for providing a ramp for pets to conveniently quickly and easily enter and exit said crumplable rollable collapsible drying-grooming-platform-patio-crumple-zone-ramp-and-door pet crate, and
   for functioning as an adjustable ramp for pets to conveniently safely quickly and easily enter and exit said crumplable rollable collapsible drying-grooming-platform-patio-crumple-zone-ramp-and-door pet crate from many different angles;
a crumple-zone-ramp-and-door-locking quick-release hand knob;
a crumple-zone-ramp-and-door-locking quick-release locking pin attached to said crumple-zone-ramp-and-door-locking quick-release hand knob;
a locking-pin recess
   drilled into said front handle-attaching foldable panel;
an alarm-housing
   attached to said top handle-attaching foldable panel and springingly attached to said crumple-zone-ramp-and-door-locking quick-release hand knob;

a processor
secured within said alarm-housing;
a memory
electronically connected to said processor;
a display
electronically connected to said processor and said memory;
a software
installed inside said processor;
a temperature sensor
electronically connected to said processor;
an alert speaker
electronically connected to said processor; and
an alert light
electronically connected to said processor.

2. The crumplable rollable collapsible drying-grooming-platform-patio-crumple-zone-ramp-and-door pet crate of claim 1,
further comprising
a multi-function T-shaped handle;
a multi-function I-shaped leg attached to said multi-function T-shaped handle; and
a panel-snap-locking hook attached to said multi-function I-shaped leg,
wherein
said multi-function T-shaped handle is
for providing grip for said multi-function T-shaped handle,
for slidably locking between two car seats to prevent said crumplable rollable collapsible drying-grooming-platform-patio-crumple-zone-ramp-and-door pet crate from moving during travel,
for slidably locking between headrest posts to prevent said crumplable rollable collapsible drying-grooming-platform-patio-crumple-zone-ramp-and-door pet crate from moving during travel, and
for functioning as a support foot for said inner and said outer drying-grooming-platform-patio-crumple-zone-ramp-and-doors,
said multi-function I-shaped leg is
for functioning as a crumple-zone to protect said crumplable rollable collapsible drying-grooming-platform-patio-crumple-zone-ramp-and-door pet crate,
for functioning as a leg to support said inner and said outer drying-grooming-platform-patio-crumple-zone-ramp-and-doors
to act as a grooming platform,
for functioning as a leg to support said inner and said outer drying-grooming-platform-patio-crumple-zone-ramp-and-doors
to act as a drying platform,
for functioning as a leg to support said inner and said outer drying-grooming-platform-patio-crumple-zone-ramp-and-doors
to act as a patio for pets to rest,
said panel-snap-locking hook is
for locking said multi-function T-shaped handle to said top handle-attaching foldable panel, said bottom handle-attaching panel, said left handle-attaching foldable panel, said right handle-attaching foldable panel, said rear handle-attaching foldable panel, and said front handle-attaching foldable panel
to provide multiple configuration options.

3. The crumplable rollable collapsible drying-grooming-platform-patio-crumple-zone-ramp-and-door pet crate of claim 2,
wherein
said multi-function T-shaped handle
is made of plastic and metallic material,
said multi-function I-shaped leg
is made of metallic material,
said panel-snap-locking hook
is made of metallic material.

4. The crumplable rollable collapsible drying-grooming-platform-patio-crumple-zone-ramp and-door pet crate of claim 1,
wherein
said inner drying-grooming-platform-patio-crumple-zone-ramp-and-door
is made of metallic material,
said outer drying-grooming-platform-patio-crumple-zone-ramp-and-door
is made of metallic material.

5. The crumplable rollable collapsible drying-grooming-platform-patio-crumple-zone-ramp and-door pet crate of claim 1,
wherein
said inner drying-grooming-platform-patio-crumple-zone-ramp-and-door
is formed into a rectangle shape with a U-shaped cross-section,
said outer drying-grooming-platform-patio-crumple-zone-ramp-and-door
is formed into a rectangle shape with a U-shaped cross-section.

6. The crumplable rollable collapsible drying-grooming-platform-patio-crumple-zone-ramp and-door pet crate of claim 1,
wherein
said crumple-zone-ramp-and-door-locking quick-release locking pin
is formed into a cylinder shape with a rounded end.

7. The crumplable rollable collapsible drying-grooming-platform-patio-crumple-zone-ramp and-door pet crate of claim 1,
wherein
said two drying-grooming-platform-patio-crumple-zone-ramp-and-door hinges
each are made of plastic material.

8. The crumplable rollable collapsible drying-grooming-platform-patio-crumple-zone-ramp and-door pet crate of claim 1,
wherein
said crumplable rollable collapsible drying-grooming-platform-patio-crumple-zone-ramp-and-door pet crate
is made of plastic and metallic materials.

9. The crumplable rollable collapsible drying-grooming-platform-patio-crumple-zone-ramp and-door pet crate of claim 1,
wherein
said crumplable rollable collapsible drying-grooming-platform-patio-crumple-zone-ramp-and-door pet crate
is made of plastic or metallic materials.

10. A crumplable rollable collapsible crumple-zone-ramp-and-door pet crate, comprising:
a top handle-attaching foldable panel;
a bottom handle-attaching panel;
a left handle-attaching foldable panel
pivotably attached to said bottom handle-attaching panel;
a right handle-attaching foldable panel
pivotably attached to said bottom handle-attaching panel;
a rear handle-attaching foldable panel pivotably attached to said top handle-attaching foldable panel and said bottom handle-attaching panel;
a front handle-attaching foldable panel
pivotably attached to said bottom handle-attaching panel;
four top corner connectors
respectively attached to said top handle-attaching foldable panel, said left handle-attaching foldable panel, said right handle-attaching foldable panel, said rear handle-attaching foldable panel, and said front handle-attaching foldable panel;
four bottom corner connectors
respectively attached to said bottom handle-attaching panel, said left handle-attaching foldable panel, said right handle-attaching foldable panel, said rear handle-attaching foldable panel, and said front handle-attaching foldable panel;
six hinges
respectively pivotably attached to said bottom handle-attaching panel, said left handle-attaching foldable panel, said right handle-attaching foldable panel, and said rear handle-attaching foldable panel;
two crumple-zone-ramp-and-door hinges
respectively pivotably attached to said bottom handle-attaching panel and said front handle-attaching foldable panel;
two wheel brackets
respectively attached to said bottom handle-attaching panel;
two wheels
respectively rotatably attached to said two wheel brackets;
a tray
attached to said bottom handle-attaching panel;
an inner crumple-zone-ramp-and-door
for providing a drying platform for pets to dry after bathing,
for providing a grooming platform to groom pets,
for providing a patio for pets to rest,
for providing a crumple zone in a collision to help protect pets,
for slidably providing a ramp for pets to conveniently quickly and easily enter and exit said crumplable rollable collapsible crumple-zone-ramp-and-door pet crate,
for foldably being a leg
to support said inner and said outer crumple-zone-ramp-and-doors, and
for functioning as an adjustable ramp for pets to conveniently safely quickly and easily enter and exit said crumplable rollable collapsible crumple-zone-ramp-and-door pet crate from many different angles;
an outer crumple-zone-ramp-and-door
swingably attached to said front handle-attaching foldable panel and
slid over said inner crumple-zone-ramp-and-door
for providing a drying platform for pets to dry after bathing,
for providing a grooming platform to groom pets,
for providing a patio for pets to rest,
for providing a crumple zone in a collision to help protect pets,
for providing a ramp for pets to conveniently quickly and easily enter and exit said crumplable rollable collapsible crumple-zone-ramp-and-door pet crate, and for functioning as an adjustable ramp for pets to conveniently safely quickly and easily enter and exit said crumplable rollable collapsible crumple-zone-ramp-and-door pet crate from many different angles;
a crumple-zone-ramp-and-door-locking quick-release hand knob;
a crumple-zone-ramp-and-door-locking quick-release locking pin
attached to said crumple-zone-ramp-and-door-locking quick-release hand knob;
a locking-pin recess
drilled into said front handle-attaching foldable panel;
an alarm-housing
attached to said top handle-attaching foldable panel and springingly attached to said crumple-zone-ramp-and-door-locking quick-release hand knob;
a processor
secured within said alarm-housing;
a memory
connected to said processor;
a display
connected to said processor and said memory;
a software
installed inside said processor;
a temperature sensor
connected to said processor;
an alert speaker
connected to said processor; and
an alert light
connected to said processor.

11. The crumplable rollable collapsible crumple-zone-ramp-and-door pet crate of claim 10,
further comprising
a multi-function T-shaped handle;
a multi-function I-shaped leg attached to said multi-function T-shaped handle; and
a panel-snap-locking hook attached to said multi-function I-shaped leg,
wherein
said multi-function T-shaped handle is
for providing grip for said multi-function T-shaped handle,
for slidably locking between two car seats to prevent said crumplable rollable collapsible crumple-zone-ramp-and-door pet crate from moving during travel,
for slidably locking between headrest posts to prevent said crumplable rollable collapsible crumple-zone-ramp-and-door pet crate from moving during travel, and
for functioning as a support foot for said inner and said outer crumple-zone-ramp-and-doors,
said multi-function I-shaped leg is
for functioning as a crumple-zone to protect said crumplable rollable collapsible crumple-zone-ramp-and-door pet crate,
for functioning as a leg to support said inner and said outer crumple-zone-ramp-and-doors
to act as a grooming platform,
for functioning as a leg to support said inner and said outer crumple-zone-ramp-and-doors
to act as a drying platform,
for functioning as a leg to support said inner and said outer crumple-zone-ramp-and-doors
to act as a patio for pets to rest,
said panel-snap-locking hook is
for locking said multi-function T-shaped handle to said top handle-attaching foldable panel, said bottom handle-attaching panel, said left handle-attaching foldable panel, said right handle-attaching foldable panel, said rear handle-attaching foldable panel, and said front handle-attaching foldable panel
to provide multiple configuration options.

12. The crumplable rollable collapsible crumple-zone-ramp-and-door pet crate of claim 11,
wherein
said multi-function T-shaped handle
is made of plastic and metallic material,
said multi-function I-shaped leg
is made of metallic material,
said panel-snap-locking hook
is made of metallic material.

13. The crumplable rollable collapsible crumple-zone-ramp-and-door pet crate of claim 10,
wherein
said inner crumple-zone-ramp-and-door
is made of metallic material,
said outer crumple-zone-ramp-and-door
is made of metallic material.

14. The crumplable rollable collapsible crumple-zone-ramp-and-door pet crate of claim 10,
wherein
said inner crumple-zone-ramp-and-door
is formed into a rectangle shape with a U-shaped cross-section.
said outer crumple-zone-ramp-and-door
is formed into a rectangle shape with a U-shaped cross-section.

15. The crumplable rollable collapsible crumple-zone-ramp-and-door pet crate of claim 10,
wherein
said crumple-zone-ramp-and-door-locking quick-release locking pin
is formed into a cylinder shape with a rounded end.

16. The crumplable rollable collapsible crumple-zone-ramp-and-door pet crate of claim 10,
wherein
said two crumple-zone-ramp-and-door hinges
each are made of plastic material.

17. The crumplable rollable collapsible crumple-zone-ramp-and-door pet crate of claim 10,
wherein
said crumplable rollable collapsible crumple-zone-ramp-and-door pet crate
is made of plastic and metallic materials.

18. The crumplable rollable collapsible crumple-zone-ramp-and-door pet crate of claim 10,
wherein
said crumplable rollable collapsible crumple-zone-ramp-and-door pet crate
is made of plastic or metallic materials.

19. A crumplable rollable collapsible ramp-and-door pet crate, comprising:
a top handle-attaching foldable panel;
a bottom handle-attaching panel;
a left handle-attaching foldable panel
pivotably attached to said bottom handle-attaching panel;
a right handle-attaching foldable panel
pivotably attached to said bottom handle-attaching panel;
a rear handle-attaching foldable panel
pivotably attached to said top handle-attaching foldable panel and said bottom handle-attaching panel;
a front handle-attaching foldable panel
pivotably attached to said bottom handle-attaching panel;
four top corner connectors
respectively attached to said top handle-attaching foldable panel, said left handle-attaching foldable panel, said right handle-attaching foldable panel, said rear handle-attaching foldable panel, and said front handle-attaching foldable panel;
four bottom corner connectors
respectively attached to said bottom handle-attaching panel, said left handle-attaching foldable panel, said right handle-attaching foldable panel, said rear handle-attaching foldable panel, and said front handle-attaching foldable panel;
six hinges
respectively pivotably attached to said bottom handle-attaching panel, said left handle-attaching foldable panel, said right handle-attaching foldable panel, and said rear handle-attaching foldable panel;
two crumple-zone-ramp-and-door hinges
respectively pivotably attached to said bottom handle-attaching panel and said front handle-attaching foldable panel;
two wheel brackets
respectively attached to said bottom handle-attaching panel;
two wheels
respectively rotatably attached to said two wheel brackets;
a tray
attached to said bottom handle-attaching panel;
an inner crumple-zone-ramp-and-door
for providing a drying platform for pets to dry after bathing,
for providing a grooming platform to groom pets,
for providing a patio for pets to rest,
for providing a crumple zone in a collision to help protect pets,
for slidably providing a ramp for pets to conveniently quickly and easily enter and exit said crumplable rollable collapsible ramp-and-door pet crate,
for foldably being a leg
to support said inner and said outer crumple-zone-ramp-and-doors, and
for functioning as an adjustable ramp for pets to conveniently safely quickly and easily enter and exit said crumplable rollable collapsible ramp-and-door pet crate from many different angles;
an outer crumple-zone-ramp-and-door
swingably attached to said front handle-attaching foldable panel and
slid over said inner crumple-zone-ramp-and-door
for providing a drying platform for pets to dry after bathing,
for providing a grooming platform to groom pets,
for providing a patio for pets to rest,
for providing a crumple zone in a collision to help protect pets,
for providing a ramp for pets to conveniently quickly and easily enter and exit said crumplable rollable collapsible ramp-and-door pet crate, and
for functioning as an adjustable ramp for pets to conveniently safely quickly and easily enter and exit said crumplable rollable collapsible ramp-and-door pet crate from many different angles;
a crumple-zone-ramp-and-door-locking quick-release hand knob;

a crumple-zone-ramp-and-door-locking quick-release locking pin
    attached to said crumple-zone-ramp-and-door-locking quick-release hand knob;
a locking-pin recess
    drilled into said front handle-attaching foldable panel; and
a housing
    attached to said top handle-attaching foldable panel and springingly attached to said crumple-zone-ramp-and-door-locking quick-release hand knob.

20. The crumplable rollable collapsible ramp-and-door pet crate of claim 19,
further comprising
a multi-function T-shaped handle;
a multi-function I-shaped leg attached to said multi-function T-shaped handle; and
a panel-snap-locking hook attached to said multi-function I-shaped leg,
wherein
said multi-function T-shaped handle is
    for providing grip for said multi-function T-shaped handle,
    for slidably locking between two car seats to prevent said crumplable rollable collapsible ramp-and-door pet crate from moving during travel,
    for slidably locking between headrest posts to prevent said crumplable rollable collapsible ramp-and-door pet crate from moving during travel, and
    for functioning as a support foot for said inner and said outer crumple-zone-ramp-and-doors,
said multi-function I-shaped leg is
    for functioning as a crumple-zone to protect said crumplable rollable collapsible ramp-and-door pet crate,
    for functioning as a leg to support said inner and said outer crumple-zone-ramp-and-doors
        to act as a grooming platform,
    for functioning as a leg to support said inner and said outer crumple-zone-ramp-and-doors
        to act as a drying platform,
    for functioning as a leg to support said inner and said outer crumple-zone-ramp-and-doors
        to act as a patio for pets to rest,
said panel-snap-locking hook is
    for locking said multi-function T-shaped handle to said top handle-attaching foldable panel, said bottom handle-attaching panel, said left handle-attaching foldable panel, said right handle-attaching foldable panel, said rear handle-attaching foldable panel, and said front handle-attaching foldable panel
        to provide multiple configuration options.

* * * * *